US006493461B1

(12) United States Patent
Mennie et al.

(10) Patent No.: US 6,493,461 B1
(45) Date of Patent: Dec. 10, 2002

(54) CUSTOMIZABLE INTERNATIONAL NOTE COUNTER

(75) Inventors: Douglas U. Mennie, Barrington, IL (US); John F. Weggesser, Lake in the Hills, IL (US); Matthew S. Vogel, Wheeling, IL (US); Gary P. Watts, Buffalo Grove, IL (US); Richard A. Mazur, Naperville, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 09/179,573

(22) Filed: Oct. 27, 1998

Related U.S. Application Data

(60) Provisional application No. 60/078,269, filed on Mar. 17, 1998.

(51) Int. Cl.[7] .................................................. G06K 9/00

(52) U.S. Cl. ........................................ 382/135; 382/137

(58) Field of Search ................................. 382/135, 136, 382/137, 138, 139, 140; 194/207; 358/514

(56) References Cited

U.S. PATENT DOCUMENTS

| | | | |
|---|---|---|---|
| 3,245,534 A | 4/1966 | Smith et al. | 382/7 |
| 3,246,295 A | 4/1966 | DeClaris et al. | 382/56 |
| 3,280,974 A | 10/1966 | Riddle et al. | 209/111.8 |

(List continued on next page.)

FOREIGN PATENT DOCUMENTS

| | | |
|---|---|---|
| DE | 4310216 | 9/1994 |
| EP | 0077464 | 4/1983 |
| EP | 101115 | 2/1984 |

(List continued on next page.)

OTHER PUBLICATIONS

Translation of PCT 72651/96 dated Jun. 2, 1997 and attached Drawing p. 1/1.

"Sale of Magnetic Detection 7/91".

"Sale of Doubles Detection 6/92".

"Sale of Multiple Density Sensitivity Setting 4/93".

(List continued on next page.)

*Primary Examiner*—Andrew W. Johns
*Assistant Examiner*—Seyed Azarian
(74) *Attorney, Agent, or Firm*—Jenkens & Gilchrist

(57) ABSTRACT

A document handling system is adapted to accommodate a plurality of different currency types. The system includes a sensor for counting the number of bills in a stack of bills. An operator interface panel includes a display for displaying information to an operator. An input device specifies the type of currency and the denomination of currency to be processed. The system may further include an authenticating unit for authenticating each of the bills based on one or more attributes detected from each bill. Based on the designated currency type and denomination, the system appropriately adjusts the display and/or selects which attributes are used to authenticate bills.

137 Claims, 21 Drawing Sheets

U.S. PATENT DOCUMENTS

| | | | | | |
|---|---|---|---|---|---|
| 3,480,785 | A | | 11/1969 | Aufderheide | 250/219 |
| 3,496,370 | A | | 2/1970 | Haville et al. | 250/219 |
| 3,509,535 | A | | 4/1970 | Berube | 340/149 |
| 3,612,834 | A | | 10/1971 | Andrews et al. | 235/61.11 D |
| 3,618,765 | A | | 11/1971 | Cooper et al. | 209/534 |
| 3,679,314 | A | | 7/1972 | Mustert | 356/71 |
| 3,778,628 | A | | 12/1973 | Novak et al. | 250/556 |
| 3,842,281 | A | | 10/1974 | Goodrich | 250/461 |
| 3,870,629 | A | | 3/1975 | Carter et al. | 209/111.8 |
| 3,906,449 | A | | 9/1975 | Marchak | 340/149 R |
| 3,976,198 | A | | 8/1976 | Carnes, Jr. et al. | 209/111.7 T |
| 4,041,456 | A | | 8/1977 | Ott et al. | 340/146.3 R |
| 4,081,131 | A | | 3/1978 | Sand et al. | 364/550 |
| 4,096,991 | A | | 6/1978 | Iquchi | 235/419 |
| 4,114,804 | A | | 9/1978 | Jones et al. | 235/476 |
| 4,147,430 | A | | 4/1979 | Gorgone et al. | 356/51 |
| 4,179,685 | A | * | 12/1979 | O'Maley | 340/146.3 |
| 4,255,651 | A | | 3/1981 | Phillips | 235/92 |
| 4,277,774 | A | | 7/1981 | Fujii et al. | 340/146.3 |
| 4,283,708 | A | | 8/1981 | Lee | 340/146.32 |
| 4,288,781 | A | | 9/1981 | Sellner et al. | 340/146.3 |
| 4,302,781 | A | | 11/1981 | Ikeda et al. | 358/486 |
| 4,311,914 | A | | 1/1982 | Huber | 250/556 |
| 4,313,598 | A | | 2/1982 | DiBlasio | 271/124 |
| 4,334,619 | A | | 6/1982 | Horino et al. | 209/551 |
| 4,348,656 | A | | 9/1982 | Gorgone et al. | 340/146.3 R |
| 4,349,111 | A | | 9/1982 | Shah et al. | 209/534 |
| 4,355,300 | A | | 10/1982 | Weber | 340/146.3 C |
| 4,356,473 | A | | 10/1982 | Freudenthal | 340/146.3 H |
| 4,381,447 | A | | 4/1983 | Horvath et al. | 250/223 |
| 4,386,432 | A | | 5/1983 | Nakamura et al. | 382/7 |
| 4,416,449 | A | | 11/1983 | McInerny | |
| 4,420,153 | A | | 12/1983 | Winkler et al. | |
| 4,442,541 | A | | 4/1984 | Finkel et al. | 382/7 |
| 4,451,521 | A | | 5/1984 | Kaule et al. | 428/199 |
| 4,461,028 | A | | 7/1984 | Okubo | 382/15 |
| 4,464,786 | A | | 8/1984 | Nishito et al. | 382/7 |
| 4,464,787 | A | | 8/1984 | Fish et al. | 382/7 |
| 4,470,496 | A | | 9/1984 | Steiner | |
| RE31,692 | E | | 10/1984 | Tyburski et al. | 382/7 |
| 4,480,177 | A | | 10/1984 | Allen | 235/379 |
| 4,482,058 | A | | 11/1984 | Steiner | 209/534 |
| 4,487,306 | A | | 12/1984 | Nao et al. | |
| 4,490,846 | A | | 12/1984 | Ishida et al. | 382/7 |
| 4,503,963 | A | | 3/1985 | Steiner | 194/4 |
| 4,513,439 | A | | 4/1985 | Gorgone et al. | 382/7 |
| 4,539,702 | A | | 9/1985 | Oka | 382/7 |
| 4,556,140 | A | | 12/1985 | Okada | 194/4 |
| 4,558,224 | A | | 12/1985 | Gober | 250/460.1 |
| 4,563,771 | A | | 1/1986 | Gorgone et al. | 382/7 |
| 4,567,370 | A | | 1/1986 | Falls | 250/461.1 |
| 4,587,412 | A | | 5/1986 | Apisdorf | 235/449 |
| 4,587,434 | A | * | 5/1986 | Roes et al. | 250/556 |
| 4,592,090 | A | | 5/1986 | Curl et al. | 382/7 |
| 4,628,194 | A | | 12/1986 | Dobbins et al. | 235/379 |
| 4,645,936 | A | | 2/1987 | Gorgone | 250/556 |
| 4,653,647 | A | | 3/1987 | Hashimoto | 209/534 |
| 4,677,682 | A | | 6/1987 | Miyagawa et al. | 382/7 |
| 4,681,229 | A | | 7/1987 | Uesaka et al. | |
| 4,694,963 | A | | 9/1987 | Takesako | |
| 4,697,071 | A | | 9/1987 | Hiraoka et al. | |
| 4,700,368 | A | | 10/1987 | Munn et al. | 377/8 |
| 4,707,843 | A | | 11/1987 | McDonald et al. | 377/8 |
| 4,733,308 | A | | 3/1988 | Nakamura et al. | 358/496 |
| 4,747,492 | A | | 5/1988 | Saito et al. | |
| 4,749,087 | A | | 6/1988 | Buttifant | 382/7 |
| 4,761,002 | A | | 8/1988 | Reed et al. | |
| 4,764,725 | A | | 8/1988 | Bryce | |
| 4,789,345 | A | | 12/1988 | Carter | 439/71 |
| 4,817,176 | A | | 3/1989 | Marshall et al. | 382/43 |
| 4,823,393 | A | | 4/1989 | Kawakami | 382/7 |
| 4,837,426 | A | | 6/1989 | Pease et al. | 235/440 |
| 4,881,268 | A | | 11/1989 | Uchida et al. | 382/7 |
| 4,906,988 | A | | 3/1990 | Copella | 340/825.34 |
| 4,908,516 | A | | 3/1990 | West | 250/556 |
| 4,953,086 | A | | 8/1990 | Fukatsu | 364/408 |
| 4,973,851 | A | | 11/1990 | Lee | 250/556 |
| 4,985,614 | A | | 1/1991 | Pease et al. | 235/440 |
| 4,992,860 | A | | 2/1991 | Hamaquchi et al. | 358/75 |
| 4,996,604 | A | | 2/1991 | Oqawa et al. | 358/486 |
| 5,027,415 | A | | 6/1991 | Hara et al. | 382/135 |
| 5,047,871 | A | | 9/1991 | Meyer et al. | 358/486 |
| 5,055,834 | A | | 10/1991 | Chiba | 340/825 |
| 5,066,992 | A | | 11/1991 | Wu et al. | 357/23.5 |
| 5,068,519 | A | | 11/1991 | Bryce | 235/449 |
| 5,122,754 | A | | 6/1992 | Gotaas | 324/676 |
| 5,163,672 | A | | 11/1992 | Mennie | 271/187 |
| 5,167,313 | A | | 12/1992 | Dobbins et al. | 194/317 |
| 5,167,411 | A | | 12/1992 | Isobe | |
| 5,201,395 | A | | 4/1993 | Takizawa et al. | 194/206 |
| 5,207,788 | A | | 5/1993 | Geib et al. | 271/122 |
| 5,236,072 | A | | 8/1993 | Cargill | 194/207 |
| 5,256,080 | A | | 10/1993 | Bright | 439/342 |
| 5,261,518 | A | | 11/1993 | Bryce | 194/206 |
| 5,295,196 | A | | 3/1994 | Raterman et al. | 382/7 |
| 5,304,813 | A | | 4/1994 | DeMan | 250/556 |
| 5,341,408 | A | | 8/1994 | Melcher et al. | 377/8 |
| 5,342,213 | A | | 8/1994 | Kobayaski | 439/268 |
| 5,367,577 | A | | 11/1994 | Gotaas | 382/135 |
| 5,430,664 | A | | 7/1995 | Cargill et al. | 364/550 |
| 5,448,043 | A | | 9/1995 | Nakano et al. | 235/379 |
| 5,454,727 | A | | 10/1995 | Hsu | 439/263 |
| 5,457,336 | A | | 10/1995 | Fang et al. | 257/322 |
| 5,465,821 | A | | 11/1995 | Akioka | 194/207 |
| 5,467,405 | A | | 11/1995 | Raterman et al. | 382/135 |
| 5,467,406 | A | | 11/1995 | Graves et al. | 382/135 |
| 5,493,534 | A | | 2/1996 | Mok | 365/226 |
| 5,505,834 | A | | 4/1996 | Chaug et al. | |
| D369,984 | S | | 5/1996 | Larsen | D10/97 |
| 5,542,468 | A | | 8/1996 | Lin | 165/80.3 |
| 5,580,311 | A | | 12/1996 | Haste, III | 463/29 |
| 5,633,949 | A | | 5/1997 | Graves et al. | 382/135 |
| 5,640,463 | A | | 6/1997 | Csulits | 382/135 |
| 5,652,802 | A | | 7/1997 | Graves et al. | 382/135 |
| 5,687,963 | A | | 11/1997 | Mennie | 271/119 |
| 5,692,067 | A | | 11/1997 | Raterman et al. | 382/135 |
| 5,704,491 | A | | 1/1998 | Graves | 382/135 |
| 5,724,438 | A | | 3/1998 | Graves | 209/534 |
| 5,727,667 | A | * | 3/1998 | Nye | 194/207 |
| 5,729,623 | A | | 3/1998 | Omatu et al. | |
| 5,751,840 | A | | 5/1998 | Raterman et al. | 382/135 |
| 5,790,693 | A | | 8/1998 | Graves et al. | 382/135 |
| 5,790,697 | A | | 8/1998 | Munro et al. | 382/135 |
| 5,806,650 | A | | 9/1998 | Mennie et al. | 194/206 |
| 5,815,592 | A | | 9/1998 | Mennie et al. | 382/135 |
| 5,822,448 | A | | 10/1998 | Graves et al. | 382/135 |
| 5,832,104 | A | | 11/1998 | Graves et al. | 382/135 |
| 5,867,589 | A | | 2/1999 | Graves et al. | 382/135 |
| 5,870,487 | A | | 2/1999 | Graves et al. | 382/135 |
| 6,012,565 | A | | 1/2000 | Mazur | |
| 6,026,175 | A | * | 2/2000 | Munro et al. | 382/135 |
| 6,104,812 | A | * | 8/2000 | Koltai et al. | 380/51 |
| 6,237,739 | B1 | | 5/2001 | Mazur et al. | |
| 6,141,069 | A1 | | 6/2001 | Mazur et al. | |

FOREIGN PATENT DOCUMENTS

| | | |
|---|---|---|
| EP | 0338123 | 10/1989 |
| EP | 0342647 | 11/1989 |
| EP | 0487316 A2 | 11/1990 |
| EP | 690451 | 1/1996 |
| EP | 0700098 | 3/1996 |

| | | | | |
|---|---|---|---|---|
| EP | 0718809 | A2 | 6/1996 | |
| GB | 2190996 | A | 12/1987 | |
| JP | 54-71673 | | 6/1979 | |
| JP | 54-71674 | | 6/1979 | |
| JP | 56-136689 | | 10/1981 | |
| JP | 61-14557 | | 4/1986 | |
| JP | 61-41439 | | 9/1986 | |
| JP | 64-19495 | | 1/1989 | ............ G07D/9/00 |
| WO | WO 90/07165 | | 6/1990 | |
| WO | WO 91/11778 | | 8/1991 | |
| WO | WO 93/23824 | | 11/1993 | |
| WO | WO 94/19773 | | 9/1994 | |
| WO | WO 95/24691 | | 9/1995 | |
| WO | WO 96/10800 | | 4/1996 | |

OTHER PUBLICATIONS

"Offer for Sale of Optical/Magnetic Detection 9/92".
Mosler CF–420 Cash Management System Operator's Manual, cover, copyright page, and chapter 5. 5–1 through 5–16, copyrighted 1989.
JetScan Currency Scanner/Counter, Model 4060, Operator's Manual by Cummins–Allison (8/91).
Sale of JetScan Currency Scanner/Counter, Model 4060 (8/91).
JetScan Currency Scanner/Counter, Model 4061, Operating Instructions by Cummins–Allison (Apr. 20, 1993).
Sale of JetScan Currency Scanner/Counter, Model 4061 (Apr. 20, 1993).
JetScan Currency Scanner/Counter, Model 4062, Operating Instructions by Cummins–Allison (Nov. 28, 1994).
Sale of JetScan Currency Scanner/Counter, Model 4062 (Nov. 28, 1994).
AFB Currency Recognition System (1982).
Mosler Inc. brochure "The Mosler/Toshiba CF–420," 1989.
"Flash Memory Products—1996 Data Book/Handbook," Advanced Micro Devices, Sunnyvale, CA.
"FlashLite™ Memory Cards" Catalog 296045, AMP Inc., Harrisburg PA, Jul. 1995.
"AMP PC Card Connectors" Catalog 65701, AMP Inc., Harrisburg PA, Sep. 1995.
Operation Manual For Maintenance and Learning Modes for Tellac–5, 5DD, SD, DDA, A & SSD, Musashi Co., Ltd., various pages.
Model 4050/4051 Form #022–7014–00, pager 14–15.
"The Learning Mode of Tellac—3 . . . ", pp. 1–4.
First Translation of JP 61–14557.
Second Translation of 61–14557 (Glory).
Translation of JP 54–71673.
Translation of JP 54–71674.
Translation of JP 61–41439.
First Translation of JP 56–136689.
Second Translation of JP 56–136689 (Glory).
Billcon D–202/204 Service Manual (cover marked 630229) (Japanese).
Translation of Billcon D–202/204 Service Manual—(H13).
Billcon D–202, D204 Operator's Manual (cover marked 611215) (Japanese).
First Translation of Billcon D–202, D204 Operator's Manual (H15).
Second Translation of Billcon D–202, D204 Operator's Manual (H15) (Glory).
Banking Machine Digest No. 31 (last page of H19 translation has a date of Dec. 5, 1988) (Japanese).
First Translation of Banking Machine Digest No. 31 (H18).
Second Translation of Banking Machine Digest No. 31 (H18) (Glory).
Third Translation of Banking Machine Digest No. 31 (H18).
Cummins–Allison Corp. v. Glory U.S.A., Inc., N.D. Ill.
Translation of Japanese Patent Application No. 64–19495 (See B01 above).
Abstract of Japanese Patent Application No. 64–19495 (See B01 above).

* cited by examiner

*FIG. 21* TIMING DIAGRAM

CUSTOMIZABLE INTERNATIONAL NOTE COUNTER

CROSS-REFERENCE TO RELATED APPLICATION

This application claims the benefit of copending Provisional Patent Application Serial No. 60/078,269 filed Mar. 17, 1998.

FIELD OF THE INVENTION

The present invention relates generally to the field of note counters and, more particularly, to a note counter capable of accommodating a variety of international currency bills and which may be customized according to the type of international currency system being evaluated.

BACKGROUND OF THE INVENTION

Note counters are machines which are designed to rapidly count the number of "notes," or currency bills in a stack of currency bills. Stacks of bills to be counted by a note counter are usually pre-sorted so that every bill in the stack is of the same type of currency system and denomination as the other bills in the stack. There are a variety of different types of note counters, ranging in sophistication from those which simply count the number of bills in the stack, without regard to the quality or authenticity of the bill, to those which are capable of discriminating between acceptable and non-acceptable bills, such as between genuine and counterfeit bills, in the stack. In either type of note counter, the operator usually enters the denomination of the bills through some sort of operator interface such as a keypad. Thereafter, in either type of note counter, the aggregate value of counted bills may be computed by multiplying the number of counted bills by the denomination indicated by the operator. In the more sophisticated note counters capable of discriminating between acceptable and non-acceptable bills, acceptance or rejection of an individual bill is based on a comparison of one or more sensed characteristics of the bill with prestored data defining an acceptable bill.

There are a variety of different types of sensors, including, for example, authentication and counting sensors that detect magnetic and/or optical characteristics. Several characteristics which may be detected from the bills include, for example, magnetic content, optical reflectance or transmittance, size (e.g., length or width), watermark, fluorescence, color, etc. The prestored data defines an acceptable bill and is compared to data corresponding to the detected characteristics from the bills under test. The prestored data varies according to the characteristics detected and the type of sensors employed.

As a general rule, the type of sensors, the sensed characteristics, the prestored data and the operator interface which is appropriate (or desired) for a particular note counter will vary according to the type of currency system and the denomination of the bills that are to be processed by the note counter. For example, with respect to the type of sensor and the characteristics sensed, a note counter using an optical sensor and size detection may be appropriate for counting British currency but less desirable for counting United States currency. Similarly, even where the type of sensor and sensed characteristics are otherwise the same, the prestored data defining an acceptable bill will vary according to the currency type and/or denominations to be accommodated. For example, in a note counter using size detection as a discriminating parameter, an "acceptable" size for a British £5 note (145.5×77.8 mm) will differ from an "acceptable" size for a German 5 DM (deutsche mark) note (120×60 mm).

Prior note counters were dedicated to one particular type of currency system. Thus, these note counters were configured for that type of currency system, e.g., the appropriate sensor alignment, the appropriate authentication tests, etc. In some of these prior system, the operator interface only had denomination keys for that particular type of currency system. For example, note counters designed to process United States currency included selection options for the currency denominations of 1, 5, 10, 20, 50 and 100 and displayed the U.S. dollar ($) sign. Conversely, note counters designed to process British currency included selection options for the British currency denominations of 5, 10, 20 and 50 and displayed the British pound (£) sign. In other system, denominational information was input via a generic numerical keypad.

Regardless of the type of note counter, therefore, it can be seen that the features needed or desired to accommodate a particular type of currency system may differ from features which are needed or desired to accommodate another type. Note counters known in the art do not have the flexibility to accommodate multiple types of currency systems because their features are rigidly dedicated to handling a particular type of currency. For example, such a dedicated counter may be defined to perform a particular type authentication test requiring a particular type of sensor, to sense a particular characteristic of a bill, to compare sensed data a particular set of prestored data defining an acceptable bill and/or to have an operator interface which is fixed to a particular display language, currency symbol and type of currency system.

Consequently, there is a need for a note counter that is capable of accommodating a number of different types of currency systems through its operator interface, sensor(s), sensed characteristic(s), and/or prestored data defining an acceptable bill. The present invention is directed to satisfying these needs.

SUMMARY OF THE INVENTION

In accordance with one aspect of the present invention, there is provided a system for counting documents, such as currency from a plurality of different currency systems.

In accordance with another aspect of the present invention, there is provided a system for authenticating currency from a plurality of different currency systems.

In accordance with yet another aspect of the present invention, there is provided a system for counting and authenticating currency from a plurality of different currency systems.

In accordance with still yet another aspect of the present invention, there is provided a system that automatically determines appropriate operating parameters corresponding to a designated type of currency system and denomination.

In accordance with a further aspect of the present invention, there is provided a system that allows an operator to customize the system operating parameters so that the system can process currency from a plurality of different currency systems.

In accordance with another aspect of the present invention, there is provided a system that can be easily changed from accommodating one currency type to another, for example, by simply using one or more keys or pushbuttons. For example, depressing one or more keys or pushbuttons may permit scrolling through and selecting from among a plurality of different currency systems that can be processed.

In accordance with yet another aspect of the present invention, there is provided a system that can automatically learn the characteristics of authentic currency from a plurality of different currency systems.

In accordance with another aspect of the present invention, there is provided a system that allows the parameters corresponding to a plurality of different currency systems to be easily changed and/or adjusted.

In accordance with a further aspect of the present invention, there is provided a system that allows a programmed set of operating parameters to be quickly and easily transferred from one system to another.

In accordance with another aspect of the present invention, there is provided a system that allows a manufacturer to produce a single system for operation in a plurality of countries having different currency systems.

These and other aspects of the invention are embodied in a system for processing a plurality of different types of currency. The system, according to one embodiment, includes an input receptacle for receiving a stack of currency bills to be counted, a counting sensor for counting the number of bills in the stack, and an output receptacle for receiving the bills after they have been counted. A transport mechanism is included for transporting bills, one at a time, from the input receptacle past the counting sensor to the output receptacle. An operator interface panel is provided and includes a display for displaying information to an operator. An input device specifies the type of currency, e.g., country, casino or arcade script, or the like to be processed by the system and the denomination of currency to be processed. A processor is also included for calculating the total value of the bills based on the number of bills of each type counted by the counting sensor and the type and denomination(s) specified by the input device. The total value is displayed, together with a symbol corresponding to the type of currency specified by the operator. The system may further include an authenticating unit for authenticating each of the bills. The system may also include a resident flash memory and be capable of supporting a flash card for interacting with the resident memory.

According to another embodiment, a note counting system is provided with size detection sensors. The size detection sensors are used to measure the size of bills being processed. Based on the measured size, the denomination of a bill being processed is determined. Then, based on the determined denomination, other parameters are automatically selected by the system. For example, master information to be used for authentication can be selected based on the determined denomination. Likewise, the operator interface panel may change to indicate the determined denomination of the bill.

In another embodiment, the system includes a learn mode and a standard mode. One or more sensors are provided, each adapted in the learn mode to process one or more master currency bills to obtain master information associated with at least one attribute of the master currency bills. The sensors are adapted in the standard mode to process a stack of bills to obtain data associated with at least one attribute of the bills. The system further includes a processor that is adapted in the standard mode to determine the authenticity of each of the bills by comparing the data associated with a selected attribute to the master information corresponding to the selected attribute.

BRIEF DESCRIPTION OF THE DRAWINGS

The foregoing and other advantages of the invention will become apparent upon reading the following detailed description and upon reference to the drawings in which.

Figure 1:
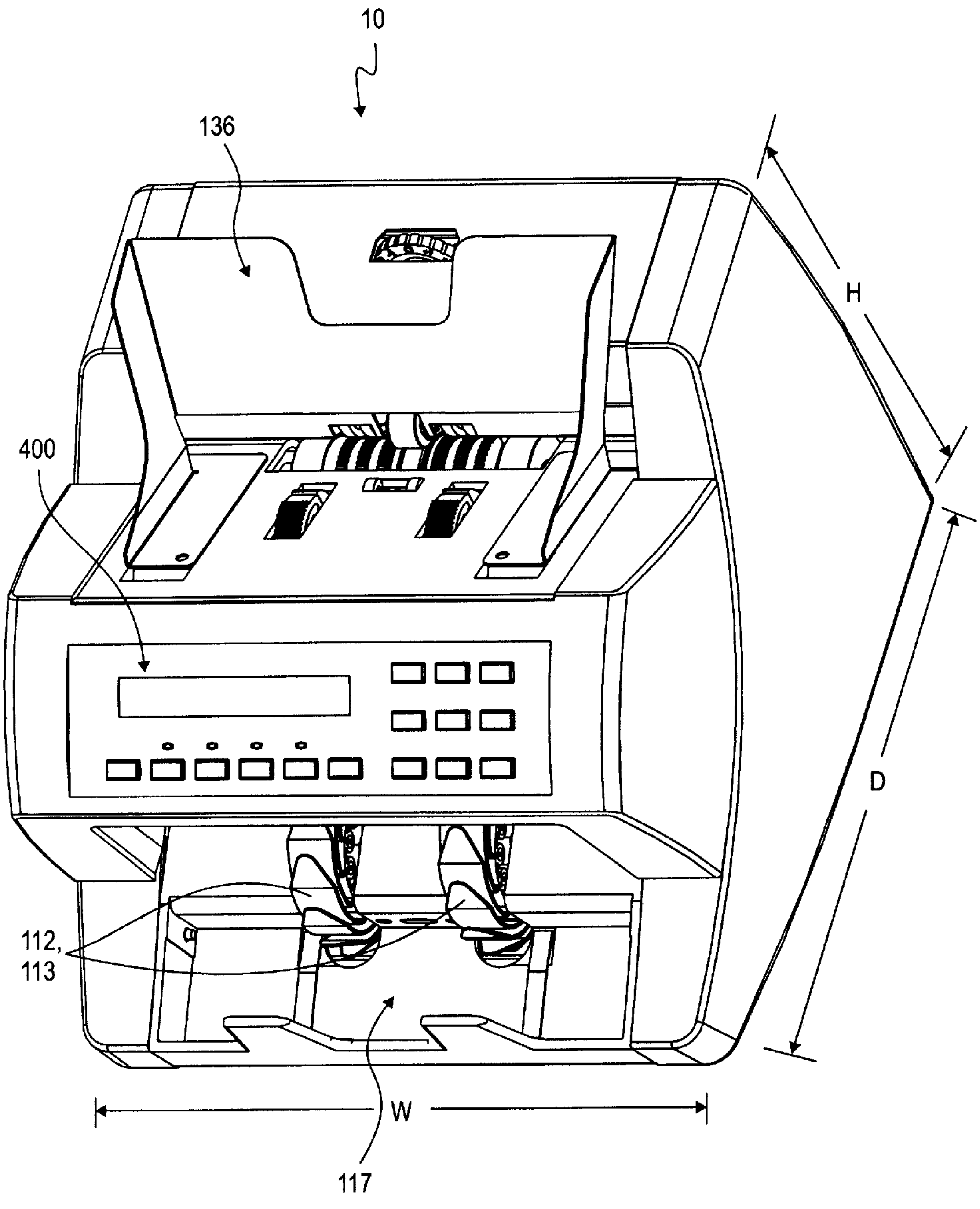
FIG. 1 is a top perspective view of a document handling system according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENT

The present invention provides a document handling system 10 for processing currency bills of various denominations from any of a plurality of different currency systems. FIG. 1 illustrates one embodiment of the document handling system 10 which includes a currency counter and an authenticator. The illustrated document handling system 10 is compact and can fit on a tabletop; its dimensions are about 8.5 inches(H)×12 inches(D)×10.75 inches(W) [24.13 cm×30.48 cm×27.31 cm] and it weighs approximately 15 pounds [6.8 Kg].

I. General Description of the System

Figure 2:
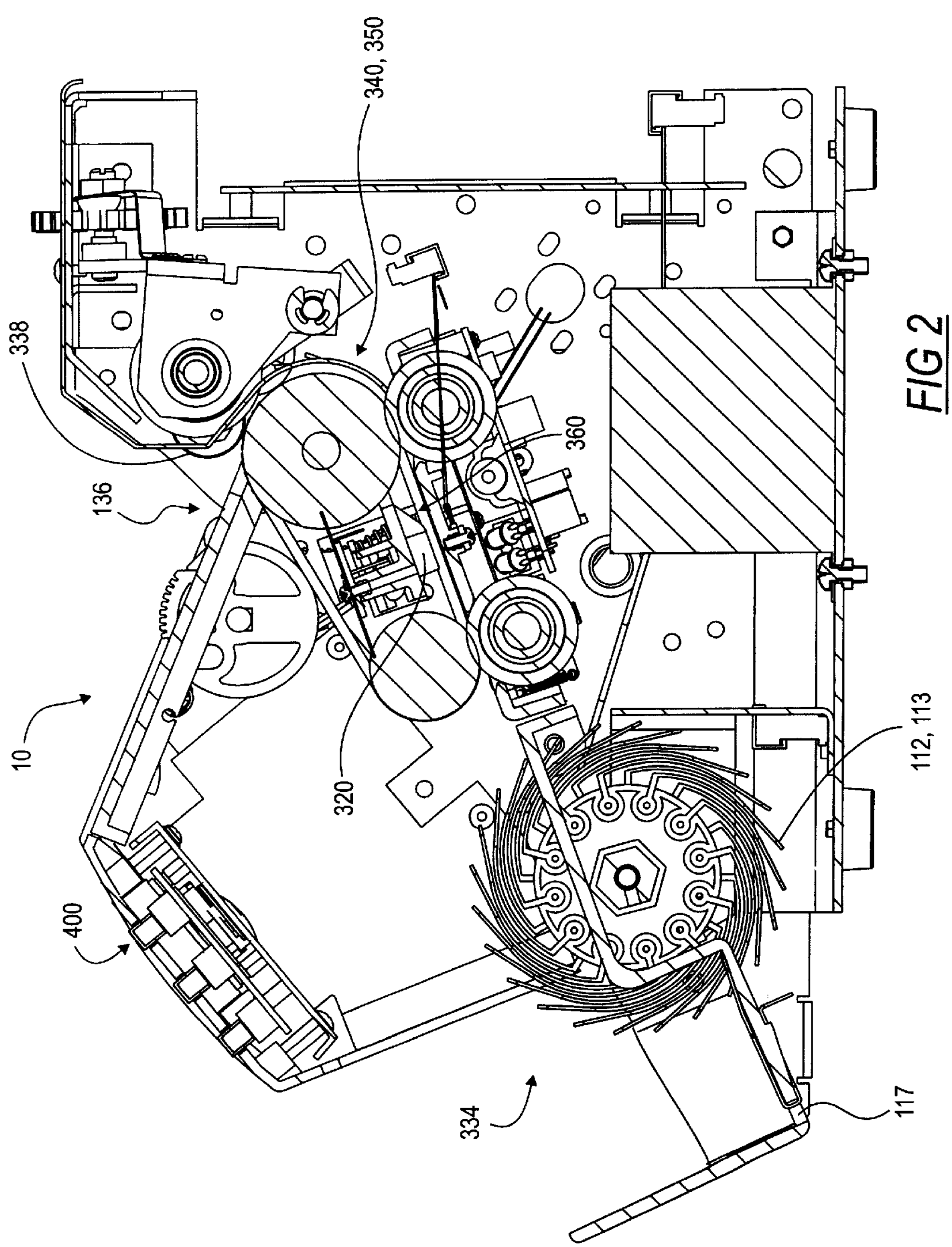
FIG. 2 is a cross-sectional view of a document handling system according to one embodiment of the present invention.
Figure 3:
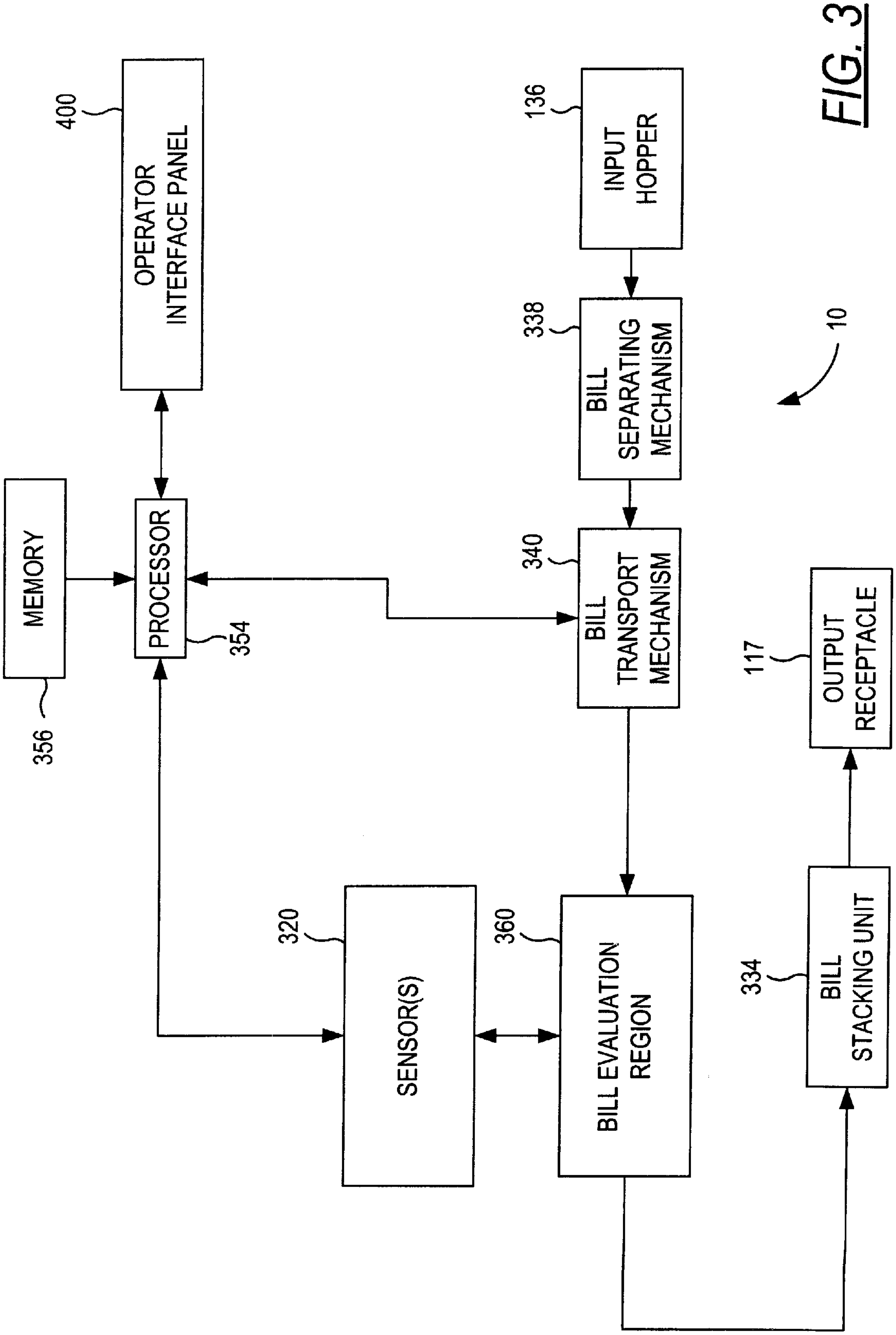
FIG. 3 is a functional block diagram of a document handling system according to one embodiment of the present invention.

Referring to FIGS. 1–3, the operation of the document handling system 10 will be described. A stack of currency bills (not shown), from one of the currency systems the system 10 is capable of handling, is deposited in an input receptacle 136 having an adjustable hopper which holds the currency securely and allows the bills in the stack delivered by a bill separating mechanism 338 to be conveyed one at a time through the document handling system 10 by a transport mechanism 340 which transports the bills between the input receptacle 136 and an output receptacle 117 along a transport path 350. The transport mechanism 340 sequentially relays bills through a bill evaluation region 360, having one or more sensors 320, where the currency bills are counted, authenticated and/or otherwise processed. In the embodiment depicted, after the bills are evaluated, they are then transported to an output receptacle 117 where the bills are stacked for subsequent removal. Stacking of the documents or bills is accomplished by a bill stacking unit 334 having stacking wheels 112 and 113 disposed adjacent to the output receptacle 117. The stacking wheels 112 and 113 are supported for rotational movement about a shaft journalled on a rigid frame and driven by a motor. It should be noted that the detailed construction of a mechanism to convey bills through the document handling system 10 is not related to the practice of the present invention. Many configurations are well-known in the prior art. An exemplary configuration includes an arrangement of pulleys and rubber belts, as shown in U.S. Pat. No. 5,295,196 or U.S. Pat. No. 5,687,963, both assigned to the assignee of the present invention and incorporated herein by reference.

While the present invention is described in connection with the processing of currency from different countries, the system 10 may be designed to process other types of money such as casino money (script) and/or amusement park or arcade money (script). Additionally, the system 10 may be designed to accommodate other types of documents such as stock certificates, bonds, postage stamps, and/or food coupons.

Referring now to FIG. 3, a block diagram of the document handling system 10 according to one embodiment of the present invention is illustrated. A controller or processor 354, such as a central processing unit (CPU) or a microprocessor or the like, controls the overall operation of the document handling system 10. After the bills are conveyed to the interior of the document handling system 10, a portion of the bill may be sensed or the bill may be counted using one or more sensors 320. The sensor(s) 320 generate electrical signals that correspond to one or more characteristics of the bill. The signals are sent to the processor 354. The processor 354 stores the data from the sensor(s) 320 in a plurality of memory locations in a resident memory 356, forming a set of data values corresponding to the characteristic(s) detected from the currency bill. In this way, the bill may be authenticated, counted and/or otherwise processed. In one embodiment, the document handling system 10 is capable of transporting, processing, and determining the authenticity of bills at a high speed including rates of 800 to 1502a, 1502b bills per minute.

The document handling system 10 may include several modes of operation such as set-up mode, standard mode and learn mode. The standard mode comprises a count mode and a value mode, and when authentication tests are to be performed, an authentication mode. Other details of these modes of operation will be described in detail below. Briefly, however, in the set-up mode (which is usually limited to access and/or use by a trained technician), a technician selects, for example, the currency types that the system 10 will accommodate, audio alarm parameters, key status parameters, etc. If currency is to be processed, the set-up mode permits the technician to define, for example, default currency types and denominations and default authentication test(s) for each type of currency system and denomination. In standard mode, system software enables the operator to select various operating parameters for the document handling system 10. The operating parameters may include, for example, the type of document to be processed, the type of authentication test(s), if any, to be performed, the sensitivity of such test(s), the transport speed, the display language, the mode of operation, default settings, etc.

In standard mode, the system 10 compares data detected from processed documents to master information stored in memory that corresponds to characteristic(s) or attribute(s) of authentic documents which may include authentic documents from a plurality of currency systems and/or denominations. The standard mode also permits the operator to select batching or sub-batching modes (described below) and/or audio alarms for error conditions (described below). Count mode allows the document handling system 10 to count bills, or other documents, of a plurality of types and/or denominations. Total information indicates the number of documents processed but not the total value of those documents. In value mode, a total value can be calculated using the denominational information received from the operator or determined by the system. Authentication mode allows the system 10 to authenticate the documents being processed by performing one or more authentication tests on the document. Learn mode allows the system 10 to detect and store data corresponding to attribute(s) of processed documents so the stored data may be used as master information for the processing of subsequent documents in standard mode.

In one embodiment of this invention, the document handling system 10 operates in normal mode. In normal mode, the sensor(s) 320 are used to detect the passage of documents or bills along the transport mechanism. The sensor(s) 320 may include, for example, optical sensors that detect transmitted light. For example, the sensor(s) 320 may comprise a light source positioned on one side of the transport path and a photodetector positioned on the opposite side of the transport path such that the light beam from the light source is interrupted by the passing bills, thus indicating that bills are passing by the sensor(s) 320.

In operation, currency bills to be evaluated (in standard mode) or from which master information will be generated (in learn mode) are positioned in the input hopper 136. The bills are acted upon by a bill separating mechanism 338 which functions to pick out or separate one bill at a time from the stack. The bills are then sequentially relayed by a bill transport mechanism 340, along a transport path 350 (see FIG. 2), past one of more of the sensor(s) 320. The sensor(s) are designed to count and/detect one or more characteristic(s) from the bills which may be used to count, evaluate, authenticate or otherwise process the bills. In the embodiment shown in FIG. 3, the sensor(s) 320 are disposed along the bill transport path in the bill evaluation region 360. After passing the sensor(s) 320, each of the bills is transported to a "pocket" or output receptacle 117 for receiving the bills, the output receptacle including a bill stacking unit 334.

A typical note counter is designed to count bills having the same, pre-designated denomination. A note counter therefore does not typically determine the denomination of the bills being counted, but relies on the operator to designate the denomination. However, in some embodiments, the system 10 of the invention can determine the denomination of bills and count mixed denominations of currency using size sensors (described later) to determine the denomination of the currency for those types of currency having denominations of differing sizes. Otherwise, the denomination of the bills to be processed is communicated to the system 10 through an operator interface panel such as a selector switch, keypad, keyboard, or touch-screen, or through a remote host system linked to the document handling system or through a remote cash settlement machine. Such a remote host system is described in U.S. patent application Ser. No. 08/722,808, filed Sep. 27, 1996, entitled "Currency Handling Apparatus that Communicates with an External Device". Such a remote cash settlement machine is described in U.S. patent application Ser. No. 08/467,585, filed Jun. 6, 1995, entitled "Cash Settlement Machine". Both of these patent applications are assigned to the assignee of the present invention and are incorporated herein by reference.

II. Operator Interfaces and Modes of Operation

According to one embodiment of the present invention, an operator interface panel 400 allows the operator of the document handling system 10 to select operating parameters including, for example, the mode of operation, the authentication test(s) to be performed, the type of currency system with which the bills to be processed are associated, the denomination of the bills, the display language, the currency symbol, the sensitivity of the authentication test(s), the currency size, the transport speed, and/or the alignment of the sensor(s).

According to one embodiment, after the type of currency system and denomination of the bills to be processed have been entered by the operator, several other operating parameters may be determined. These parameters can be determined automatically by the system or entered manually by the operator. Where the parameters are automatically determined, the operator interface panel displays the operating parameters corresponding to the selected currency type and denomination. Where the other operating parameters are manually entered by the operator, the operator interface panel provides appropriate selection elements for selecting the parameters, and displays the selected operating parameters.

In one embodiment, the operator interface panel allows the operator to enter the operating parameters into the system 10. The operating parameters to be entered may be selected from menus containing the required operating parameters. For example, the type of currency system to be processed can be selected from among a list of available types of currency systems such as: U.S., British, Japanese, German, French and Canadian. The denomination to be processed can be selected from among a list of available denominations corresponding to the type of currency system selected. The display language can be selected from among a plurality of international languages such as English, Japanese, German, French and Spanish. The currency symbol can be selected from among a plurality of international currency symbols such as: the U.S. dollar sign ($), the British pound sign (£) the Japanese yen sign (¥), the German deutsche mark sign (DM) and the Canadian dollar sign ($). Likewise, the other operating parameters may be manually selected from lists of available options.

Figure 4A:
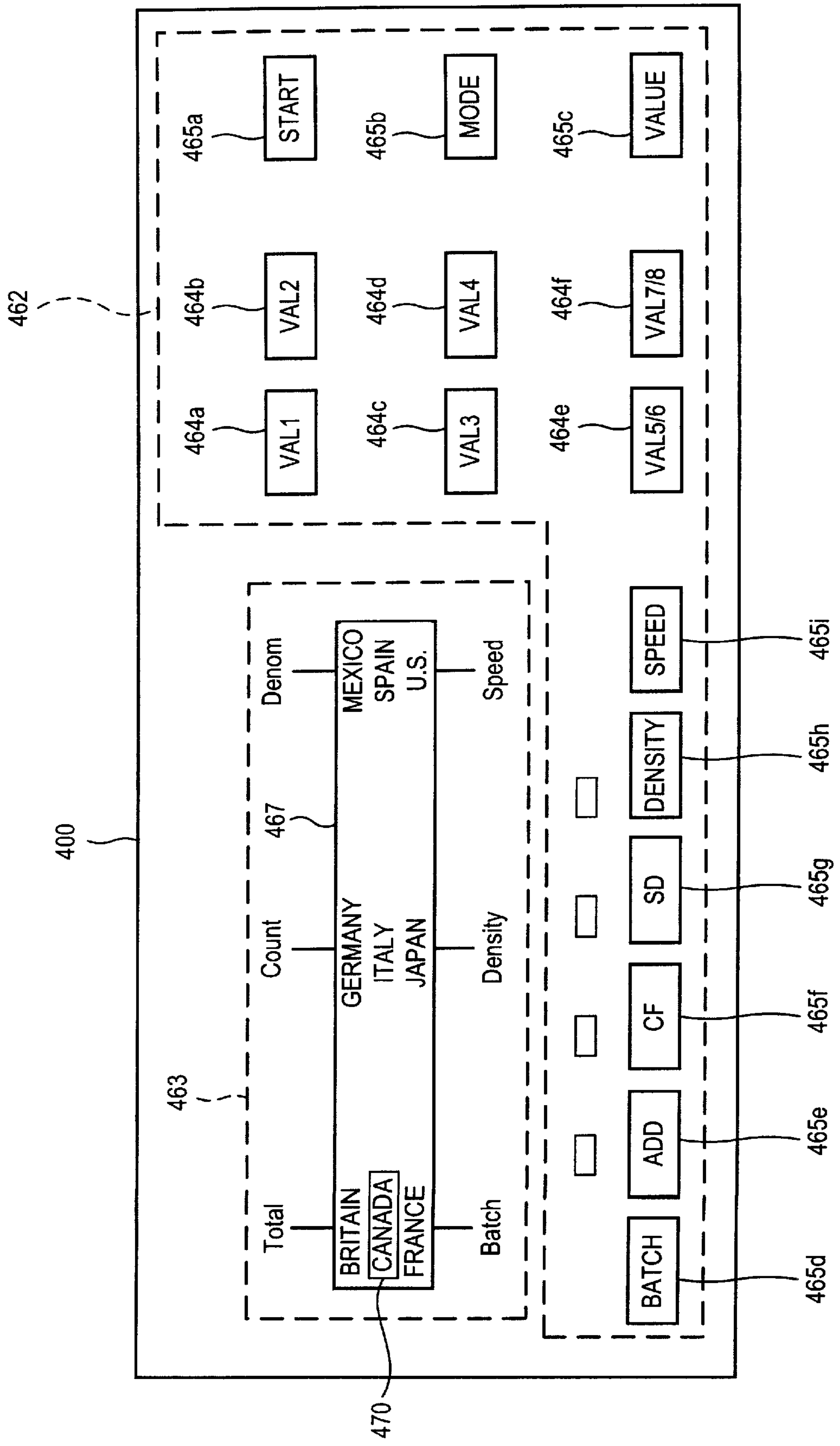
FIGS. 4*a*–7 illustrate various embodiments of operator interface panels which may be used with a document handling system according to various embodiments of the present invention.

In one embodiment, the operator first enters the type of currency system to be processed by the system 10. This is accomplished by use of an operator interface panel. The type of currency system to be processed may be selected from among a plurality of available types of international currency systems. One embodiment of an operator interface panel is illustrated in FIG. 4*a*. There, an operator interface panel 400 includes a keypad 462 and a display 463. The display 463 displays a series of menus or screens that allow the operator to select the type of currency system to be processed. After the operator selects the type of currency system, the display 463 displays the corresponding denominations for the chosen type of currency system. Then, the operator enters the denomination of the bills to be processed. From this information, the system 10 automatically determines operating parameters such as, for example, the appropriate currency symbol, display language, authentication test(s), transport speed, and sensor alignment corresponding to the entered type and/or denomination.

For example, in the illustrated embodiment of FIG. 4*a*, the operator would first choose a currency system by using the "mode" key 465*b* to scroll a cursor box 470 through the modes of operation and currency systems available. In FIG. 4*a*, "CANADA" is currently selected. Pressing the mode key 465*b* will cause the selection indicator 470 to select the next currency type, e.g., "FRANCE." The display may also change with repeated activation of the mode key 465*b* to cause additional choices to be displayed, such as, for example, "CHINA", HONG KONG", etc.

The operator next chooses the denomination of bills to be processed from the corresponding denominations available for the selected currency system. The system 10 automatically changes the denomination associated with the value or "val" keys 464*a–f* to correspond to the denominations available for the currency system selected. The operator selects the desired denomination by selecting the appropriate "VAL" key. For denominations associated with the "VAL" keys 464*e* and 464*f*, the operator would touch the appropriate VAL key once to select the first denomination associated with that key and would touch that key twice to select the second denomination associated with that key. When a particular "VAL" key is pressed, the corresponding denomination is displayed. For example, if British currency had been selected, depressing the "VAL2" key 464*b* would result in "£10" being displayed in the display 463, informing the operator the value of the selected denomination. If "£10" was not the desired value, the operator may select a different value key such as the "VAL3" key 464*c* to select £20.

After the currency system and denomination are selected, the system automatically adjusts various operating parameters. For example, if £10 British notes are selected by the operator to be processed, the system 10 would automatically display the British currency symbol, display further instructions in English, set the authentication test(s) to watermark and security thread, set the transport speed to 800 bills per minute, and set the sensitivity setting to 3. If £20 British notes are then to be processed, the operator would press the corresponding value key, e.g., "VAL3" key 464*c* and the system 10 would automatically continue to display the British currency symbol, display English instructions, select and use the watermark and security thread tests, transport bills at 800 bills per minute, and adjust the sensitivity setting to 7. If 5 DM German notes are then to be processed, the operator would again use the "MODE" key 465*b* to select German currency and then select the appropriate "VAL" key to select the denomination to be processed. Note, German language instructions will not be selected, since the operator previously selected English. The operator may select a language at any time, however, if none is selected, the system will select the language associated with the selected currency system. The system 10 would then automatically display the German "DM" currency symbol, select and use the size, fluorescence and security thread authentication tests, set the transport speed to 1000 bills per minute, and set the sensitivity setting to 3.

In some embodiments, the operator first sets various operating parameters. Generally, several operating parameters are initially set and typically not changed once the system 10 is set up. These operating parameters may include, for example, the transport speed, the display language and/or the default settings. Typically, the transport speed is set in relation to the greatest speed available for the currency types to be processed. For example, if the system 10 were used in a bank that typically processed only German and British currency, the transport speed would be set to 1200 bills per minute. Alternatively, the system may be set up to automatically default to the highest speed at which the system may operate based on the type and denomination of bills to be processed. For example, if the system may accurately process 10 DM bills at 1200 bills per minute but must slow to 1000 bills per minute for 500 DM bills, then the speed would automatically adjust itself to 1200 bills per minute when 10 DM bills are being processed and to 1000 bills per minute when 500 DM bills are being processed. Furthermore, the display language can be set to the language spoken by the operator. For example, if the system 10 were used in Japan, the language parameter would be set to Japanese. Likewise, the default settings could be set such that the currency symbol always corresponds to the currency type selected by the operator. The system 10 could also be set up such that the system 10 defaults to the currency type of the country where the system 10 is used. For example, if the system 10 were used in China, the system 10 could be set up to default to Chinese currency.

The types and sensitivities of test(s) to be performed on particular currency type and denomination combinations can also be pre-defined. For example, if Canadian currency were one of the currency systems to be processed, the operator could first set the authentication test(s) and sensitivities corresponding to authentic Canadian currency, e.g., color detection and sensitivities corresponding to the denomination being processed (sensitivity=3 for a $1 note and 7 for a $100 note). Therefore, by pre-defining several of the operating parameters, an operator thereafter only needs to enter the currency type and denomination and the system 10 automatically sets/selects the rest of the operating parameters.

In one embodiment, after the operator enters the type of currency system to be processed, the system 10 automatically determines, for currency systems having bills of varying sizes, the denomination by sensing the size of the first bill processed such as the width and/or length of the first bill processed. From the type of currency system and denomination, various other operating parameters are automatically selected/set. For example, if a stack of Chinese 10 yuan bills were to be processed, the operator would first select Chinese currency using the "MODE" key 465*b* as described above. Then the operator would press the "start" key 465*a*. The document handling system 10 would process the first bill and measure its width which would be 155 mm for a 10 yuan bill. The system 10 would then automatically display the yuan currency symbol (YN), use the color authentication test, set the transport speed to 1200 bills per minute, and set the sensitivity setting to 3.

In one embodiment, after the operator enters the type of currency system to be processed, the system 10 automatically determines the denomination of a bill by sensing a characteristic of the bill, such as the location of a security thread, the color, etc., as it is processed. From the type of currency system and denomination, various other operating parameters are automatically selected/set.

In one embodiment, for all currency systems that have different size bills for each denomination, the system 10 can discriminate the bills based on the size of the bills. For example, for currency systems having bills of varying widths, the denomination can be determined by sensing the width of the bills as they are processed. Therefore, the system 10 can have a discrimination or mixed mode of operation for all currency systems that have different size bills for each denomination. Likewise, where the system 10 automatically determines the denomination of a bill by sensing a characteristic of the bill, such as the location of a security thread, the color, etc., as it is processed, the system 10 can also operate in "mixed" mode. That is, a stack of mixed denomination notes (of the same type, e.g., same country) could be counted and given a total value. To do this, the operator would first indicate the currency system to be processed and select the mixed mode of operation. From this, the system 10 would select/set various operating parameters based on the denomination determination made by the system 10. For example, the system 10 would automatically display the German currency symbol (DM), set the authentication tests to security thread, magnetic and fluorescence, set the transport speed to 1000 bills per minute, adjust the sensitivity setting according to the value of each note being processed and select the appropriate master information according to the denomination of each of the notes being processed.

The system 10 can then sort a stack of bills having mixed denominations by sensing a characteristic of each bill, such as the location of a security thread, the color, the size, etc., as it is processed. The system 10 then sorts the bills by, for example, routing the bills to one of several output hoppers (not shown) or by stopping the system 10 each time a different denomination is encountered, so that the operator can clear the single output hopper.

In one embodiment, the operator enters the type of currency system to be processed and then the denomination of the bills. Then, the operator manually enters the operating parameters including, for example, the currency symbol, the display language, the authentication test(s), the transport speed, and/or the sensor alignment desired for the entered type of currency system and denomination. For example, if ¥1,000 Japanese notes are to be processed, the operator would manually set the system 10 to display the yen currency symbol, select size and watermark as the authentication tests, set the transport speed to 1200 bills per minute, and set the sensitivity setting to 3. The operator interface panel is described in more detail below. Thus, in some embodiments, the operator may manually set in all of the above-described information, in others, the system is capable of sensing and/or selecting the remaining information when the currency type (e.g., country) is entered, and in still other embodiments the operator may choose to manually enter some of the information, and/or permit the system to automatically select "default" settings based on the selected (or sensed) currency type (e.g., country) and/or denomination for some or all of the settings.

III. Sensors

Referring again to FIG. 3, some examples of the types of sensors 320 that may be employed by the system 10 will now be described. The bill transport mechanism 340 transports bills past a bill evaluation region 360. The characteristics of the evaluation region 360 may vary according to the type of currency system and denomination to be processed. The evaluation region 360 can accommodate various numbers and varieties of different types of sensor(s) 320 depending on a number of variables. These variables are related to whether the system 10 is to accommodate authenticating in addition to counting, what types and denominations of bills are to be accommodated and what distinguishing characteristics are to be examined, e.g., size, color, magnetism, density, reflectivity, absorbtivity, transmissivity, electrical conductivity, etc.

The sensors 320 may comprise a variety of detection means such as magnetic or optical sensors for performing a variety of authentication tests (see "Authentication Tests" below for a description of the variety of ways of authenticating a document). Other authentication techniques include electrical conductivity sensing, capacitive sensing and mechanical sensing. Magnetoresistive sensors may be employed to detect, for example, magnetic flux.

According to some optical sensor embodiments, particularly those comprising denomination discrimination, a light source directs a beam of coherent light downwardly onto the transport path and optical sensors detect light reflected from a passing bill and generate an analog output which corresponds to the light sensed from the bill. Two-sided sensing may be used to permit bills to be fed into a document handling system according to the present invention with either side face up. Examples of a two-sided scanhead arrangements are disclosed in U.S. Pat. Nos. 5,467,406 and 5,687,963 which are incorporated by reference in this regard. Furthermore, to accommodate sensing areas other than the central portion of a bill, multiple scanheads may be laterally positioned next to each other. Examples of multiple scanhead arrangements are described U.S. Pat. No. 5,652,802, which is incorporated herein by reference.

The embodiments described below may use one or more of the above authentication methods and sensors.

IV. Authentication Mode

In some embodiments of the present invention, the document handling system 10 determines the authenticity of the bills being processed. To determine the authenticity of a bill under test, detected data corresponding to one or more attributes associated with the test bill are compared to master data stored in the memory. For example, where the document handling system 10 comprises an authenticator, a stack of bills may be processed and the authenticity of each bill in the stack determined by comparing data generated from each bill to prestored master information to determine whether the prestored attribute(s) match the sensed attribute(s) of the bill. If the detected data from the bill under test sufficiently match the prestored data, a determination of authenticity is made.

According to one embodiment of the authentication mode, the document handling system 10 is designed to accommodate a stack of bills all having the same type and denomination, such as a stack of $10 U.S. bills. In such an embodiment, when a stack of bills is processed by the document handling system 10 the denomination of the bills in the stack is entered into the document handling system 10 via an operator interface panel and subsequent bills are flagged if they are determined not to be genuine bills. The operator interface panel will indicate the aggregate value of the genuine bills and/or the number of genuine bills in the stack. If the system 10 determines that a bill is counterfeit, the transport motor of the document handling system 10 will stop, with the bill being flagged as a counterfeit being the last bill deposited in the output receptacle 117. The document handling system 10 then indicates to the operator that the bill was determined to be a counterfeit. This indication may be accomplished by, for example, illuminating an appropriate light, generating an appropriate sound, and/or displaying an appropriate message on the operator interface panel. Such indication might include, for example, "counterfeit", "failed magnetic test", "failed UV test", "no security thread", etc. The operator may then remove the flagged bill from the output receptacle 117. The document handling system 10 is then started again either automatically or by selecting a "continuation" key, depending on the set-up of the document handling system 10. If, after examination of the flagged bill, it is determined that the bill is not counterfeit, the operator may select the denomination or value key corresponding to the value of the flagged bill in order to add the bill to the count and value totals and resume processing. Upon the completion of processing the entire stack, the operator interface panel will indicate the aggregate value of the genuine bills in the stack and/or the number of genuine bills in the stack. All counterfeit bills will have been set aside and will not be included in the count and/or value totals.

A. Test Sensitivity

According to some embodiments of this invention, the sensitivity employed in the authentication mode may be set at various sensitivity levels in order to perform the standard mode authentication tests. The operator interface panel allows the operator to set various sensitivity levels that correspond to the standard mode authentication tests. For example, in one embodiment, the operator is provided with the ability to select a particular authentication test and adjust the sensitivities of the test chosen. For example, where a UV test is selected, the range of sensitivities can be adjusted from 1 to 10, with 10 being the most sensitive, or the operator may turn one or more of the tests "off" (see Table 1, below). Furthermore, the system 10 may permit sensitivity levels from various tests to be set on a denomination by denomination basis or for groups of denominations such as a low denomination group and a high denomination group. Thus, the system 10 may permit an operator to set the sensitivity for the authentication tests to a low sensitivity for low denominations and to a high sensitivity for high denominations. An example of the above setting options is summarized in Table 1.

TABLE 1

| Mode | UV Test - Lower Sensitivity | UV Test - Upper Sensitivity | Fluorescent Test Sensitivity | Magnetic Test Sensitivity |
|---|---|---|---|---|
| High | Off, 1–10 | Off, 1–10 | Off, 1–10 | Off, 1–10 |
| Low | Off, 1–10 | Off, 1–10 | Off, 1–10 | Off, 1–10 |
| 1,2,5,10,20,50,100 | Off, 1–10 | Off, 1–10 | Off, 1–10 | Off, 1–10 |

According to an alternate embodiment, the above high/low settings are replaced with denomination settings corresponding to the denominations of a particular type of currency system (e.g., $1, $5, $10, $20, $50 and $100).

According to such an embodiment, the operator may then set, for example, the $1 UV tests to sensitivity settings of 2 and the $1 fluorescence test and the $2 V, fluorescence and magnetic test to sensitivity settings of 3, etc. The system 10 selects the appropriate sensitivity setting based on the currency type and denomination being processed and the settings selected by the operator.

In the low sensitivity settings or the low denomination settings (e.g., $1, $5), the authentication tests may be set to relatively low sensitivities (e.g., UV test set at 2, fluorescent test set at 5, and magnetic test set at 3). Conversely, in the high sensitivity settings or the high denomination settings (e.g., $50, $100), the authentication tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreased when processing low value notes where the potential harm or risk in not detecting a counterfeit is lesser and the annoyance of wrongly rejecting genuine notes is greater. Also the UV, fluorescent, and/or magnetic characteristics of genuine notes can vary due to a number of factors such as wear and tear or whether the note has been washed (e.g., with detergents).

Sensitivity settings and UV and fluorescence tests are described in more detail in U.S. Pat. No. 5,790,693, entitled "Currency Discriminator and Authenticator", commonly owned herewith which is incorporated herein by reference. For example, this patent describes an apparatus for performing UV and fluorescence tests. According to such tests and with respect to U.S. currency, the UV and fluorescent thresholds associated with each of the ten sensitivity levels may be set, for example, shown in Table 2. Table 2 gives but one example; other values may be used without departing from the invention.

TABLE 2

| Sensitivity Level | UV Test - Lower (Volts) | UV Test - Upper (Volts) | Fluorescence Test (Volts) |
|---|---|---|---|
| 1 | 0.200 | 2.200 | 0.800 |
| 2 | 0.325 | 2.100 | 0.600 |
| 3 | 0.450 | 2.000 | 0.400 |
| 4 | 0.550 | 1.900 | 0.200 |
| 5 | 0.600 | 1.800 | 0.150 |
| 6 | 0.650 | 1.700 | 0.100 |
| 7 | 0.700 | 1.600 | 0.090 |
| 8 | 0.750 | 1.500 | 0.080 |
| 9 | 0.800 | 1.450 | 0.070 |
| 10 | 0.850 | 1.400 | 0.060 |

Although the UV and fluorescence threshold data associated with sensitivity levels 1 to 10 in Table 2 are derived with respect to U.S. currency, it will be appreciated that the sensitivity levels may be appropriately selected or varied as desired to authenticate foreign currency or other documents having known reflectance characteristics.

B. Authentication Tests

1. Magnetic

Several documents describing detecting the magnetic characteristics of a document for authenticating the document include: U.S. Pat. No. 3,280,974 [detection of patterns of changes in magnetic flux], U.S. Pat. No. 3,870,629 [patterns of vertical grid lines in the portrait area of bills], U.S. Pat. No. 4,617,458 [the total amount of magnetizable material of a bill], U.S. Pat. No. 4,593,184 [patterns from sensing the strength of magnetic fields along a bill], and U.S. Pat. No. 4,356,473 [sensing different portions of the bill such as the area in which the denomination is written out]. Additionally, the above-referenced U.S. Pat. No. 5,790,693 entitled "Currency Discriminator and Authenticator" and U.S. patent application Ser. No. 08/800,053 entitled "Method and Apparatus for Document Identification and Authentication" filed Feb. 14, 1997 both of which are assigned to the assignee of the present application describe the employment of magnetic sensing. The later application contains a description of the use of magnetoresistive sensors. Each of the aforementioned patents and applications assigned to the assignee of this application and relating to types of sensing are incorporated herein by reference.

For example, Table 3 gives examples of relative total magnetic content thresholds for various denominations of U.S. genuine bills as described in U.S. Pat. No. 5,790,693 referred to above.

TABLE 3

| Denomination | Sensitivity 1 | 2 | 3 | 4 | 5 |
|---|---|---|---|---|---|
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Columns 1–5 of Table 3 represent varying degrees of sensitivity selectable by a user of a device employing the present invention. The values in Table 3 are set based on the scanning of genuine bills of varying denominations for total magnetic content and setting required thresholds based on the degree of sensitivity selected. The information in Table 3 is based on the total magnetic content of a genuine $1 being 1000. The following discussion is based on a sensitivity setting of 4. If a processed bill is indicated or determined to be a $10 bill, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

Other characteristics or attributes of documents such as currency bills may also be detected, for example:

a. Seal Detection

Several patents describing detecting the seal of a document for authenticating the document include: U.S. Pat. Nos. 3,966,047; 4,114,804 and 4,283,708, to which reference is invited in this regard.

b. Security Thread

Several patents describing detecting the presence and location of the security thread in a document include: U.S. Pat. Nos. 5,151,607; 5,122,754 and 5,465,301, to which reference is invited in this regard. Another example of a security thread sensor is available from WHD Industries, located in Germany, part number 88966.

2. Optical

Several patents describing detecting the optical characteristics of a document for authenticating the document include: U.S. Pat. Nos. 3,496,370; 3,679,314; 3,870,629 and 4,179,685 [sensing patterns of reflectance and transmission], to which reference is invited in this regard.

Various optical detection techniques may also be used to detect various attributes or characteristics of documents such as currency bills, for example:

a. Size (Length/Width)

In addition to sensing described above, the document handling system 10 may determine the size of a currency bill. In the below discussion, the "X" dimension of a bill is the dimension of a bill that is perpendicular to the direction of bill movement. The "X" dimension is generally the long dimension of a bill. Conversely, the "Y" dimension of a bill is the dimension of a bill parallel to the direction of bill movement and is generally the narrow dimension of the bill. Bills are generally transported with their narrow dimension parallel to the direction of bill movement.

Figure 18:
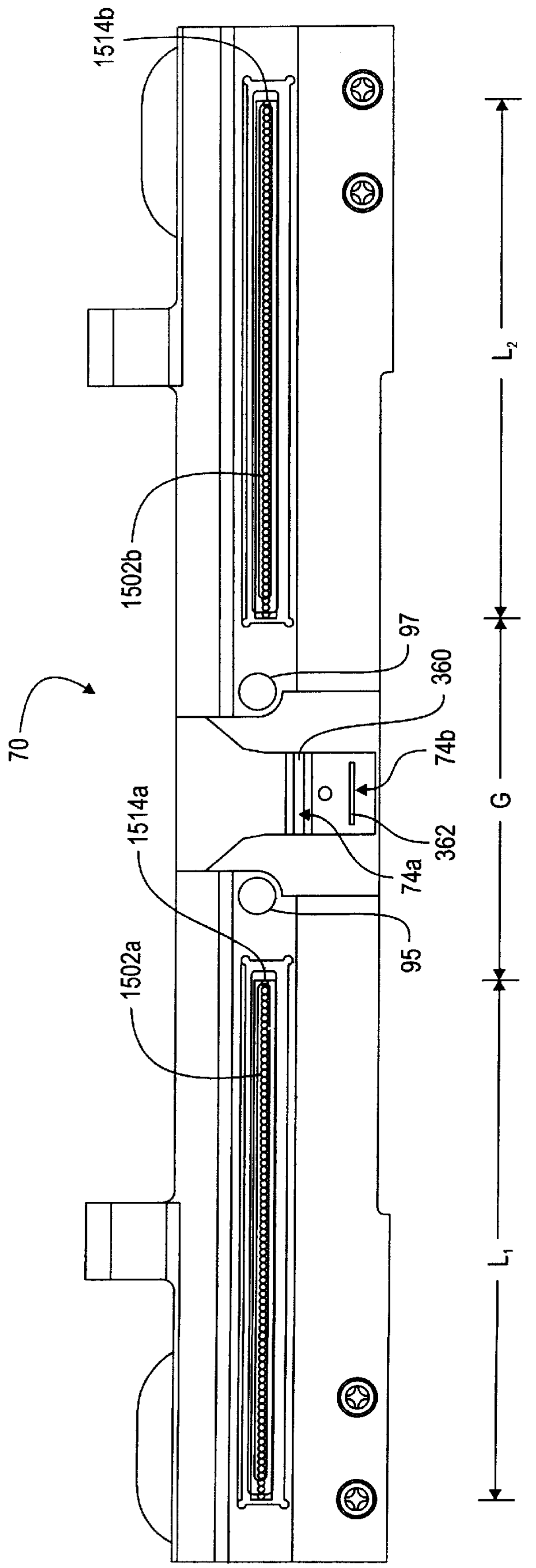
FIG. 18 is a bottom view of the scanhead containing "X" and "Y" size detecting and doubles detecting sensors.
Figure 20:
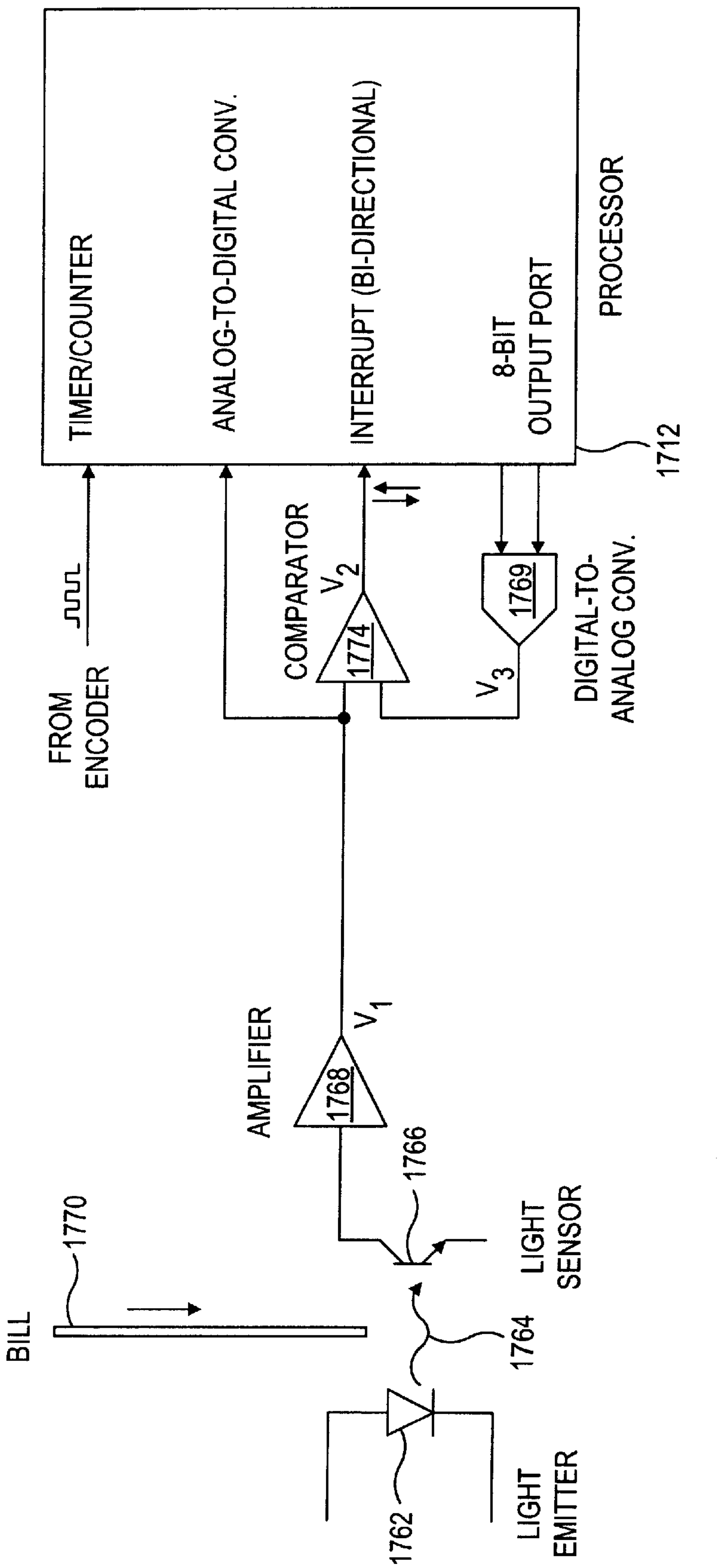
FIG. 20 is a block diagram of a digital size detection circuit for measuring the "Y" dimension of a bill.
Figure 22:
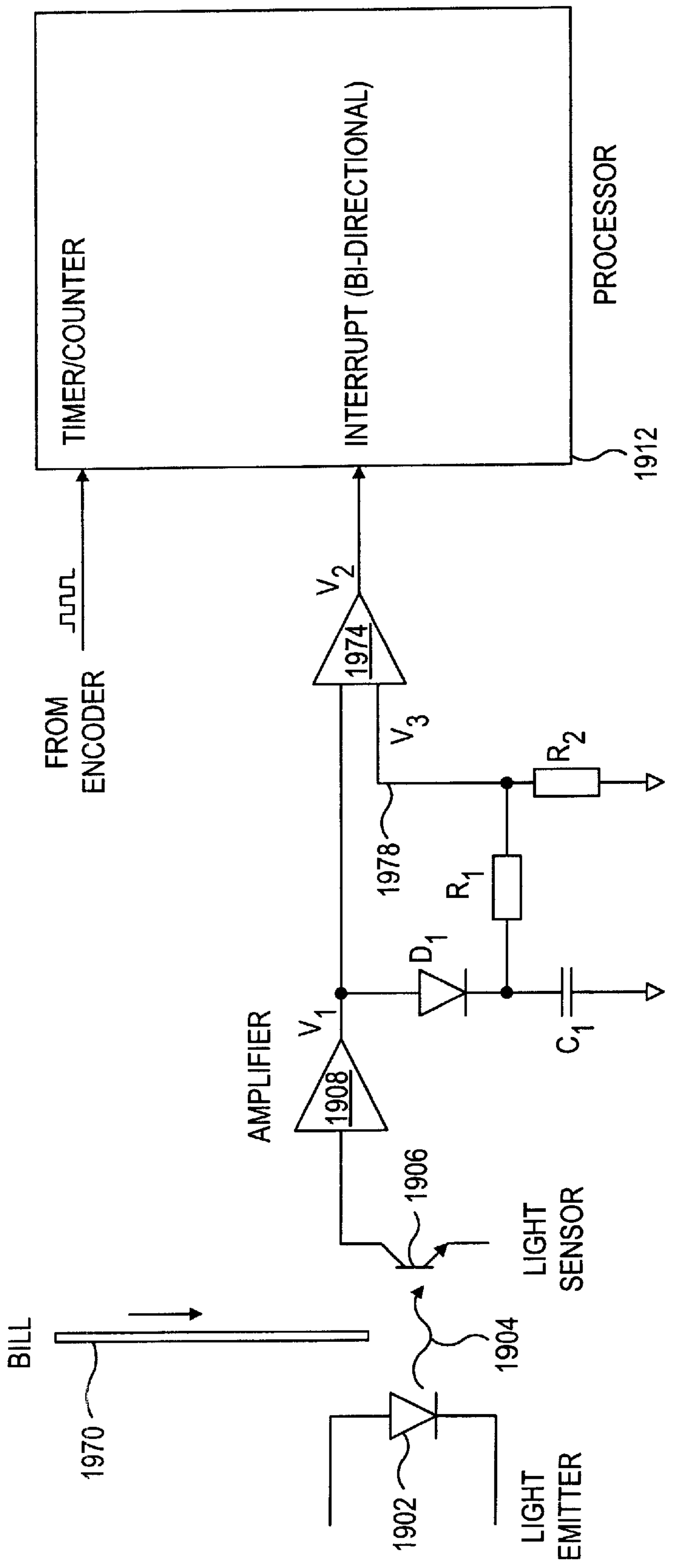
FIG. 22 is a block diagram of an analog size detection circuit for measuring the "Y" dimension of a bill.

The "X" size dimension of a currency bill is determined by reference to FIG. 18 which illustrates a bottom view of a scanhead 70 for optically sensing the size and/or position of a currency bill under test. Such a scanhead is described in U.S. patent application Ser. No. 09/799,261 entitled "Color Scanhead And Document handling system Employing The Same" and filed on Mar. 5, 2001 and assigned to the assignee of the present application. The scanhead 70 may be used alternatively or in addition to any of the other sensing systems heretofore described. The scanhead 70, like the circuits of FIGS. 20 and 22, is particularly useful in foreign markets in which the size of individual bills varies with their denomination. The scanhead 70 is also useful in applications which require precise bill position information such as, for example, where a bill attribute is located on or in the bill (e.g., color, hologram, security thread, etc.).

The scanhead 70 includes two photo-sensitive linear arrays 1502*a*, 1502*b*. Each of the linear arrays 1502*a*, 1502*b*, consists of multiple photosensing elements (or "pixels") aligned end-to-end. The arrays 1502*a*, 1502*b*, having respective lengths L1 and L2, are positioned such that they are co-linear and separated by a gap "G." In one embodiment, each linear array 1502*a* and 1502*b* comprises a 512-element Texas Instruments model TSL 218 array, commercially available from Texas Instruments, Inc., Dallas, Tex. In the TSL 218 arrays, each pixel represents an area of about 5 mils in length, and thus the arrays 1502*a*, 1502*b* have respective lengths L1 and L2 of 2.5 inches. In one embodiment, the gap G between the arrays is about 2 inches. In this embodiment, therefore, the distance between the left end of array 1502*a* and the right end of array 1502*b* is seven inches (L1+L2+G), thus providing the scanhead 70 with the ability to accommodate bills of at least seven inches in length. It will be appreciated that the scanhead 70 may be designed with a single array and/or may use array(s) having fewer or greater numbers of elements, having a variety of alternative lengths L1 and L2 and/or having a variety of gap sizes (including, for instance, a gap size of zero).

The arrays 1502*a*, 1502*b* of the scanhead assembly 70 are positioned adjacent the transport path. A light source (not shown), which may comprise a pair of fluorescent light tubes, is positioned on the opposite side of the transport path across from the scanhead 70. The individual pixels in the arrays 1502*a*, 1502*b* are adapted to detect the presence or absence of light transmitted from the light source. In one embodiment, gradient index lens arrays 1514*a*, 1514*b*, manufactured by NSG America, Somerset, N.J., part no. SLA-20B144-570-1-226/236, are mounted between the light source and the respective sensor arrays 1502*a*, 1502*b*. The gradient index lens arrays 1514*a*, 1514*b* maximize the accuracy of the scanhead 70 by focusing light from the light source onto the photo-sensing elements and filtering out extraneous light and reflections, which may otherwise adversely affect the accuracy of the scanhead 70. Alternatively, less accurate but relatively reliable measurements may be obtained by replacing the gradient index lens arrays 1514*a*, 1514*b* with simpler, less expensive filters such as, for example, a plate (not shown) with aligned holes or a continuous slot allowing passage of light from the light source to the arrays 1502*a*, 1502*b*.

Figure 19:
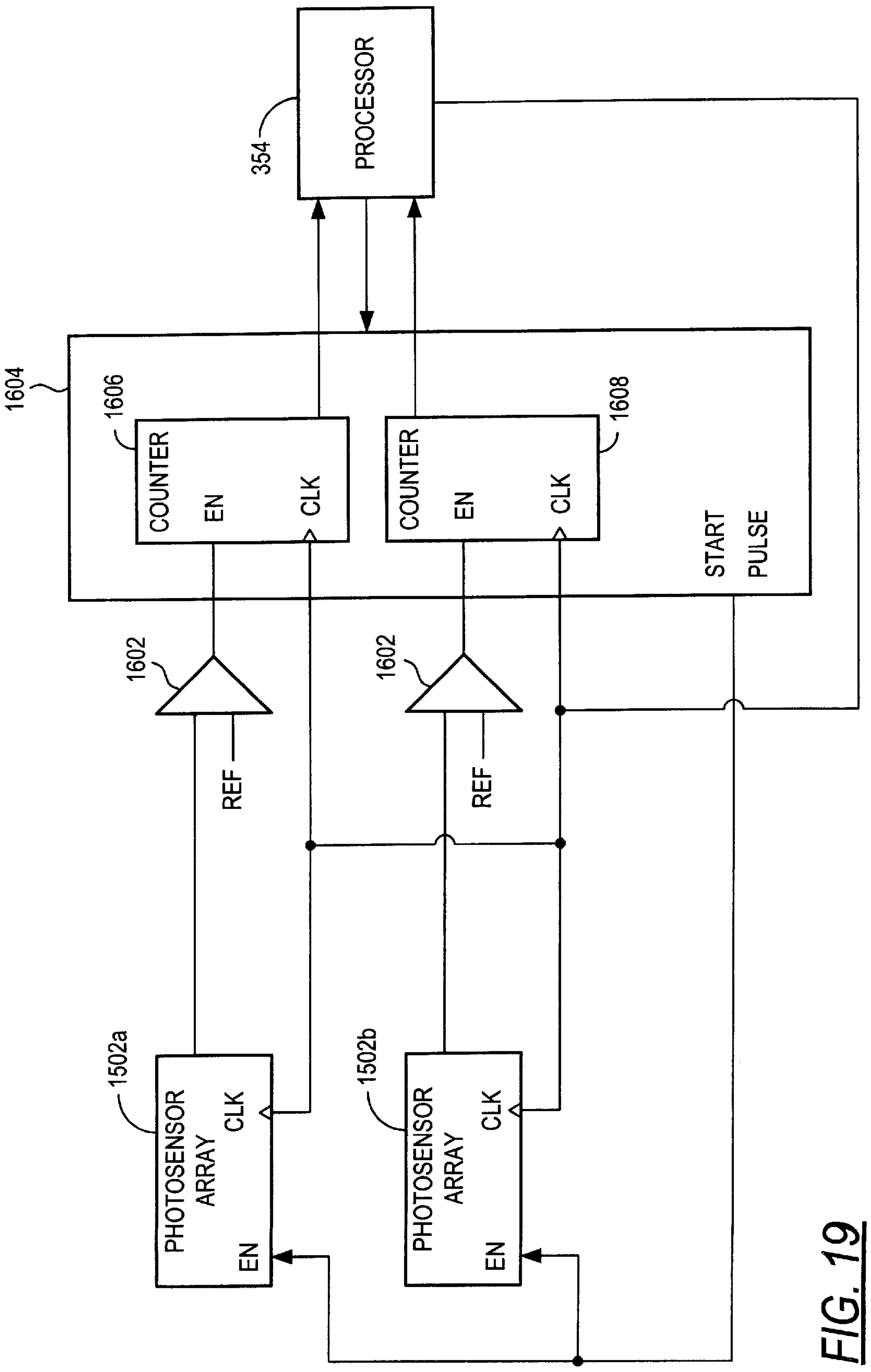
FIG. 19 is a block diagram of a size detection circuit for measuring the "X" dimension of a bill.

When no bill is present between the light source and the arrays 1502*a*, 1502*b*, all of the photo-sensing elements are directly exposed to light. When a currency bill is advanced along the transport path between the light source and the arrays 1502*a*, 1502*b*, a certain number of the photo-sensing elements will be blocked from light. The number of pixels blocked from light will determine the length of the bill. Specifically, in one embodiment, the size of the long dimension of the bill is determined by the circuit of FIG. 19. There, the two photosensor arrays 1502*a*, 1502*b* are connected to two comparators 1602. Each photosensor array is enabled by a start pulse from a Programmable Logic Device (PLD) 1604. The clock pin (CLK) of each array is electrically connected to the CLK inputs of right and left counters, 1606 and 1608, in the PLD 1604. Each comparator 1602 is also electrically connected to a source of a reference signal. The output of each comparator 1602 is electrically connected to the enable (EN) inputs of the counters 1606 and 1608. The PLD 1604 is controlled by the processor 354. The circuit of FIG. 19 is asynchronous.

The size of a bill is determined by sampling the outputs of the counters 1606 and 1608 after the leading edge of the bill is approximately one inch past the arrays 1502*a*, 1502*b*. The counters 1606 and 1608 count the number of uncovered pixels. The long dimension of the bill is determined by subtracting the number of uncovered pixels in each array from 511 (there are 512 pixels in each array 1502*a*, 1502*b*and the counters 1606 and 1608 count from 0 to 511). The result is the number of covered pixels, each of which has a length of 5 mils. Thus, the number of covered pixels times 5 mils, plus the length of the gap G, gives the length of the bill.

The system 10 also provides bill position information and fold/hole fitness information by using the "X" dimension sensors. These sensors can detect the presence of one or more holes in a document by detecting light passing through the document. And, as described more fully below, these sensors can also be used to measure the light transmittance characteristics of the document to detect folded documents and/or documents that are overlapped.

The "Y" dimension is determined by the optical sensing system of FIG. 20, which is shown determining the narrow dimension of a currency bill 1770 under test. This size detection system includes a light emitter 1762 which sends a light signal 1764 toward a light sensor 1766. According to one embodiment, sensor 1766 corresponds to sensors 95 and 97 of FIG. 18. The sensor 1766 produces a signal which is amplified by amplifier 1768 to produce a signal V1 proportional to the amount of light passing between the emitter and sensor. A currency bill 1770 is advanced across the optical path between the light emitter 1762 and light sensor 1766, causing a variation in the intensity of light received by the sensor 1766. As will be appreciated, the bill 1770 may be advanced across the optical path along its longer dimension or narrow dimension, depending on whether it is desired to measure the length or width of the bill 1770.

Figure 21:
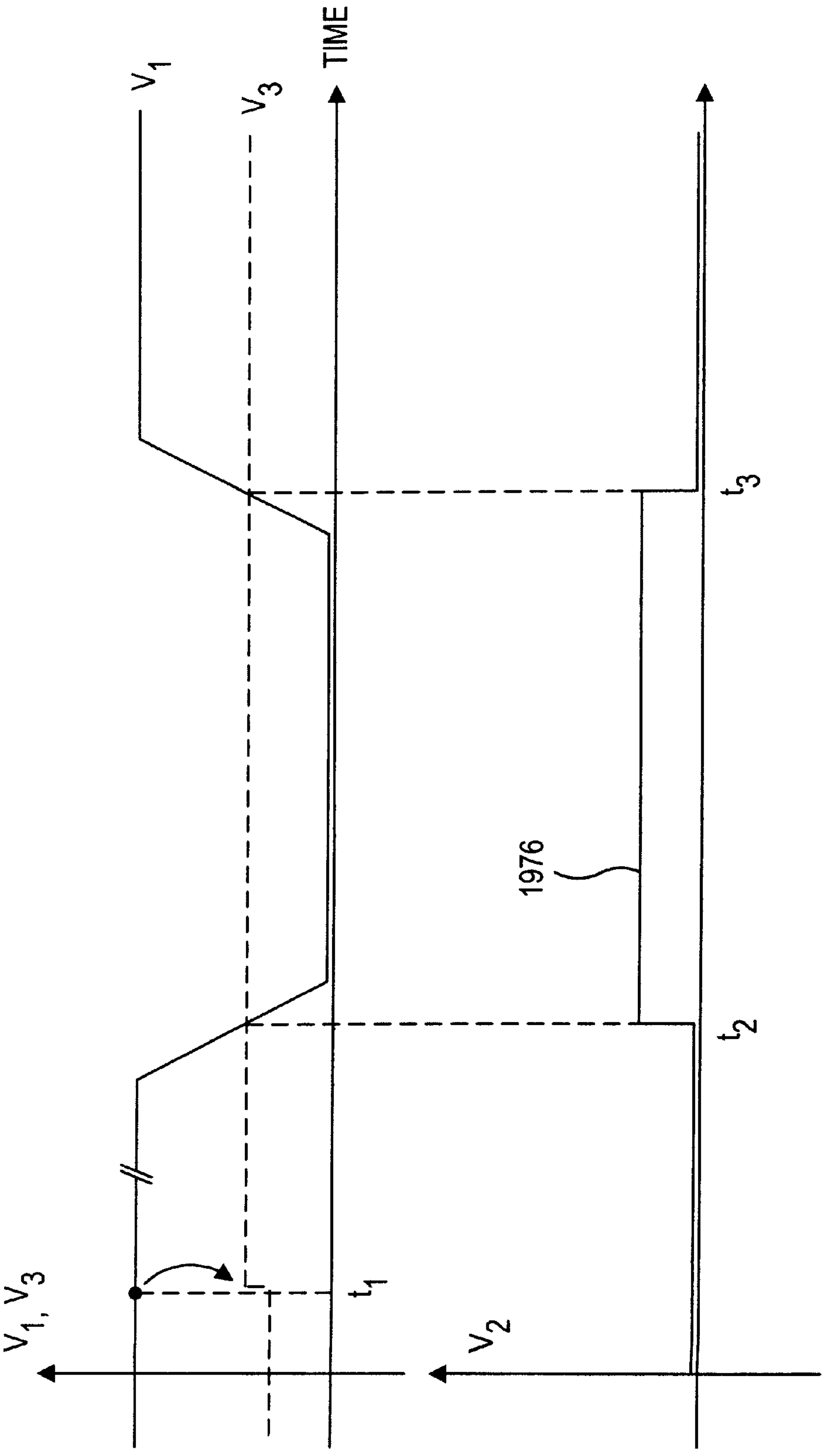
FIG. 21 is a timing diagram illustrating the operation of the size detection circuit of FIG. 20.

Referring also to the timing diagram of FIG. 21, at time $t_1$ before the bill 1770 has begun to cross the path between the light emitter 1762 and sensor 1766, the amplified sensor signal $V_1$ is proportional to the maximum intensity of light received by the sensor 1766. The signal $V_1$ is digitized by an analog-to-digital converter and provided to the processor 1712 (which may be processor 354), which divides it by two to define a value $V_{1/2}$ equal to one-half of the maximum value of $V_1$. The value $V_{1/2}$ is supplied to a digital-to-analog converter 1769 to produce an analog signal $V_3$ which is supplied as a reference signal to a comparator 1774. The other input to the comparator 1774 is the amplified sensor signal $V_1$ which represents the varying intensity of light received by the sensor 1766 as the bill 70 crosses the path between the emitter 1762 and sensor 1766. In the comparator 74, the varying sensor signal $V_1$ is compared to the reference signal $V_3$, and an output signal is provided to an interrupt device whenever the varying sensor signal $V_1$ falls above or below the reference $V_3$. Alternatively, the system could poll the sensors periodically, for example, every 1 ms.

As can be seen more clearly in the timing diagram of FIG. 21, the interrupt device produces a pulse 1976 beginning at time $t_2$ (when the varying sensor signal $V_1$ falls below the $V_3$ reference) and ending at time $t_3$ (when the varying sensor signal $V_1$ rises above the $V_3$ reference). The length of the pulse 1976 occurring between times $t_2$ and $t_3$ is computed by the processor 1712 with reference to a series of timer pulses from an encoder. More specifically, at time $t_2$, the processor 1712 begins to count the number of timer pulses received from the encoder, and at time $t_3$ the microprocessor stops counting. The number of encoder pulses counted during the interval from time $t_2$ to time $t_3$ represents the width of the bill 1770 (if fed along its narrow dimension) or length of the bill 1770 (if fed along its longer dimension).

It has been found that light intensity and/or sensor sensitivity will typically degrade throughout the life of the light emitter 1762 and the light sensor 1766, causing the amplified sensor signal $V_1$ to become attenuated over time. The signal $V_1$ can be further attenuated by dust accumulation on the emitter or sensor. One of the advantages of the above-described size detection method is that it is independent of such variations in light intensity or sensor sensitivity. This is because the comparator reference $V_3$ is not a fixed value, but rather is logically related to the maximum value of $V_1$. When the maximum value of $V_1$ attenuates due to degradation of the light source, dust accumulation, etc., $V_3$ is correspondingly attenuated because its value is always equal to one-half of the maximum value of $V_1$. Consequently, the width of the pulse derived from the comparator output with respect to a fixed length bill will remain consistent throughout the life of the system, independent of the degradation of the light source 1762 and sensor 1766.

FIG. 22 portrays an alternative circuit which may be used to detect the "Y" dimension of a currency bill under test. In FIG. 22, the method of size detection is substantially similar to that described in relation to FIG. 20 except that it uses an analog method of deriving the signal $V_3$ input to the comparator 1974. A diode $D_1$ is connected at one end to the output of the amplifier 68 and at another end to a capacitor $C_1$ connected to ground. A resistor $R_1$ is connected at one end between the diode $D_1$ and the capacitor $C_1$. The other end of the resistor $R_1$ is connected to a resistor $R_2$ in parallel with the reference input 1978 of the comparator 1974. If $R_1$ and $R_2$ are equal, the output voltage $V_3$ on the reference input 1978 will be one-half of the peak voltage output from the amplifier 1908, if the voltage drop across the diode is negligible. In the comparator 1974, the varying sensor signal $V_1$ is compared to the output voltage $V_3$, and an output signal is provided to an interrupt device whenever the varying sensor signal $V_1$ falls above or below the $V_3$ reference. Thereafter, a pulse 1976 is produced by the interrupt device, and the length of the pulse 1976 is determined by a processor 1912 in the same manner described above. In the circuit of FIG. 22, as in the circuit of FIG. 20, the signal $V_2$ is proportional to $V_1$, and the widths of pulses derived from the comparator output are independent of the degradation of the light source 1902 and sensor 1906.

b. Fold/Hole Detection

As mentioned above, in addition to detecting the size of the currency bills, the document handling system 10 may include a system for detecting folded or damaged bills. Two photosensors are used to detect the presence of a folded document or the presence of a document having hole(s) therein, by measuring the light transmittance characteristics of the document(s). These two photosensors may comprise the above-described "X" sensors 1502*a,b* which are located on a common tranverse axis that is perpendicular to the direction of bill flow. Since these photosensors 1502*a*, 1502*b* include a plurality of photosensing elements or pixels positioned directly opposite a pair of light sources on the other side of the bill transport path, they detect whether a pixel is covered or exposed to light from the light sources. The output of the photosensors can therefore be used to determine the presence of folded bills and/or damaged bills such as bills having holes or otherwise missing a portion of the bill. For example, by using the "X" sensors, a folded bill can be detected in either of two ways. The first way is to store the size of an authentic bill and then detect the size of the bill being processed by counting the number of blocked pixels. If the size is significantly less than the stored size, the system determines that the bill is folded. The second way is to detect the amount of light transmitted through the bill to determine the extent of the fold and where the fold stops. Using the second method, the size of the bill can also be determined.

c. Doubles Detection

Several patents describing detecting the density of a document, i.e., whether two or more bills are overlapped include: U.S. Pat. No. 4,381,447 [sensing patterns of reflectance and density]; U.S. Pat. No. 5,295,196 (CUMM) [doubles detection] and U.S. Pat. No.5,790,693 (CUMM) [doubles detection]. Also U.S. patent application Ser. No. 60/078/693 entitled "Color Scanhead And Document handling system Employing The Same" and filed on Mar. 17, 1998 and assigned to the assignee of the present application describes an optical scanhead and method for measuring density. The relevant portions of the latter two patents and applications are incorporated herein by reference.

Doubling or overlapping of bills is detected by photosensors such as the "Y" sensors 95, 97, which are located on a common transverse axis that is perpendicular to the direction of bill flow. These photosensors are positioned directly opposite a pair of light sources on the other side of the bill transport path, and detect transmitted light from the light sources and generate analog outputs which correspond to the sensed light that passes through the bill. Each such output is converted into a digital signal by a conventional ADC converter unit whose output is fed as a digital input to and processed by the system processor 354.

The presence of a bill adjacent the photosensors 95 and 97 causes a change in the intensity of the detected light, and the corresponding changes in the analog outputs of the photosensors 95 and 97 serve as a convenient means for density-based measurements for detecting the presence of "doubles" (two or more overlaid or overlapped bills) encountered during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

d. Thickness

Several patents describing detecting the thickness of a document for authenticating the document include: U.S. Pat. Nos. 4,255,651 and 3,764,899, the relevant descriptive parts of which are incorporated herein by reference.

e. Holes

In order to determine the fineness of a particular document, the system 10 can be used to detect the presence of holes in the document. Holes can be detected by, for example, using the "X" sensors referred to above in connection with FIG. 18 to detect light passing through the document. One prior patent describing detecting holes in a document is U.S. Pat. No. 4,381,447, to which reference is invited in this regard.

f. UV

Several patents describing detecting the ultraviolet characteristics of a document for authenticating the document include: U.S. Pat. Nos. 5,640,463, 5,790,693. The relevant descriptive portions of each of the aforementioned patents relating to UV types of sensing are incorporated herein by reference.

g. Fluorescence

Several patents describing detecting the ultraviolet characteristics of a document for authenticating the document include: U.S. Pat. Nos. 5,640,463 and 5,790,693. The relevant descriptive portions of each of the aforementioned patents relating to fluorescence types of sensing are incorporated herein by reference.

h. Color

Several patents describing the detection of color for authenticating a document include: U.S. patent application Ser. No. 09/799,261 entitled "Color Scanhead And Document handling system Employing The Same" and filed on Mar. 5, 2001 and assigned to the assignee of the present application (and attached hereto as an appendix), U.S. Pat. Nos. 4,490,846; 3,496,370; 3,480,785; 4,841,358; 4,658,289; 4,716,456; 4,825,246; and 4,992,860 and European Patent No. EP 325,364, to which reference is invited in this regard. The relevant descriptive portions of the aforementioned application are incorporated herein by reference.

i. Color Shifting Ink

Color shifting ink is a new security feature for the new U.S. $100 notes. On the new $100 bill, the number in the lower right corner on the front of the note looks green when viewed straight on, but appears black when viewed at an angle. To print notes having the color shifting feature, optically variable ink is used. Optically variable ink comprises a liquid printing ink containing small optically variable flakes. A document directed toward reading and verifying currency having color shifting ink is Japanese Patent Application No. JP 9062894 A, reference to the relevant descriptive portions of which is invited.

Other attributes or characteristics of documents such as currency bills may be used as follows:

3. Watermark

Patents describing detecting a watermark for authenticating a document are U.S. Pat. Nos. 5,122,754; 4,236,639 and 3,782,543, reference to the relevant descriptive portions of which is invited.

4. Holograms

Holograms are another security feature used on documents. Patents describing detecting holograms are: U.S. Pat. Nos. 4,544,266 and 5,101,184, reference to the relevant descriptive portions of which is invited.

5. Kintograms

Kintograms are another security feature used on documents. Patents describing detecting kintograms are: U.S. Pat. Nos. 4,544,266 and 5,101,184, reference to the relevant descriptive portions of which is invited.

6. Limpness

Patents describing detecting the limpness of a document to authenticate the document is U.S. Pat. No. 4,381,447, reference to the relevant descriptive portions of which is invited.

7. Miscellaneous Tests

Patents describing detecting miscellaneous attributes include: U.S. Pat. No. 3,815,021 [dielectric properties], U.S. Pat. No. 5,465,301 [threads incorporating thermochromatic materials], U.S. Pat. No. 3,815,021 [capacitive sensing of dielectric properties], U.S. Pat. Nos. 5,119,025, 4,683,508, 4,413,296, 4,388,662, and 4,164,770 [magnetoresistive sensors]. Another example of a magnetoresistive sensor that may be used is the Gradiometer available from NVE Nonvolatile Electronics, Inc., Eden Prairie, Minn. Additionally, other types of magnetic sensors may be employed for detecting magnetic flux such as Hall effect sensors and flux gates. Reference to the relevant descriptive portions of each of the aforementioned patents is invited.

Whatever of the above-discussed authentication test(s) are employed, the test data representing the selected attribute (s) of the bills being processed is compared by the processor 354, in FIG. 3, to master information associated with the selected attribute(s) to determine the authenticity of the bills, based on selected sensitivity levels, as described above in relation to the standard mode. More than one attribute or type of sensing may be used to evaluate a given bill. For example, in an embodiment utilizing size detection to provide an initial determination of the type, denomination, or authenticity of a bill, characteristic data associated with attributes other than size may be used to subsequently verify the initial determination.

In one embodiment of the present invention, the operator interface panel is used to select the sensor(s) 320 that will be used to obtain characteristic information from a particular bill. For example, because German deutsche marks vary in size according to denomination, an operator processing German deutsche marks may choose sensors that detect the size of a bill in order to evaluate, authenticate or otherwise process the bill. In another embodiment of this invention, the document handling system 10 automatically selects a particular sensor or sensors and authentication method(s) depending upon the currency type and denomination selected by the operator. For example, if German currency were selected, the size sensors could automatically be selected.

V. Embodiments of Operator Interface Panels

Several embodiments of an operator interface panel are illustrated in FIGS. **4*a*–13. The operation of the operator interface panel 400 will now be described in more detail in conjunction with FIG. 4*a* which illustrates a front view of the operator interface panel 400. In the illustrated embodiment of FIG. 4*a*, a keypad 462 allows an operator to enter operating parameters such as, for example, the type of currency system, the denomination of the bills to be processed, the mode of operation, and/or the authentication test(s). Various operating parameters, instructions, and/or count totals are communicated to the operator via a display 463 such as the type and denomination of bills being processed, the status of the document handling system 10, the mode of operation, the transport speed, the total number of bills counted, and/or the total value of the bills counted. The display 463 may comprise, for example, a liquid crystal display (LCD) 467**.

The keypad 462 comprises a plurality of selection elements or keys including a plurality of value selection elements 464*a–f*, each associated with a denomination value of the selected type of currency system. The operator interface panel 400 also comprises a plurality of parameter scroll keys 465*a–i* for permitting the operator to manually select various operating parameters including, for example, the mode of operation, the denomination, the authentication test, the test sensitivity settings, and/or the transport speed desired based on the type and denomination of the stack of bills to be processed.

For example, the keypad 462 also comprises a "START" selection element 465*a* for starting the document handling system 10; a "MODE" selection element 465*b* for selecting the mode of operation and currency type; and a "VALUE" selection element 465*c* for scrolling through the denominations available for the designated currency system. For example, to select the currency type, the operator first repeatedly depresses the "MODE" key 465*b* to scroll the cursor 470 through the displayed list of modes of operation and currency systems available. To select the type of currency system, the operator scrolls through the list of available currency systems until the desired currency system is displayed on display 463. According to one embodiment, one currency system is displayed at a time. Depressing the mode key 465*b* causes the display to change to the next currency system. Whichever currency system is displayed constitutes the currently selected or designated currency system. According to another embodiment, as depicted in FIG. 4*a*, multiple currency systems are displayed at a time. A cursor 470 indicates which currency system is the currently selected currency system, i.e., Canada as shown in FIG. 4*a*. Depressing the mode key causes the cursor to move to the next currency system thereby selecting it. Repeatedly depressing the mode key 465*b* can also cause additional currency system to become displayed.

Once the appropriate currency system is selected, the desired denomination corresponding to the designated type of currency system may be selected by selecting the appropriate "VAL" key 464*a–f* or by repeatedly depressing the "VALUE" key 465*c* to scroll the cursor 470 through the corresponding denominations. For example, if U.S. currency was designated, the "VAL" selection elements 464*a–d* would correspond to $1, $2, $5, and $10, respectively. "VAL" selection element 464*e* would correspond to $20 and $50, $20 being displayed if selection element 464*e* were selected once, $50 being displayed if selection element 464*e* were selected twice. "VAL" selection element 464*f* would correspond to $100. Similarly, if a foreign currency system were selected, the value selection elements 464*a–f* would correspond to the denomination values of the particular type of currency system designated.

The keypad 462 further comprises a "BATCH" selection element 465*d* for selecting a batch mode of operation. The batch mode allows a plurality of stacks of documents to be processed without automatically clearing the counter. Therefore, several stacks of a particular type of currency system can be processed to determine the total count and the total value of the bills in the stacks. The keypad 462 also includes an "ADD" selection element 465*e* that allows an operator to add a bill flagged as a suspected counterfeit to the count and value totals and restart the system 10 if the operator determines that the flagged bill is authentic.

The keypad 462 further comprises a "CF" selection element 465*f* for selecting the counterfeit detection or authentication mode and adjusting the authentication test sensitivity settings. The sensitivity level and authentication test(s) are selected by depressing the "CF" selection element 465*f* once to select between High, Medium or Low sensitivity for a particular denomination of currency. By depressing and holding down the "CF" selection element 465*f*, the operator may enable and disable authentication test(s) and select the sensitivity level desired for each of the authentication test(s) enabled. In authentication mode, the types of authentication test(s) to be performed on the bills can be chosen. Each authentication test detects different attribute(s) or characteristic(s) of the bills. Bills are then evaluated, authenticated or otherwise processed by comparing the data corresponding to the detected attribute(s) of the bills to corresponding master information. The attributes that may be selected for authentication may include, for example, data corresponding to the size, magnetic content, UV reflectance levels, fluorescence, density, security thread content, color shifting ink characteristics, hologram, kintogram and/or watermark of the bill. For example, if master information corresponding to several attributes of a particular denomination and currency type is stored in memory, an operator may choose, in authentication mode, authentication based on one or more of these attributes. Thus, in a document handling system including optical and magnetic sensors capable of measuring a variety of attributes, an operator may choose an authentication test that measures only a particular attribute or sub-combination of attributes. For example, when size is used as a means of authenticating bills, the system 10, according to some embodiments, detects the size of the processed bills and makes at least an initial determination of whether the bills are authentic by comparing the detected size with the size of authentic bills.

The keypad 462 also includes a "SD" selection element 465*g* for selecting the size detection mode. Because some foreign currency denominations vary in size, in size detection mode, the system 10 can determine the denomination of a stack of bills by detecting the size of bills such as the first bill in the stack.

The keypad 462 also comprises a "DENSITY" selection element 465*h* for selecting the density or doubles detection mode which detects the presence of two documents where one is on top of, or overlapping, the other. The keypad 462 further comprises a "SPEED" selection element 465*i* for selecting a transport speed. According to one embodiment, the system 10 has three programmable transport speeds ranging between 600–1502a, 1502b bills per minute that can be defined by the operator. The system 10 defaults to a speed of 1200 bills per minute if no transport speed is selected by the operator. The desired transport speed may be selected by repeatedly depressing the "SPEED" key 465*i* to scroll through a list of transport speeds available for the designated type of currency system and denomination.

According to some embodiments, operating parameters may be manually selected by scroll through corresponding lists of options. Alternatively in some embodiments, the operating parameters may be automatically set based on the selected currency system and denomination.

Figure 4B:
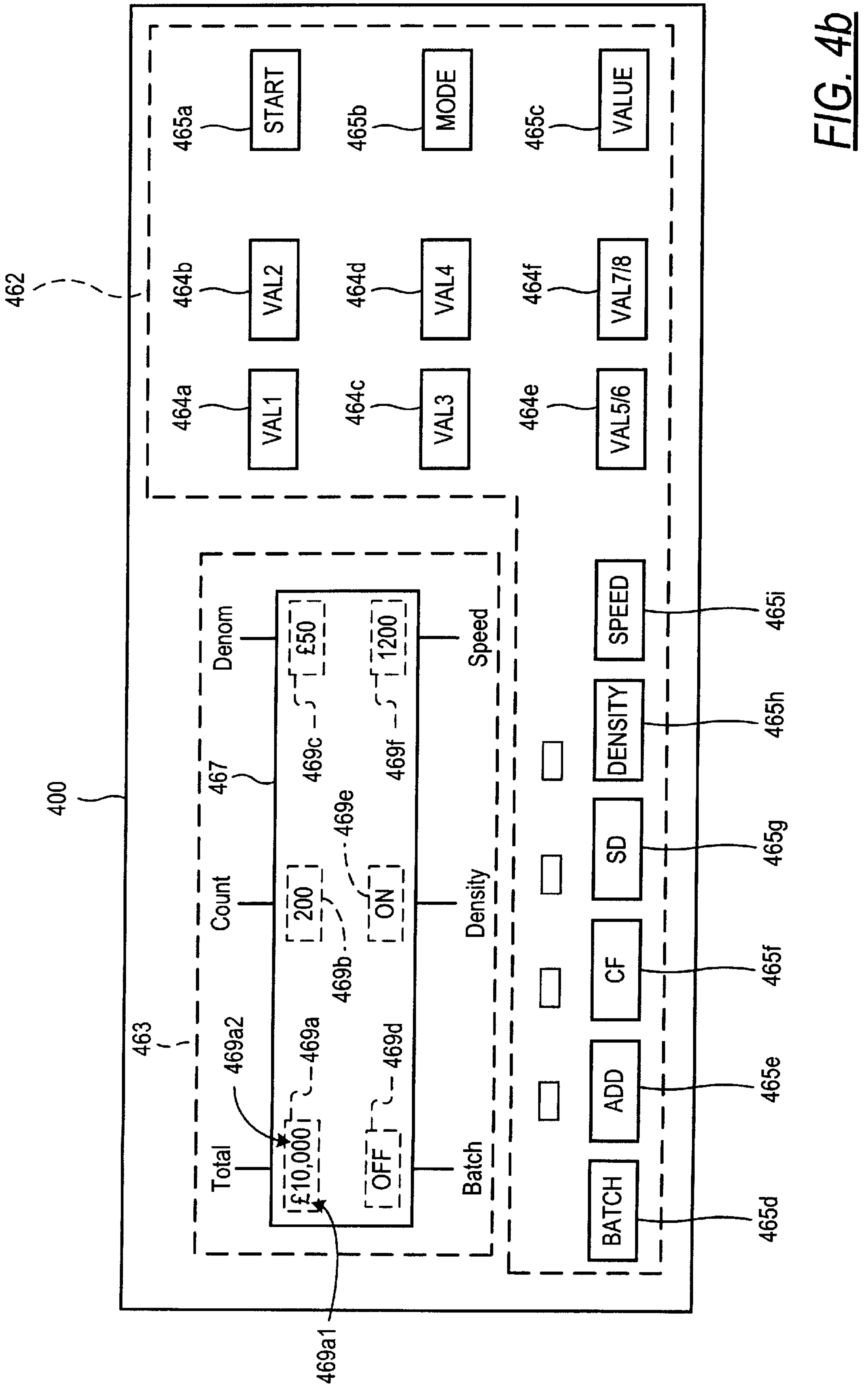

As illustrated in FIG. 4*b*, the operator interface panel 400 of FIG. 4*a* is shown displaying new information. In this embodiment, the display 463 includes six fields: a total field 469*a*, a count field 469*b*, a denomination field. 469*c*, a batch field 469*d*, a density field 469*e*, and a speed field 469*f*. The total field 469*a* comprises a symbol field 469*a*1 and a value field 469*a*2. The total field 469*a* displays the total value of the bills processed. In the illustrated embodiment, the symbol field 469*a*1 displays the British pound symbol "£" and the value field 469*a*2 displays "10,000", these fields correspond to the total value of the bills counted. The count field 469*b* displays "200" which corresponds to the number of bills counted by the system 10. The denomination field 469*c* indicates the currency system (by symbol) and denomination of bills being processed. In the illustrated embodiment, the denomination field 469*c* displays "£50" which corresponds to the currency type and denomination being processed by the system 10. The batch field 469*d* displays "OFF" which informs the operator that the batch mode of operation is not activated. The density field 469*e* displays "ON" which informs the operator that the density detection mode is activated. The speed field 469*f* displays "1200" which informs the operator that the transport speed is set to 1200 bills per minute.

Figure 5A:
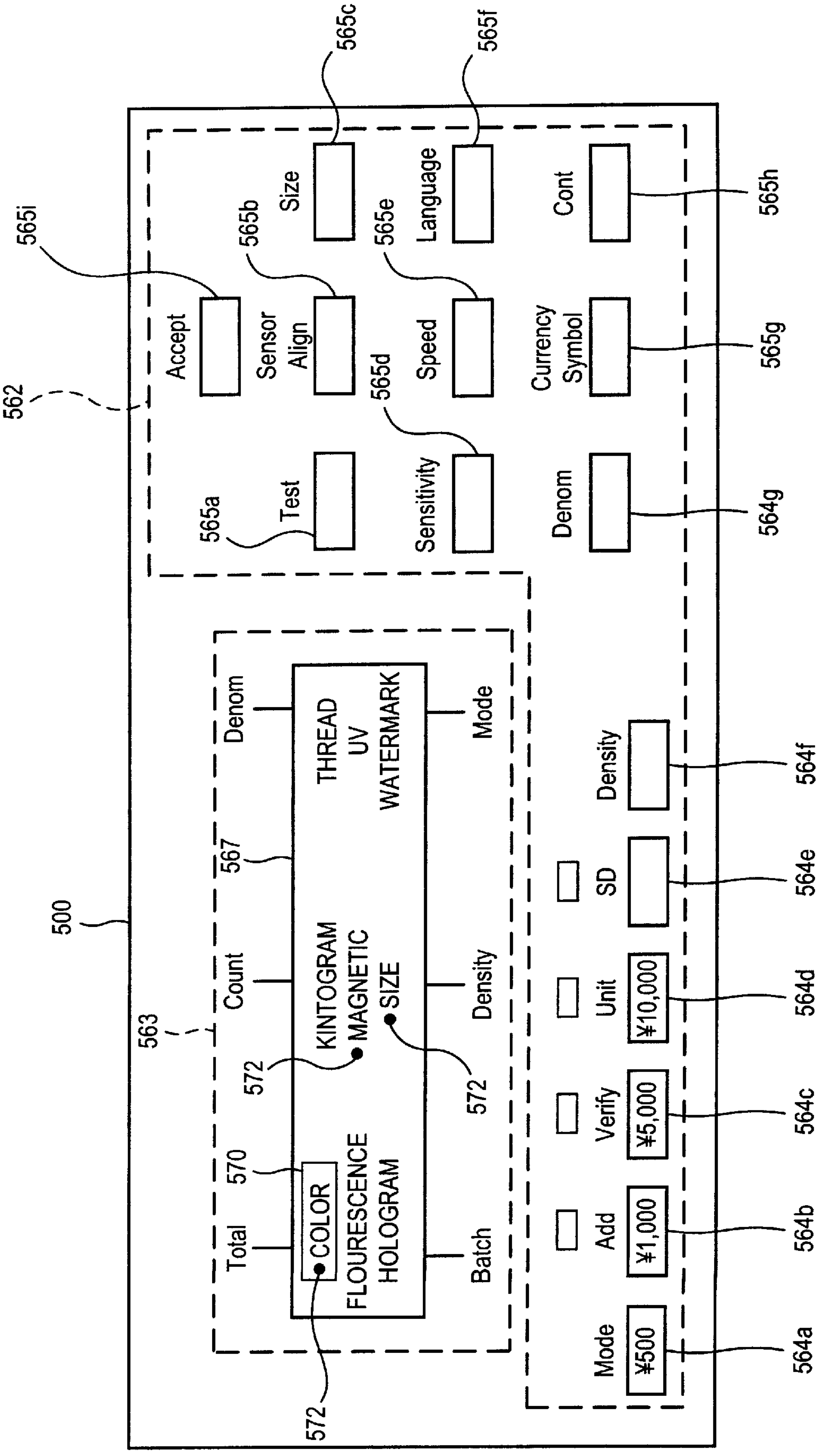

Another embodiment of an operator interface panel is illustrated in FIG. 5*a*. An operator interface panel 500 includes a keypad 562 and a display 563 comprising a LCD 567. The keypad 562 comprises a plurality of selection elements or keys including a plurality of denomination selection elements 564*a–g*, each associated with a denomination of the selected type of currency system. The denomination selection elements 564*a–g* permit the operator to indicate the type and denomination of the bills to be processed. For example, to select the currency type, the operator first repeatedly depresses the "MODE" key 564*a* to scroll a cursor 570 through a displayed list of modes of operation and currency systems available. To select the type of currency system, the operator scrolls through the list of available currency systems until the desired currency system is displayed on display 563. The desired denomination corresponding to the designated type of currency system may be selected by selecting the appropriate denomination selection element or key 564*a–g* For example, if Japanese currency were designated, the selection elements 564*a–g* would correspond to ¥500, ¥1,000, ¥5,000 and ¥10,000. The denomination selection elements 564*a–g* could be labeled, e.g., by use of key overlays or replaceable keys, to correspond to the appropriate denominations for the currency type selected. The denomination selection elements 564*a–g* may be designed to accommodate more than one denomination depending on the number of denominations in the designated currency system whereby pressing the key once selects the first denomination and pressing the key twice selects a second denomination as described above in connection with keys 464*e* and 464*f* in FIGS. 4*a* and 4*b*.

The operator interface panel 500 also comprises a plurality of parameter scroll keys 565*a–i* for permitting the operator to manually select various operating parameters including, for example, the authentication test, the sensor alignment, the size settings, the test sensitivity settings, the transport speed, the display language, and/or the currency symbol desired based on the type and denomination of the stack of bills to be processed. These keys allow the operator to scroll the cursor 570 through the various options available for each operating parameter. For example, the type of authentication test, i.e., which bill attribute(s) will be detected, is selected by repeatedly depressing the "TEST" key 565*a* to scroll the cursor 570 through the displayed list of authentication tests available for the designated type of currency system and denomination. The status of authentication tests may be changed by selecting the "ACCEPT" key 565*i* to toggle the currently selected authentication test on and off. The active authentication tests, that is, those that have been turned on, may then be indicated, for example, by an active dot 572. For example, in response to the operator selecting and turning on a particular authentication test, e.g., the color detection test, the system activates or enables the sensors required to perform that test. A similar process is performed to manually select the remainder of the desired parameters. Alternatively, the operating parameters may be automatically determined from the entered currency system and denomination. The keypad 562 also comprises a "Cont" selection element 565*h* for resuming operation of the system after an error condition occurs.

Figure 5B:
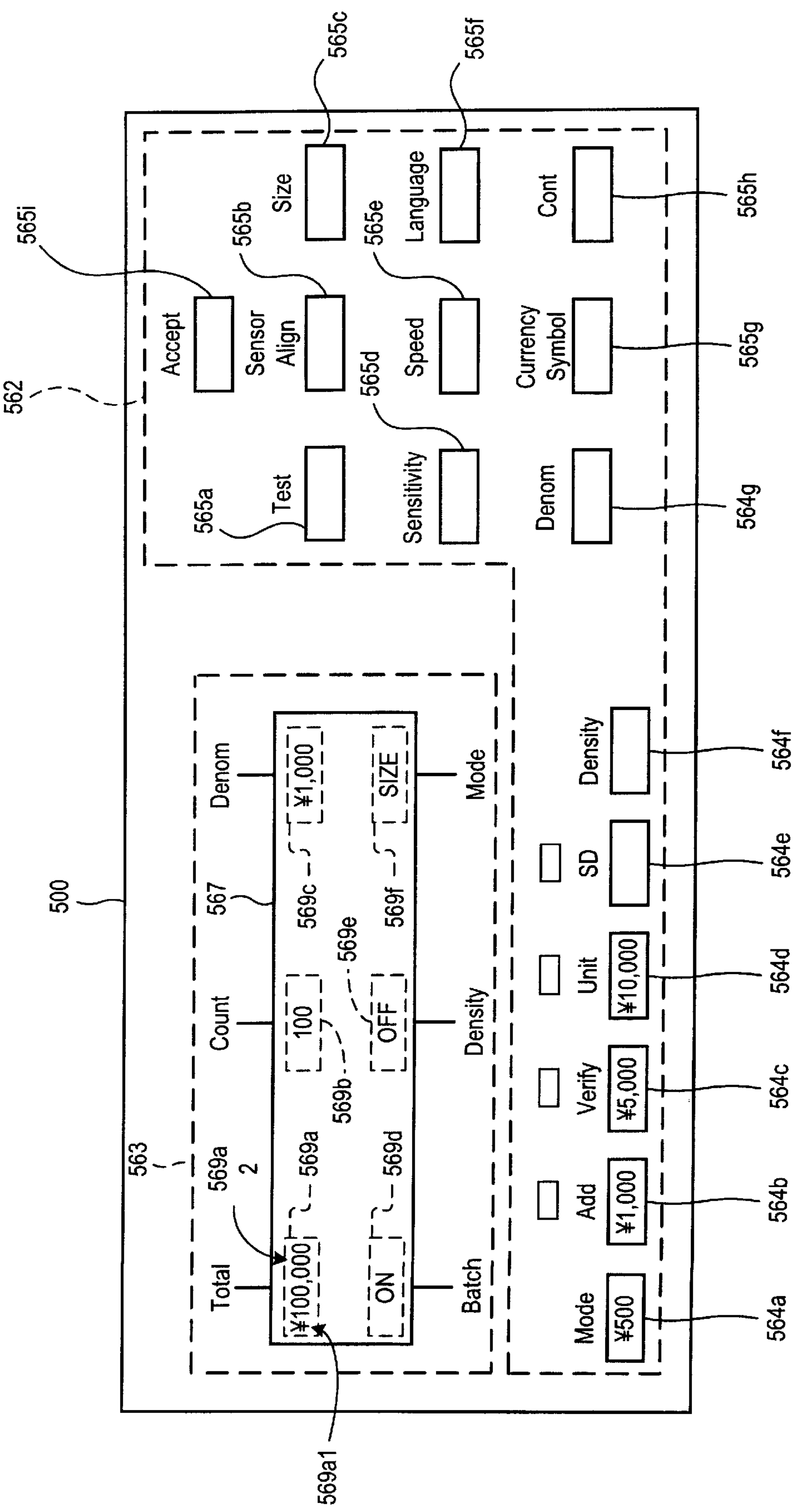

As illustrated in FIG. 5*b*, the operator interface panel 500 of FIG. 5*a* is shown displaying new information. In this embodiment, the display 563 includes five of the same fields displayed in FIG. 4*b* Fields having the same name have the same function as the display fields discussed above in relation to FIG. 4*b*. The sixth field illustrated in FIG. 5*b* is the mode field 469*f* which is shown displaying "SIZE" which informs the operator that the size detection mode is activated. In the illustrated embodiment, the fields are shown displaying information corresponding to processing Japanese currency.

The present invention allows the manufacturer of the system 10 to market the same system to a plurality of countries each having a different currency system. For is example, if a system 10 is to be marketed to a central bank in Germany, the system 10 could be programmed to accommodate German, British and French currency. In order to make processing of each country's currency easier, the manufacturer could include several sets of replacement keys or key overlays corresponding to each currency type the system 10 is programmed to process. For example, if the system 10 were to be shipped to Britain, keys 564*a–d* would be replaced with £5, £10, £20 and £50 keys. Alternatively, if the same system 10 were to be shipped to Germany, key overlays for keys 564*a–e* would be sent with the system 10 to correspond to 5 DM, 10 DM, 20 DM, 50 DM and 100 DM notes. To provide the end user more flexibility to use the system to process several types of currency, several types of keys or key overlays could be sent to with the system. For example, for a system to be used by a bank in Germany that processes German deutsche marks, British pounds, and Euro currency, keys or overlays with corresponding denominations and symbols may be sent along with the system.

Figure 6A:
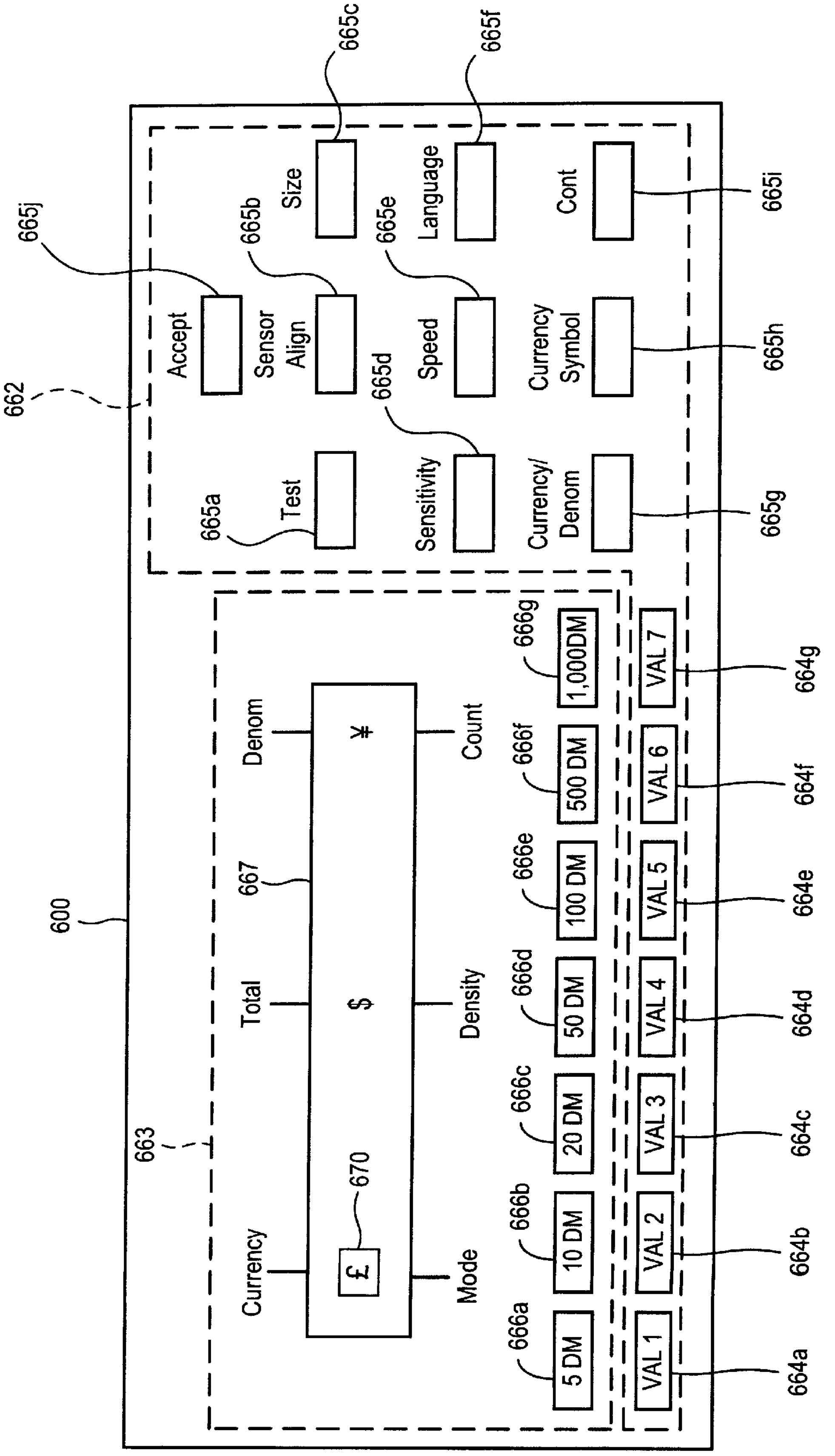

Another embodiment of an operator interface panel is illustrated in FIG. 6*a*. An operator interface panel 600 includes a keypad 662 and a display 663 comprising a LCD 667 and key displays 666*a–g*. Various operating parameters, instructions, count totals, and/or the mode of operation are communicated to the operator via the display 663. The keypad 662 comprises a plurality of selection elements including a plurality of denomination selection elements 664*a*–664*g*, each associated with a denomination of the selected type of currency system. The denomination selection elements 664*a–g* permit the operator to indicate the denomination of the bills to be processed. The key displays 666*a–g* display the denominations associated with the corresponding keys 664*a–g*. The keypad 662 further comprises a "Cont" selection element 665*i* that acts as an accept key and a continuation key for resuming operation of the system after an error condition occurs. The keypad 662 further includes a "Currency/Denom" selection element 665*g* for selecting a currency type and denomination. For example, to select the currency type, the operator first repeatedly depresses the "Currency/Denom" key 665*g* to scroll a cursor 670 through a displayed list of currency systems available until the desired currency system is displayed on display 663. The operator then uses the "CONT"key 665*i* to accept the displayed currency system. Similarly, the desired denomination corresponding to the designated currency type may be selected by either scrolling through the available denominations using the "Currency/Denom" key 665*g* or by simply selecting the appropriate denomination selection element or key 664*a–g*. Once a currency system has been selected, the denomination selection elements 664_a–g_ and key displays 666_a–g_ correspond to the appropriate denominations for the type of currency system selected. For example, if German currency were designated, the selection elements 664_a–g_ would correspond to 5 DM, 10 DM, 20 DM, 50 DM, 100 DM, 500 DM and 1,000 DM, respectively. The key displays 666_a–g_ would display "5 DM," "10 DM," "20 DM," "50 DM," "100 DM," "500 DM" and "1,000 DM," respectively, thereby readily informing the operator what values are associated with each value key, "VAL1–VAL7" (664_a–g_). The denomination selection elements 664_a–g_ may have to accommodate more than one denomination depending on the number of denominations in the designated currency system, as described above in connection with keys 464_e_ and 464_f_ in FIGS. 4_a_ and 4_b_. Denomination selection key 664_a_ also serves as a mode selection key.

Similar to the operator interface panel 500 above, the operator interface panel 600 also comprises a plurality of parameter scroll keys 665_a–j_ for permitting the operator to manually select and adjust various operating parameters. The parameter scroll keys 665_a–j_ function the same as the parameter scroll keys described above in relation to operator interface panel 500. For example, the displayed currency symbol is selected by repeatedly depressing the "CURRENCY SYMBOL" key 665_h_ to scroll the cursor 670 through the displayed list of currency symbols. The desired symbol may be indicated by depressing the "ACCEPT" key 665_j_. Similarly, the size setting is selected by repeatedly depressing the "SIZE" key 665_c_ to scroll the cursor 670 through the displayed list of authentic bill sizes available. The appropriate bill sizes may be selected by depressing the "ACCEPT" key 665_j_. Alternatively, the "VAL" keys 664_a–g_ may be used to enter the dimensions of an authentic bill. For bill dimensions requiring numbers 0, 8 and 9, "VAL" keys 664_a–c_ would accommodate two values and the method described above in connection with keys 464_e_ and 464_f_ in FIGS. 4_a_ and 4_b_ would be used to enter the appropriate dimensions of an authentic bill. A process similar to the above is performed to manually select the remainder of the desired parameters. Alternatively, the operating parameters may be automatically set based on the selected currency system and denomination.

Figure 6B:
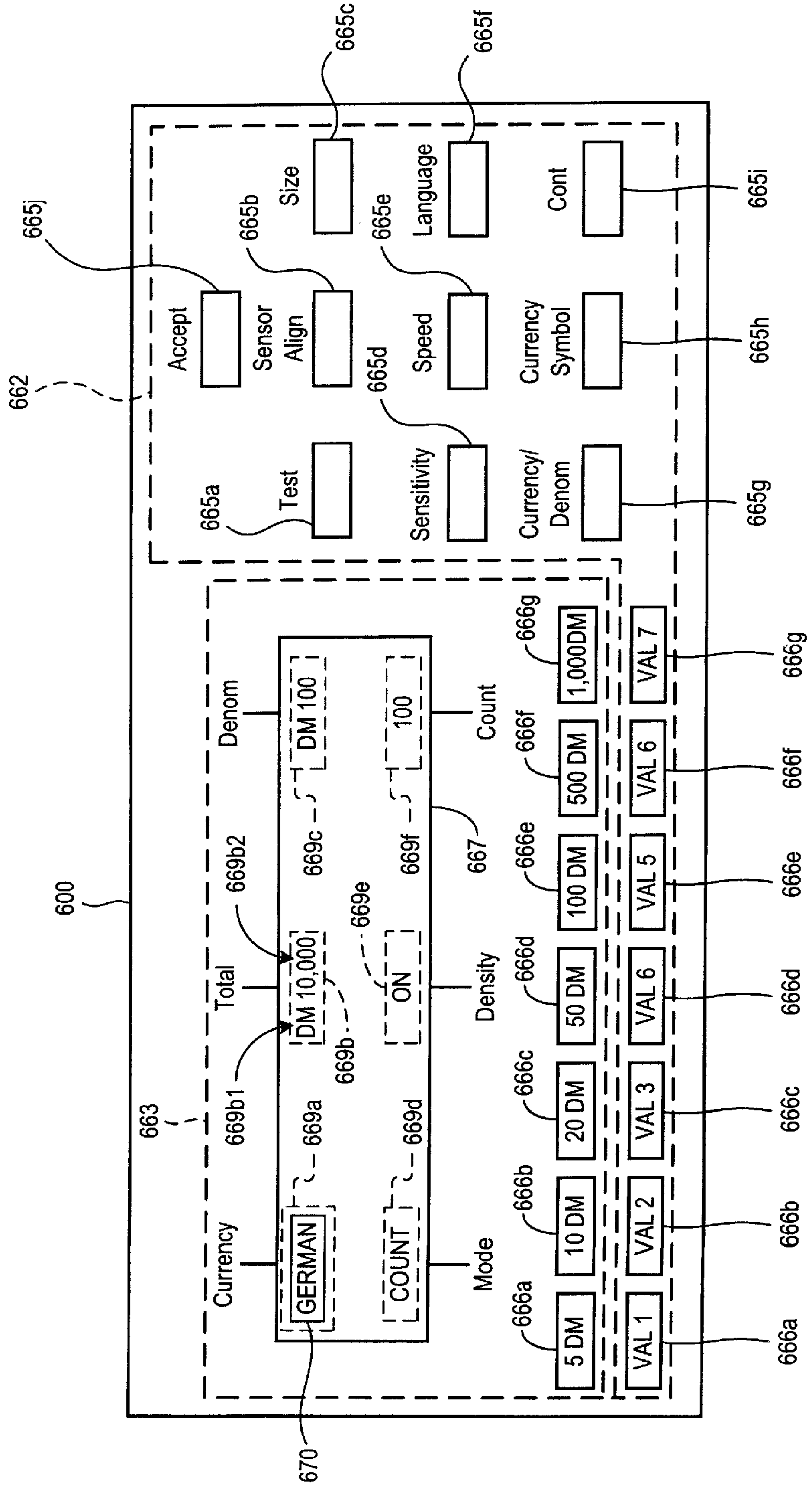

As illustrated in FIG. 6_b_, the operator interface panel 600 of FIG. 6_a_ is shown displaying new information. In this embodiment, the display 663 includes six fields: a currency 669_a_ field, a total field 669_b_, a denomination field 669_c_, a mode field 669_d_, a density field 669_e_, and a count field 669_f_. Fields having the same name have the same function as the display fields discussed above in relation to FIG. 4_b_. The currency field 669_a_ displays the selected type of currency system. In the illustrated embodiment, the fields are shown displaying information corresponding to processing German currency.

Figure 7:
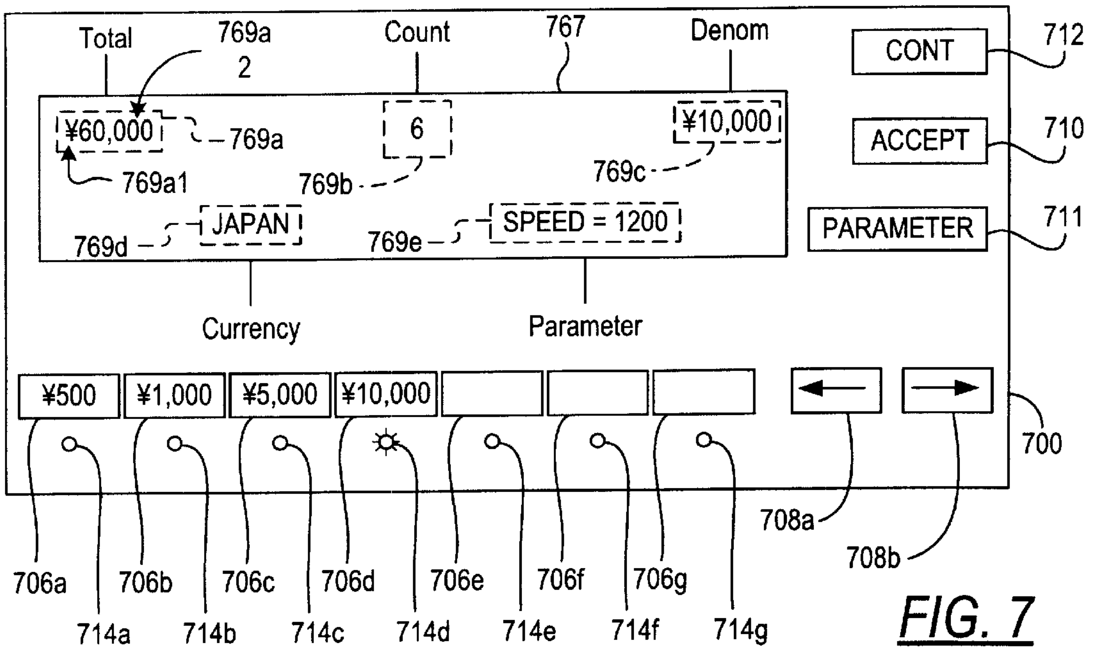

Another embodiment of an operator interface panel is illustrated in FIG. 7. An operator interface panel 700 includes a display 767, several denomination selection keys 706_a–g_ in the form of keys, left and right scroll keys 708_a–b_, an accept selection element 710, a continuation selection element 712 and a parameter selection element 711. According to one embodiment, to select the currency type, the operator first repeatedly depresses the "PARAMETER" key 711 to scroll the cursor 770 through the displayed currency systems available until the desired currency system is displayed on display 767. The operator then uses the "ACCEPT" key 710 to accept the displayed currency system. The desired denomination corresponding to the designated currency type may be selected by simply selecting the appropriate denomination selection element 706_a–g_. Each denomination selection element 706_a–g_ is labeled, e.g., by use of key overlays, to correspond to the appropriate denominations for the currency type selected. For example, if Japanese currency were designated, the selection elements 706_a–d_ would correspond to ¥500, ¥1,000, ¥5,000, and ¥10,000, respectively. Alternatively, the denomination selection keys 706_a–g_ are simply labeled "VAL1" "VAL7" and the denomination field 769_c_ is used to indicate the denomination selected. The denomination selection elements 706_a–g_ may have to accommodate more than one denomination depending on the number of denominations in the designated currency system as described above in connection with keys 464_e_ and 464_f_ in FIGS. 4_a_ and 4_b_.Each denomination selection element 706_a–g_ has an indicating means associated therewith. In FIG. 7, the indicating means are in the form of small lights or lamps 714_a–g_ such as LEDs. In FIG. 7, the light 714_d_ associated with the ¥10,000 denomination key 706_d_ is illuminated so as to indicate the designated denomination of the bills to be processed. Alternatively, instead of the lamps 714_a–g_ being separate from the denomination keys 706_a–g_, the denomination keys could be in the form of illuminable keys whereby one of the keys 706_a–g_ would light up to indicate the denomination chosen by the operator. In place of, or in addition to, the illuminable lights 714_a–g_ or keys, the display area 767 may contain a message to indicate the denomination chosen by the operator. In FIG. 7, the display area 767 contains the message "¥10,000" in the denomination field 769_c_ to indicate that the denomination of ¥10,000 was chosen.

The operator manually selects the operating parameters for the illustrated embodiment of FIG. 7 by the following procedure. The operator first selects the parameter to be adjusted by repeatedly depressing the "PARAMETER" key 711 to scroll a cursor through a displayed list of parameters corresponding to the designated type of currency system and denomination. For example, the desired display language may be selected by repeatedly depressing the "PARAMETER" key until "LANGUAGE" is displayed on the display 767. When "LANGUAGE" is displayed, the display also displays a list of available languages. Then the scroll keys are used to scroll a cursor through the displayed list of display languages. The desired display language may be selected by depressing the "ACCEPT" key 710 . A similar process is performed to manually select the remainder of the desired parameters. Alternatively, the operating parameters may be automatically determined from the entered currency system and denomination.

In the illustrated embodiment, the display 767 includes five fields: a total field 769_a_, a count field 769_b_, a denomination field 769_c_, a currency field 769_d_ and a parameter field 769_e_.

Fields having the same name have the same function as the display fields discussed above in relation to FIGS. 4_b_ and 6_b_. The parameter field 769_e_ displays the parameters that can be selected/set. In the illustrated embodiment, the fields are shown displaying information corresponding to processing Japanese currency.

Where the operating parameters are automatically determined, the operator interface panel displays the appropriate information and the system 10 automatically adjusts all the parameters corresponding to the type of bill and denomination selected. For example, where 20 DM German notes are selected as the bill type and denomination, the operator interface panel displays the type of currency system (German or DM) and denomination (20) being processed, and the system 10 automatically adjusts the authentication test(s), sensor alignment, transport speed, test sensitivity settings, size settings, currency symbol, etc. to correspond to the appropriate settings for a 20 DM bill. In this way, the system is automatically calibrated to authenticate and count a stack of 20 DM bills based on the bill type and denomination designated by the operator.

Referring to FIGS. 8–13, in some embodiments, the operator interface panel comprises a touch-screen which may be used to provide input to the document handling system 10 and display output related to the operation of the system 10. In one embodiment, the operator may customize the touch-screen to define names or labels associated with particular "keys" or displays, delete keys, reposition keys or modify the complexity of the touch-screen to match the level of operator experience. The touch-screen is operated by control software executed by the processor 354 and stored in the memory 356, illustrated in FIG. 3.

The touch-screen includes selection elements or "keys" which the operator may touch to activate appropriate functions related to the operating parameters, modes of operation and/or status of the document handling system 10. The screen is further designed to display such information as, for example, batch or sub-batch count and/or value totals. Preferably, at any given time the touch-screen will display only those "keys" that are associated with the type of currency system and denomination selected.

In one embodiment of the present invention, the touch-screen may be used to indicate recovery procedures upon the occurrence of an error condition that has stopped the system. Error conditions can include, for example, jam, counterfeit, etc. Preferably, the recovery procedures are displayed in the form of text indicating both the error condition that has occurred and detailed instructions for the operator to follow to recover from the error condition and resume operation of the system. For example, a jam can be identified by its location in the system such as in the hopper 136, output pocket 117, transport mechanism 340, etc. Likewise, a display associated with a "counterfeit" error indicates to the operator that he or she must first remove the flagged note from output pocket 117. The document handling system 10 is then started again by, for example, selecting a continue key. The system resumes processing the remaining notes in the stack without improperly disrupting any running count and/or value totals. If after examination of the flagged note it is determined that the note is not counterfeit, according to some embodiments, the note may be placed into the input hopper 136 to be re-processed.

In some embodiments of this invention, the operating parameters for the document handling system 10 are inputted via a touch-screen operator interface panel. Exemplary touch-screens are illustrated in FIGS. 8–13.

In the touch-screen embodiments of this invention, the above-described operating parameters may be selected by touching selection elements or "keys" in respective "menus" associated with the operating parameters and/or modes of operation. The touch-screen may include the following:

(1) a key or keys which allow the customization of user-default settings or the selection of factory default settings;

(2) a key which engages or disengages sub-batching;

(3) a key or keys which engage or disengage the authentication mode, count mode, value mode and/or learn mode;

(4) a key or keys which engage or disengage the audio alarms for the jam, counterfeit bill, and other error conditions;

(5) a key or keys which select the default type of currency system; and (6) a key or keys which select the default denomination.

Figure 8:
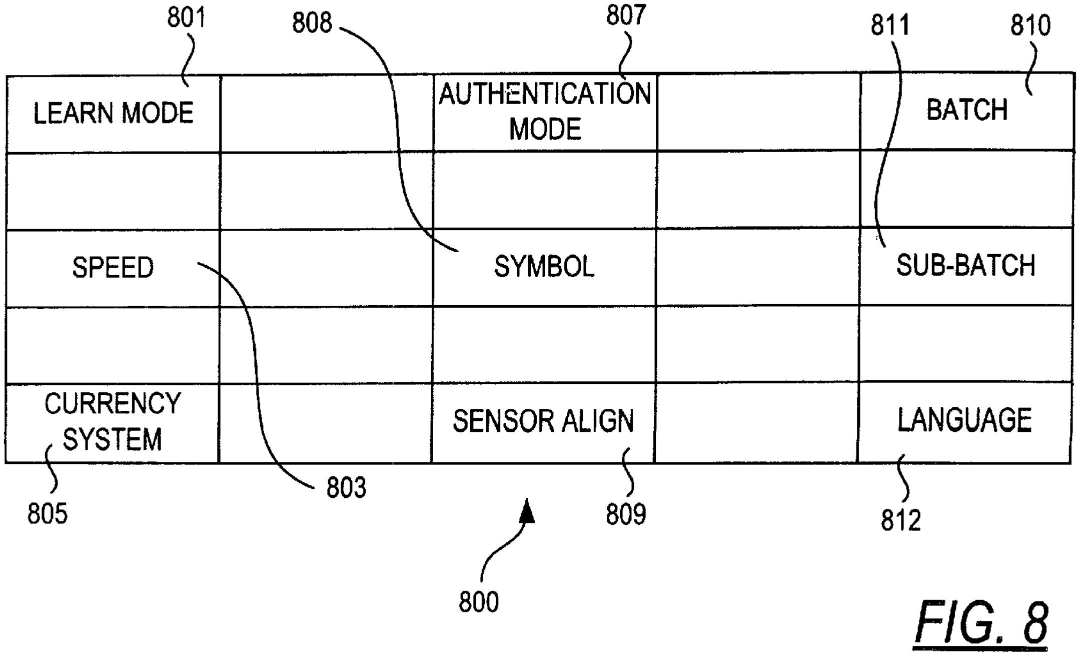
FIGS. 8–13 illustrate additional embodiments of operator interface panels including those employing various touch-screen arrangement which may be used with a document handling system according to various embodiments of the present invention.

One embodiment of a touch-screen is illustrated in FIG. 8. There, a front view of a touch-screen 800 is illustrated. The detailed operation of a touch-screen is described below in more detail in connection with FIG. 13. In the embodiment of FIG. 8, a main menu screen includes various "keys." One such key is the "learn mode" key 801. Selecting the learn mode key causes the system 10 to enter the learn mode and generate master information from sensed attribute(s) of test bills. De-selecting the "LEARN mode" key 801 causes the system 10 to enter standard mode and use stored master information corresponding to attribute(s) of genuine bills. The touch-screen 800 also provides a "SPEED" key 803 for selecting the transport speed. The touch-screen 800 further provides a "CURRENCY SYSTEM" key 805 for selecting the type of international currency system and/or document to be processed.

The touch-screen 800 further includes an "authentication mode" key 807 for enabling and disabling the authentication mode. In authentication mode, the types of authentication test(s) to be performed on the bills can be chosen. Each authentication test detects different attribute(s) or characteristic(s) of the bills. Bills are then evaluated, authenticated or otherwise processed by comparing the data corresponding to the detected attribute(s) of the test bills to corresponding master information. The attributes that may be selected for authentication may include, for example, data corresponding to the size, magnetic content, UV reflectance levels, fluorescence, density, security thread content, color shifting ink characteristics, hologram, kintogram and/or watermark of the bill. For example, if master information corresponding to several attributes of a particular denomination and currency type is stored in memory, an operator may choose, in authentication mode, to use the master information corresponding to one or more of these attributes. Thus, in a document handling system including optical and magnetic sensors capable of measuring a variety of attributes, an operator may choose an authentication test that measures only a particular attribute or sub-combination of attributes.

The touch-screen 800 also includes a "SYMBOL" key 808 for selecting the currency symbol to be displayed. The touch-screen 800 further includes a "SENSOR ALIGN" key 809 for selecting the sensor alignment desired for processing the selected currency type and denomination. The batch key 810 and the sub-batch key 811 select and de-select the batch and sub-batch modes of operation. As stated above, the batch mode allows a plurality of stacks of bills of a particular type of currency system to be processed to determine the total count and the total value of the bills in the stacks. Similarly, the sub-batch mode allows for batching within a batch, e.g., if three stacks of $10, $20 and $50 U.S. bills are to be processed in one batch, the sub-batch total count and total value of the $10 and $20 bills can be determined and then the batch total of the three stacks can also be determined. The touch-screen 800 also provides a "LANGUAGE" key 812 for selecting the display language desired.

Figure 9:
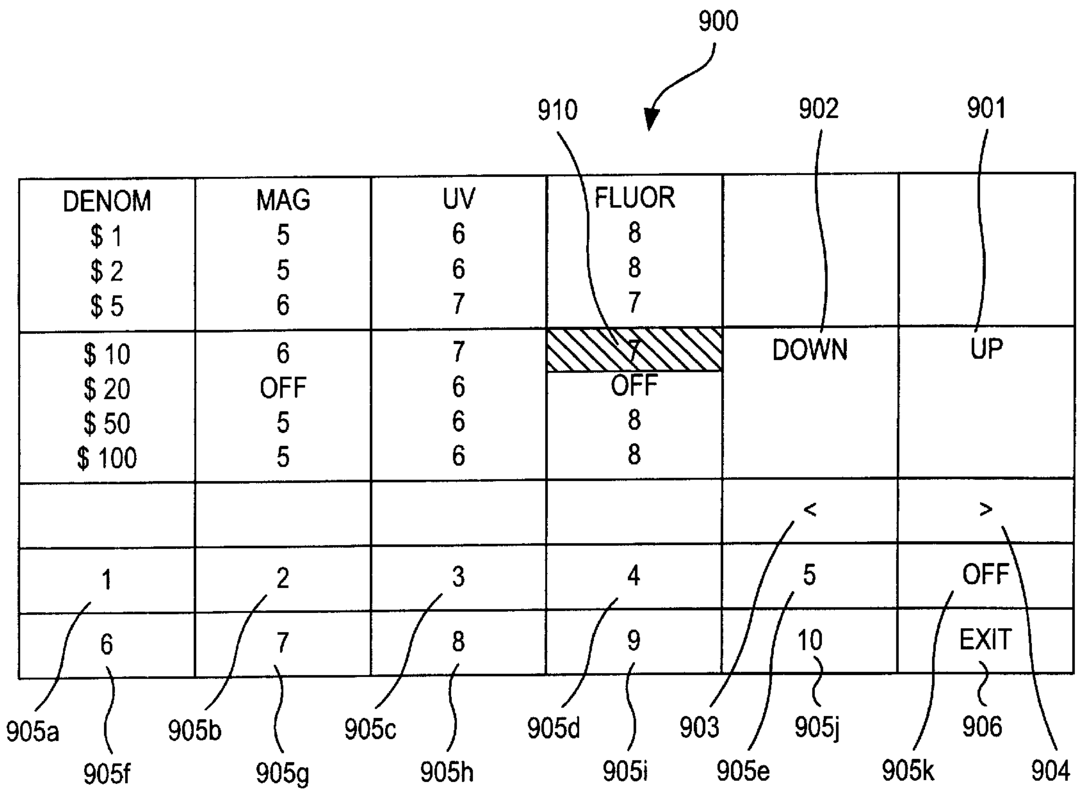

By selecting the "authentication mode" key 807 from the main menu screen of FIG. 8, another touch-screen 900, illustrated in FIG. 9, is displayed with which an operator may adjust various threshold levels for triggering a "counterfeit document" error condition. Although seven U.S. denominations are illustrated, other numbers of denominations will be displayed depending on the type of currency system designated. In the embodiment of FIG. 9, the system permits adjustment of three types of authentication tests, namely, a magnetic test, an ultraviolet (UV) test, and a fluorescence test. The magnetic test measures the total magnetic content of a document in a particular area. The ultraviolet test measures the amount of ultraviolet light that is reflected off a document when it is illuminated by an ultraviolet light source. The fluorescence test measures the amount of fluorescent light that is emitted from a document when it is illuminated by an ultraviolet light source. Likewise, the system may additionally include other authentication tests such as those described above in section IV. B., for example, thread detection, enhanced magnetic tests including those employing a single and/or multiple magnetic heads, infrared detection, and/or color authentication tests including those described in co-pending U.S. patent application Ser. No. 08/800,053, filed on Feb. 14, 1997 entitled “Method and Apparatus for Document Identification and Authentication” incorporated herein by reference in its entirety.

The system may permit the sensitivity of the various authentication tests to be set separately for each of a plurality of different denominations of currency. A highlighted cursor 910, indicated by hatching in FIG. 9, may be used to select a sensitivity setting for each authentication test by first highlighting the denomination and test by moving the cursor with the UP key 901 and the DOWN key 902 and/or the left arrow key “<” 903 and the right arrow key “>” 904. Thereafter, the chosen sensitivity setting may be set by touching one or more of the direct access keys 905*a–k*, at the bottom of the screen. The OFF key 905*k* disables the chosen authentication test for the chosen denomination. EXIT key 906 will bring the operator back to the main menu screen of FIG. 8.

Figure 10:
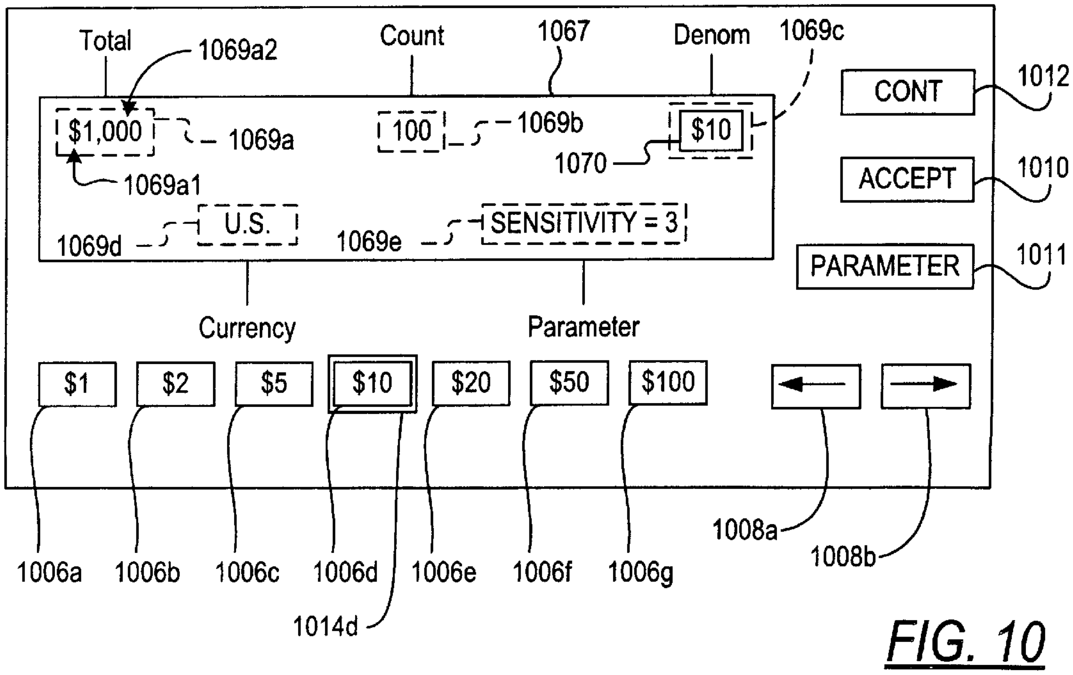

Another embodiment of a touch-screen is illustrated in FIG. 10. Touch-screen 1067 has a layout similar to that of FIG. 7, and includes touch-screen keys such as denomination selection elements 1006*a–g*, scroll keys 1008*a–b*, an “accept” key 1010, and a “cont” key 1012. To select any given key, the operator touches the screen in the area of the key to be selected. For example, the currency type and denomination are selected in the same way they were selected in relation to FIG. 7. The selection of a denomination selection element may be indicated to the operator by, for example, highlighting a particular selection element such as element 1006*d*. in FIG. 10. For example, the appearance of one of the denomination selection elements may be altered such as by making it lighter or darker than the remaining denomination selection elements or reversing the video display (e.g., making light portions dark and making the dark portions light or swapping the background and foreground colors). Alternatively, a designated denomination selection element may be highlighted by surrounding it with a box, such as box 1014*d* surrounding the $10 key 1006*d*. Alternatively or additionally, a displayed message may be used to indicate which currency system denomination is selected.

In the illustrated embodiment, the display region 1067 includes five fields: a total field 1069*a*, a count field 1069*b*, a denomination field 1069*c*, a currency field 1069*d* and a parameter field 1069*e*. Fields having the same name have the same function as the display fields discussed above in relation to FIGS. 4*b*, 6*b* and 7. In the illustrated embodiment, the fields are shown displaying information corresponding to processing U.S. currency.

Figure 11:
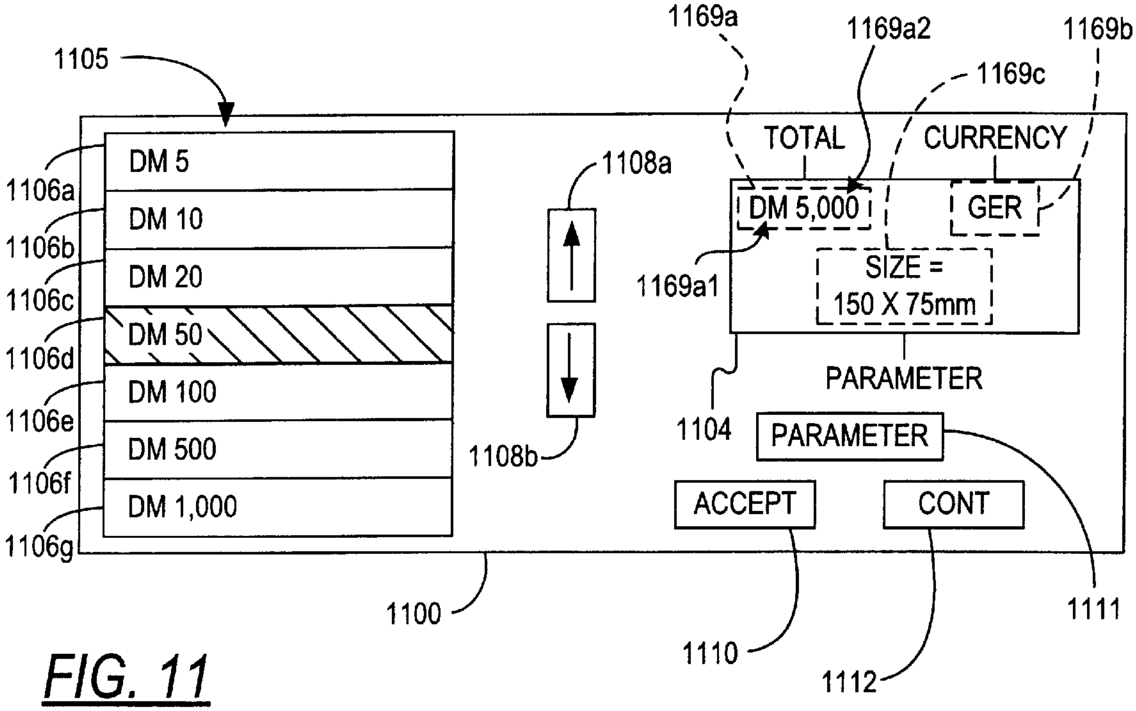

Another embodiment of an operator interface panel is depicted in FIG. 11. An operator interface panel 1100 includes several denomination indicating elements 1106*a–g* in the form of menu list 1105, scroll keys 1108*a–b*, an “ACCEPT” selection element 1110 , a “CONT” selection element 1112 and a “PARAMETER” selection element 1111. The various selection elements may be, for example, physical keys or touch-screen keys. For example, the menu list 1105 may be displayed in a non-touch-screen display area while the scroll keys 1108*a–b*, “ACCEPT” key 1110, and “CONT” key 1112 may be physical keys or touch-screen keys. For example, the currency type and denomination may be selected in the same way they were selected in relation to FIG. 7. Alternatively, the denomination indicating elements 1106*a–g* may themselves be denomination selection elements such as touch-screen keys. In such an embodiment, a given denomination selection element may be highlighted and/or selected by touching the screen in the area of one of the denomination selection elements 1106*a–g*. The touching of the screen in the area of one of the denomination selection elements may simply cause the associated denomination selection element to become highlighted requiring the touching and/or pressing of the “accept” key 1110 or alternatively may constitute acceptance of the associated denomination selection element without requiring the separate selection of the “accept” key 1110. The document handling system may contain indicating means to indicate the denomination selected by the operator. For example, an appropriate message may be displayed in a display area 1104. Alternatively or additionally, the indicating means may include means for highlighting one of the denomination indicating elements 1106*a–g* as described above in relation to FIG. 10. In FIG. 11, the denomination indicating element 1106*d*, shown in hash marks, indicates the selection of “DM 50” which corresponds to the selection of German 50 deutsche mark notes.

In some embodiments employing touch-screen denomination keys, once a currency system has been selected, the number of displayed denomination keys and the label on each is adjusted based on the selected currency system. Using FIG. 11 as an example, here the designated currency system is German deutsche marks. Accordingly, seven denomination keys 1106*a–g* labeled DM 5–DM 1000 are displayed. If the designated currency system were changed to Japanese yen, then the four denomination keys labeled ¥500, ¥1,000, ¥5,000, and ¥10,000 would be displayed instead of the seven deutsche mark labeled keys 1106*a–g*.

In the illustrated embodiment, a display region 1104 includes three fields: a total field 1169*a*, a currency field 1169*b* and a parameter field 1169*c*. Fields having the same name have the same function as the display fields discussed above in relation to FIG. 7. In the illustrated embodiment, the fields are shown displaying information corresponding to processing German currency.

The operator manually selects the operating parameters for the illustrated embodiments of FIGS. 10–11 by the following procedure. Using the reference numbers of FIG. 10, the operator may select the desired test sensitivity by repeatedly touching the “PARAMETER” key 1011 until “SENSITIVITY” is displayed on the display 1067. Then the scroll keys 1008*a–b* are used to scroll the cursor 1070 through the displayed list of authentication test sensitivities available for the designated type of currency system and denomination. The sensitivity setting may be set by touching the “ACCEPT” key 1010. The test sensitivity settings may be adjusted, for example, by adjusting the respective thresholds, as described in detail above in connection with Tables 1 and 2 and FIG. 9. For example, in the case of U.S. currency, the document handling system 10 permits a high sensitivity/low sensitivity threshold to be adjusted, for example, according to the denomination of the bills being processed. A low sensitivity may be employed for low denominations, and a high sensitivity may be employed for high denominations. The touch-screen 1067 may also indicate to the operator the reason(s) why a document has been rejected as not authentic by displaying messages such as "UV FAILURE" and/or "FLUORESCENCE FAILURE." A process similar to the above is performed to manually select the remainder of the desired operating parameters. Similarly, the corresponding keys in FIG. 11 are used to manually enter the operating parameters according to the above described process. Alternatively, in either embodiment, the operating parameters may be automatically set based on the designated currency system and/or denomination.

Figure 12:
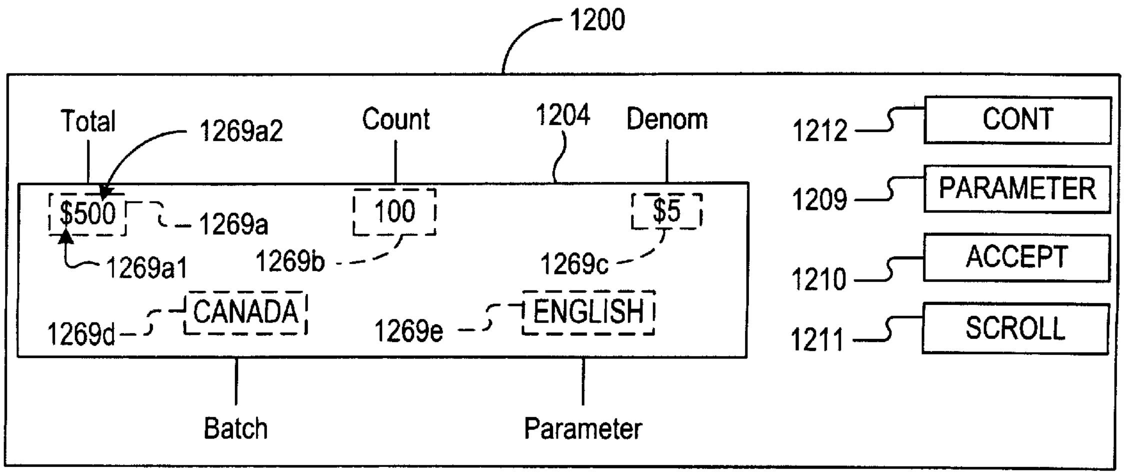

Another embodiment of an operator interface panel is illustrated in FIG. 12. Operator interface panel 1200 comprises a display area 1204, an "ACCEPT" key 1210, a "SCROLL" key 1211, a "CONT" key 1212 and a "PARAMETER" key 1209. These keys may be physical keys or touch-screen keys. By repeatedly touching the "SCROLL" key 1211, the operator may scroll a cursor through the available currency systems. By touching the "accept" key 1210, the operator may select a currency system. Then, the operator repeatedly touches the "SCROLL" key 1211 to scroll the cursor through the corresponding denominations available for the selected currency system. The operator may select one of the corresponding denominations by touching the "accept" key 1210. The display area 1204 displays the different options and indicates the currency system and denomination selected. For example, as illustrated in FIG. 12, the operator selected Canadian currency and a denomination of $5. The "CONT" key 1212 is used in authentication mode. In that mode, the system 10 stops in response to determining that a bill is suspected to be counterfeit. Then, the operator may remove the flagged bill and select the continuation key 1212 so that the document handling system 10 resumes operation.

The operator manually selects the operating parameters for the illustrated embodiment of FIG. 12 by the following procedure. The operator first selects the parameter to be adjusted by repeatedly touching the "PARAMETER" key 1209 to scroll a cursor through a displayed list of parameters corresponding to the designated type of currency system and denomination. For example, the desired sensor alignment may be selected by repeatedly touching the "PARAMETER" key to scroll the cursor through the list of parameters until "SENSOR ALIGN" is displayed on display 1204. The operator uses the "SCROLL" key 1211 to scroll the cursor through the displayed list of sensor alignments available for the designated type of currency system and denomination. The desired sensor alignment may be selected by touching the "ACCEPT" key 1210. A similar process is performed to manually select the remainder of the desired parameters. Alternatively, the operating parameters may be automatically set based on the designated currency system and/or denomination.

In the illustrated embodiment, the display 1204 includes five fields: a total field 1269*a*, a count field 1269*b*, a denomination field 1269*c*, a currency field 1269*d* and a parameter field 1269*e*. Fields having the same name have the same function as the display fields discussed above in relation to FIGS. 4*b*, 6*b* and 7.

Figure 13:
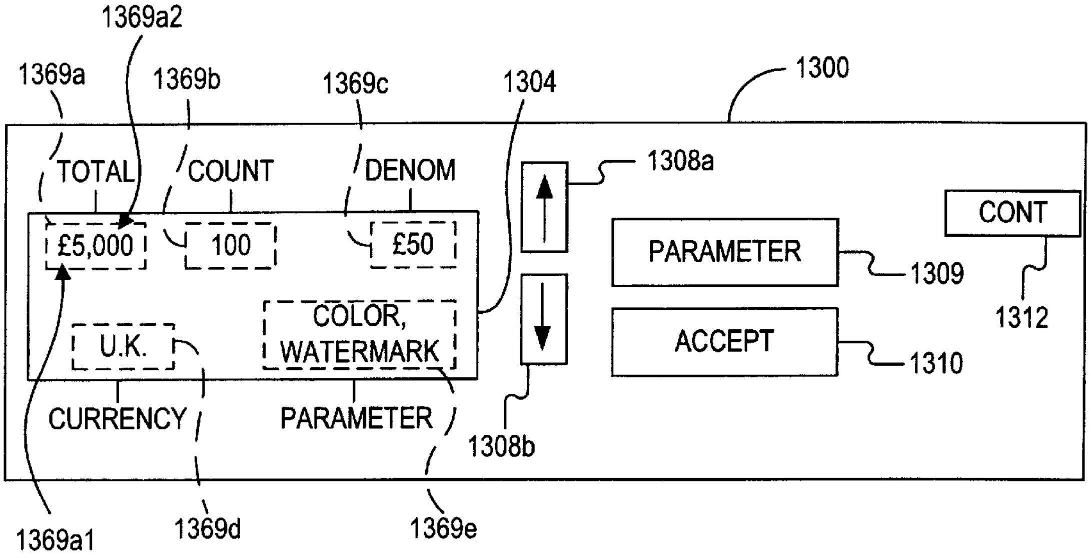

Another embodiment of a touch-screen is illustrated in FIG. 13. Touch-screen 1300 is similar to the operator interface 1200, although the touch-screen 1300 replaces the single "SCROLL" key 1211 with multiple scroll keys 1308*a–b*. The operator selects the currency system and denomination for the touch-screen 1300 in essentially the same way as described in relation to the operator interface 1200. However, the touch-screen 1300 also allows the operator to scroll forwards and backwards through the available options using the scroll keys 1308*a* and 1308*b*.

The operator manually selects the operating parameters for the illustrated embodiment of FIG. 13 by the following procedure. The operator first selects the parameter to be adjusted by repeatedly touching the "PARAMETER" key 1309 to scroll a cursor through a displayed list of parameters corresponding to the designated type of currency system and denomination. For example, the desired authentication tests, i.e., which bill attributes will be detected, is selected by repeatedly touching the "PARAMETER" key until "TEST" is displayed on the display 1304. Then the scroll keys 1308*a* and 1308*b* are used to scroll the cursor 1370 through the displayed list of authentication tests available for the designated type of currency system and denomination. The desired authentication test may be activated by pressing the "ACCEPT" key 1310. A similar process is performed to manually select the remainder of the desired parameters. Alternatively, the operating parameters may be automatically set based on the designated currency system and/or denomination.

In the illustrated embodiment, the display 1304 includes five fields: a total field 1369*a*, a count field 1369*b*, a denomination field 1369*c*, a currency field 1369*d* and a parameter field 1369*e*. Fields having the same name have the same function as the display fields discussed above in relation to FIGS. 4*b*, 6*b* and 7. In the illustrated embodiment, the fields are shown displaying information corresponding to processing British currency.

Figure 14:
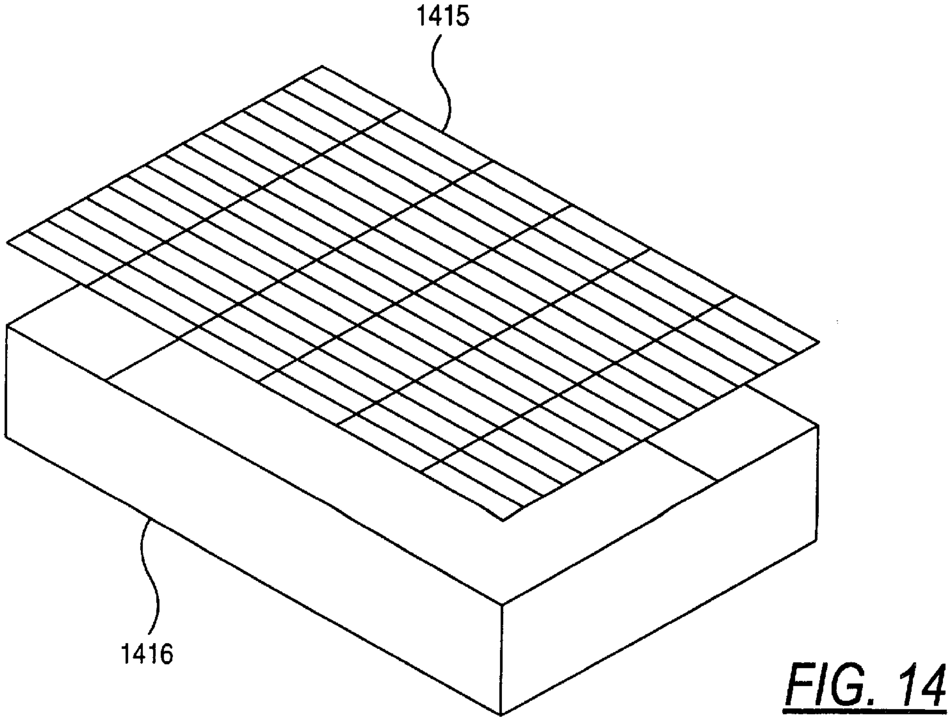
FIG. 14 illustrates in a simplified diagrammatic form, a touch-screen which may be used with a document handling system according to various embodiments of the present invention.

Referring now to FIG. 14, an operator interface panel is shown, in greatly simplified form, to comprise a touch-screen 1415 mounted over a graphics display 1416. In one embodiment, the display 1416 is an LCD with backlighting. The display may have, for example, 128 vertical pixels and 256 horizontal pixels. The display 1416 contains a built-in character generator which permits the display 1416 to display text and numbers having font and size pre-defined by the manufacturer of the display. Moreover, a controller such as a CPU is programmed to permit the loading and display of custom fonts and shapes (e.g., key outlines) on the display 1416. The display 1416 is commercially available as Part No. GMF24012EBTW from Stanley Electric Company, Ltd., Equipment Export Section, of Tokyo, Japan.

The touch-screen 1415 may be an X-Y matrix touch-screen forming a matrix of touch responsive points. The touch-screen 1415 includes two closely spaced but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the controller. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit which is detected by the controller through the respective buses at the edges of the two polyester layers, thereby providing a means for detecting the X and Y coordinates of the switch closure. A matrix touch-screen 1415 of the above type is commercially available from Dynapro Thin Film Products, Inc. of Milwaukee, Wis.

As illustrated in FIG. 14, the touch-screen 1415 forms a matrix of ninety-six optically transparent switch elements having six columns and sixteen rows. The controller is programmed to divide the switch elements in each column into groups of three to form five switches in each column. Actuation of any one of the three switch elements forming a switch actuates the switch. The uppermost switch element in each column remains on its own and is unused.

Although the touch-screen 1415 uses an X-Y matrix of optically transparent switches to detect the location of a touch, alternative types of touch-screens may be substituted for the touch-screen 1415. These alternative touch-screens use such well-known techniques as crossed beams of infrared light, acoustic surface waves, capacitance sensing, and resistive membranes to detect the location of a touch. The structure and operation of the alternative touch-screens are described and illustrated, for example, in U.S. Pat. Nos. 5,317,140, 5,297,030, 5,231,381, 5,198,976, 5,184,115, 5,105,186, 4,931,782, 4,928,094, 4,851,616, 4,811,004, 4,806,709, and 4,782,328.

While some of the above embodiments have been described and illustrated in conjunction with U.S. currency, systems according to the present invention may alternatively or additionally process currency from other countries such as, for example, Britain, France, Germany, Japan, Spain, Canada, Italy, Brazil, Mexico, Taiwan, and Saudi Arabia. Likewise, the system 10 may support the processing of multiple types of money or script such as casino money or script and/or amusement park or arcade money or script. Additionally, the system 10 may support the processing of other types of documents such as stock certificates, bonds, postage stamps, and/or food coupons.

VI. Learn Mode

In some embodiments, the document handling system 10 processes or evaluates a bill by comparing characteristic(s) or attribute(s) of the bill to corresponding master information. Such processing or evaluation may include determining the denomination of the bill, determining its type (i.e., issuing country or authority), or verifying the authenticity of a bill of a given type and denomination. In prior document handling systems, the master information used in evaluating currency bills is typically programmed at a factory or service center into a memory device such as an EPROM or flash card, then installed in the system or shipped to the user for installation in the system. Consequently, the ability of these prior document handling systems to evaluate particular types and/or denominations of currency is dependent on the content of their associated memory device. The memory devices must therefore be appropriately programmed with the type (s) of currency system(s) the document handling systems are intended to handle. For example, a memory device to be used in a system for processing U.S. currency must be programmed with master information corresponding to the characteristic(s) of U.S. currency, while a memory device used in a system designated for foreign currency systems must be programmed with master information corresponding to the characteristic(s) of the appropriate foreign currency system(s). A system having a memory device programmed with master information appropriate to one type of currency system will generally be unable to accommodate currency from another type of currency system because it typically has not been programmed with the appropriate master information for that other type of currency system.

In some embodiments, the document handling system 10 is capable of operating in a learn mode. In learn mode, master information is generated by the document handling system 10 itself by processing one or more genuine or authentic bills. The information obtained is then stored in memory as master information. In standard mode, the detected data from the bills is compared to master information stored in memory. The master information may correspond to data generated from genuine "master" currency bills from a plurality of currency systems and/or denominations. Typically, the master data represents an expected numerical value or range of numerical values associated with the detected attribute(s) of genuine currency.

After the operator selects the denomination and the type of bills to be processed, the document handling system 10 then generates (in "learn" mode) or selects (in "standard" mode) the master information corresponding to the type of currency system and denomination of the bill(s) to be processed. Referring to FIGS. 1–3, in learn mode, one or more representative "master" currency bills is deposited in the hopper 136 and fed through the system 10 as described above. While several "master" bills may be used to "learn" attributes such as density and UV and magnetic characteristics, usually a single master bill is used to "learn" reflected "pattern" characteristics. The master currency bills will preferably comprise bills from a particular currency type and denomination but may include bills which are initially unrecognizable to the document handling system 10. As the master currency bills are conveyed through the document handling system 10, attribute(s) of the master bills are sensed and master information corresponding to the master bills is stored in the memory 356. For example, the operator may enter that $20 U.S. notes will be processed. In learn mode, the document handling system 10 then evaluates a representative set of authentic $20 U.S. notes and generates a set of master information corresponding to the authentic $20 U.S. notes. Accordingly, in the learn mode, the document handling system 10 is able to generate the necessary master information independently, without having been pre-programmed with such master information. In standard mode, the document handling system 10 would evaluate the set of $20 U.S. notes with respect to stored master information corresponding to authentic $20 U.S. notes.

The characteristic(s) or attribute(s) of the bill that correspond to master information may include, as mentioned above, data corresponding to the size, magnetic content, UV reflectance levels, fluorescence, density, security thread content, color shifting ink content, hologram, kintogram and/or watermark of the bill.

According to some embodiments of the present invention, the master information comprises numerical data associated with various denominations of currency bills from various types of currency systems. The numerical data may comprise, for example, thresholds of acceptability to be used in evaluating test bills, based on expected numerical values associated with the currency or a range of numerical values defining upper and lower limits of acceptability. The thresholds may be associated with various sensitivity levels, as described above in relation to Table 1 and Table 2. Alternatively, the master information may comprise other information associated with the currency such as, for example, optical or magnetic patterns, symbols, codes or alphanumeric characters. In either case, the master information comprises parameters which may be used in evaluating test bills in the same manner described above in relation to the standard mode of operation.

Master information may be obtained in the learn mode from different types of international currency systems and/or denominations. The learn mode may be repeated in successive trials to accumulate master information from multiple types and/or denominations. For example, in a first operation of the learn mode, master currency bills of a first type and denomination may be conveyed through the document handling system 10 and processed to obtain master information associated with the first type and denomination, which may then be stored in the system memory 356. Then, in a second operation of the learn mode, master currency bills of a second type and denomination may be conveyed through the document handling system 10 and processed to obtain master information associated with the second type and denomination, which also may be stored in the system memory 356. This process may be repeated several times to obtain master information associated with multiple currency types and denominations. The information associated with each of the currency types and denominations is stored in system memory 356 for recall in "standard" mode, as described above.

Figure 15:
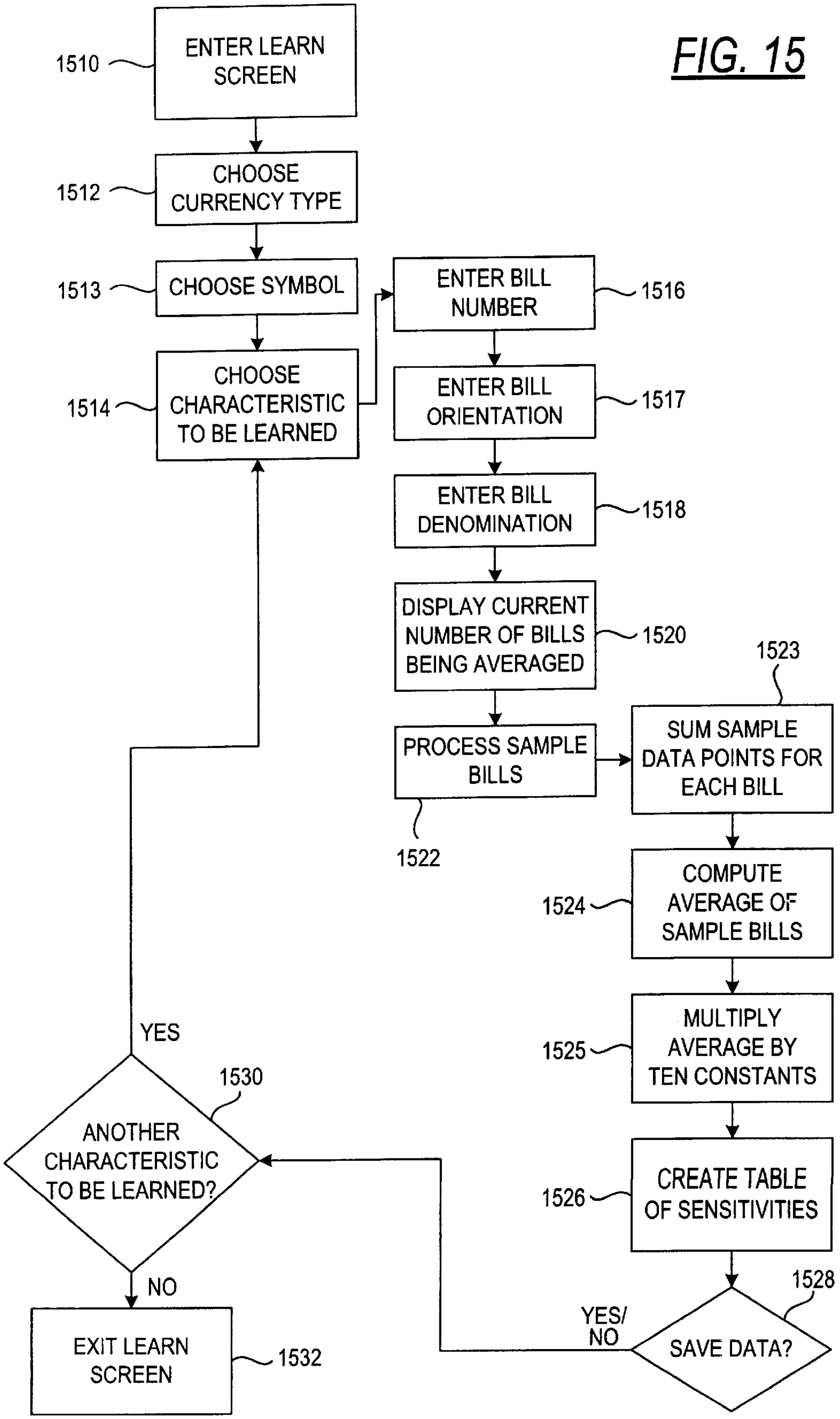
FIG. 15 is a flowchart illustrating one embodiment by which a document handling system according to the present invention may learn and generate master data.

One embodiment of the learn mode utilizes a program, process or routine as illustrated in the flow chart of FIG. 15. This embodiment will be discussed in connection with the operator interface of FIG. 4*a*. First, the operator enters the learn screen at step 1510 by pressing "MODE" key 465*b*. Next the operator chooses the currency type of the bills to be processed in the learn mode at step 1512 by scrolling through the list of currency types that are displayed on the screen when the learn mode is entered at step 1510. The operator chooses the desired currency type by aligning the cursor with the desired currency type displayed on the screen. The display then changes to a list of currency symbols, and the operator chooses the currency symbol associated with the currency type to be processed at step 1513 by scrolling through the displayed list of currency symbols. The operator chooses the desired currency symbol by again aligning the cursor with the desired symbol displayed on the screen.

This advances the program to step 1514 which changes the display to a menu of currency characteristics to be learned. These characteristics include all the characteristics described above, such as size (length/width), density, magnetic content, UV reflectance, fluorescence, and the presence of a security thread. Again, the operator selects the desired characteristics to be learned by aligning the cursor with the desired characteristic. Then, the program advances to step 1516 where the operator enters the bill number, which is simply an integer between one and nine which identifies the different denominations and series of bills for any given currency type. For example, different types of currency have denominations that have more than one series, e.g., there are two series of U.S. $100 bills, one with the old design and one with the new design. In this embodiment of the system 10, up to nine bill denominations and/or series can be learned for each currency type. Here again, the display contains a menu of the available bill numbers (1–9), and the operator selects the desired bill number by aligning the cursor with the desired bill number. The program then advances to step 1517, where the operator enters the bill orientation, i.e., face up bottom edge forward, face up top edge forward, face down bottom edge forward or face down top edge forward.

The system 10 then advances to step 1518 which causes the display to prompt the operator to enter the denomination by using one of the available value selection or "VAL" keys 464*a–f* or, by scrolling through available denominations on a display 463, to identify the particular denomination to be learned. The "VAL" keys 464*a–f* and/or scrolled display correspond to the denominations of any currency type entered in step 1512. When the operator enters the denomination, the system 10 advances to step 1520 where the current number of bills being averaged is displayed. For example, it may be desirable to average several different bills of the same denomination, but in different conditions, e.g., different degrees of wear, so that the data s of a variety of bills of the same denomination, but of different conditions, can be averaged. Typically, 50 to 100 bills are averaged in the learn mode in order to evaluate, authenticate or otherwise process bills in the standard mode more accurately. However, the number of bills averaged can be greater or less then the 50 to 100 bills averaged in this embodiment of the learn mode. One data averaging procedure is described in more detail in U.S. Pat. No. 5,633,949.

From step 1520, the system advances to step 1522 where the display prompts the operator to load the sample bill(s) into the input hopper 136 and then press the "START" key 465*a*. The bill(s) are processed by the system 10 by being fed, one at a time, into the transport mechanism 340 of the system 10. As the bill(s) are fed through the system 10, the system senses each bill at various sample data points to produce master data corresponding to the sampled bill. An example of such a process is described in co-pending U.S. patent application Ser. No. 60/078269 entitled "Color Scanhead And Document handling system Employing The Same" and filed on Mar. 17, 1998 and assigned to the assignee of the present application, the relevant descriptive portions of which are incorporated herein by reference.

At this point, step 1523 sums the sample data points taken along each bill. The system 10 in step 1524 computes the average of the totals from step 1523 by dividing each of the totals from step 1523 by the number of bills being averaged. For example, if the operator chose the magnetic characteristic to be learned, the system 10 would sum the measured magnetic content of each bill at 58 sample data points and then compute the average of the sample bills by dividing the totals for each bill by the number of bills being averaged.

If the operator chose the UV characteristic to be learned, the system 10 would sum the measured UV reflectance of each bill at 40 sample data points and then compute the average of the sample bills by dividing the totals for each bill by the number of bills being averaged. If the operator chose the density characteristic to be learned, the system 10 would sum the measured density of each bill at various sample data points and then compute the average of the sample bills by dividing the totals for each bill by the number of bills being averaged. Similarly, if the operator chose the fluorescence characteristic to be learned, the system 10 would sum the measured fluorescence of each bill at various sample data points and then compute the average s of the sample bills by dividing the totals for each bill by the number of bills being averaged. Likewise, if the operator chose the security thread characteristic to be learned, the system 10 would sum the data corresponding to the location/presence of the security thread of each bill at various sample data points and then compute the average of the sample bills by dividing the totals for each bill by the number of bills being averaged.

The resulting average from step 1524 corresponding to the sample bills is multiplied by 10 empirically derived constants at step 1525, ranging from zero to one, in order to create a table of sensitivity values at step 1526. The 10 constants used at step 1525 are determined empirically to correspond to differing degrees of authentication accuracy. Authentication test sensitivity was discussed in detail above at section IV. A. For example, if the operator chose the magnetic characteristic to be learned and the average magnetism found from step 1524 was 1,000, the system 10 would create the following table of sensitivities:

TABLE 4

| Sensitivity Level | 1 | 2 | 3 | 4 | 5 | 6 | 7 | 8 | 9 | 10 |
|---|---|---|---|---|---|---|---|---|---|---|
| Magnetism Threshold | 100 | 150 | 200 | 400 | 500 | 650 | 750 | 800 | 850 | 900 |

After the system 10 has completed step 1526, the operator will be prompted to save the data corresponding to the characteristic learned at step 1528. The operator saves the data by selecting "YES" from the display menu by aligning the cursor over "YES" and pressing the "ACCEPT" key. Similarly, to continue without storing the data, the operator selects "NO" from the display menu by aligning the cursor over "NO" and pressing the "ACCEPT" key. Whether or not the operator saves the data, the operator will next decide in step 1530 whether to continue in learn mode or whether to exit the learn screen. If the operator chooses to have the system 10 learn another characteristic, steps 1514–1530 are repeated. The operator chooses whether to learn another characteristic at step 1530 by selecting either "YES" or "NO" from the display menu by aligning the cursor over the appropriate response and pressing the "ACCEPT" key. If the operator chooses not to learn another characteristic by selecting "NO", then the system 10 in step 1532 will exit the learn screen.

In one embodiment, the document handling system 10 may learn a plurality of different types of currency systems and/or denominations. This is useful because in European countries, for example, with the advent of Euro currency (EC currency), it may be expected that both EC currency and a national currency will circulate in any given country. In Germany, for a more specific example, it may be expected that both EC currency and German deutsche marks (DMs) will circulate. With the learn mode capability of the present invention, a German operator may obtain master information associated with both EC and DM currency and store the information in system memory 356.

Of course, the "family" of desirable currencies for any particular system 10 may include more than two types of currency systems. For example, a centralized commercial bank in the European Community may handle several types of currency systems including EC currency, German DMs, British Pounds, French Francs, U.S. Dollars, Japanese Yen and Swiss Francs. In like manner, the desirable "family" of currency systems in Tokyo, Hong Kong or other parts of Asia may include Japanese Yen, Chinese Remimbi, U.S. Dollars, German DMs, British Pounds and Hong Kong Dollars. As a further example, a desirable family of currency systems in the United States may include the combination of U.S. Dollars, British Pounds, German DMs, Canadian Dollars and Japanese Yen. With the learn mode capability of the present invention, master information may be obtained from any denomination of currency in any desired "family" by simply repeating the learn mode for each currency system and denomination in the family.

The document handling system 10 may learn a plurality of different types of currency systems and/or denominations by successively using the learn mode by running currency bills of the designated currency system family, one denomination at a time, past the sensor(s) 320 of the system 10 to obtain the necessary master information. The currency bills may be fed individually through the system 10 or in stacks of the designated type and denomination. The bill(s) fed through the system may include good quality bill(s), poor quality bill(s) or both. The master information obtained from the bills defines (or may be processed to define) thresholds, ranges of acceptability or patterns of bills of the designated type and denomination which are later to be evaluated in "standard" mode.

For example, suppose a single good quality bill of a designated type of currency system and denomination is fed through the system 10 in learn mode. The master information obtained from the bill may be processed to define a range of acceptability for bills of the designated type and denomination. For instance, the master information obtained from the learn mode bill may define a "center" value of the range, with "deltas," plus or minus the center value being determined by the system 10 to define the upper and lower bounds of the range. Alternatively, a range of acceptability may be obtained by feeding a stack of bills through the system 10, each bill in the stack being of generally "good" quality, but differing in degree of quality from others in the stack. In this example, the average value of the notes in the stack may define a "center value" of a range, with values plus or minus the center value defining the upper and lower bounds of the range, as described above. Alternatively, other statistical analysis may be employed to define thresholds, patterns or ranges, such as standard deviation information being used to define upper and lower bounds of the range.

In another embodiment, master information obtained from the poorest quality of the learn mode bills may be used to define the limits of acceptability for bills of the designated type and denomination, such that bills of the designated type and denomination evaluated in standard mode will be accepted if they are at least as "good" in quality as the poorest quality of the learn mode bills. Still another alternative is to feed one or more poor quality bills through the system 10 to define "unacceptable" bill(s) of the designated type and denomination, such that bills of the designated type and denomination evaluated in standard mode will not be accepted unless they are better in quality than the poor quality learn mode bills.

Because the currency bills are not discriminated by the document handling system 10, the operator must inform the system 10 (by means of an operator interface panel, for example) which type of currency system and denomination it is "learning," and whether it is learning a good quality (e.g., "acceptable") or poor quality (e.g., "marginally acceptable" or "unacceptable") bill so that the system 10 may correlate the master information it obtains (and stores in memory) with the appropriate type, denomination and acceptability status of the bill(s).

As discussed above, in one embodiment, various menu displays may be utilized at the operator interface panel to prompt the operator to enter the type and denomination of the currency to be "learned" in learn mode. The learn mode menu may also prompt the operator to select the type of authentication tests to be performed in learn mode. The available selection options in the menu may be predetermined "default" settings or customizable settings programmed into the system 10 in the set-up mode.

In one embodiment, for example, a currency system selection sub-menu may offer United States, Canada, Mexico and EC currency as the currency system selection options, a denomination selection sub-menu may offer the units 1, 2, 3, 4, 5, 10, 20, 50 and 100 as denomination selection options, and an authentication test selection menu may offer optical, UV, magnetic, thread detection, size detection and color as authentication test selection options.

In one embodiment, user-defined labels and settings may be entered into the system 10 to accommodate new types of currency systems and/or denominations. The operator may enter labels and selection options appropriate to the new type of currency system and/or denomination through the learn mode menu, or may define a tailored learn mode menu appropriate to the new type of currency system and/or denomination in the set-up mode. The available menu selection options may include denomination selection options and authentication test selection options as heretofore described. The user-defined options may be used, for example, where a system 10 will be instructed to learn a casino's own type of money. In such a case, rather than selecting a type of currency system, the operator may enter a label (e.g., Skyline casino) identifying the type of money to be learned via the operator interface panel. Then, the operator may select the denomination(s) of the currency to be learned, and perhaps the authentication test(s) to be performed, through the learn mode menu as heretofore described. The user may select from among the available menu or sub-menu options by "clicking" over an appropriate icon, pressing a touch-screen key or some other means. The type, denomination and/or test selection menus may offer selection options tailored to the types and/or denominations which have been selected. Thus, for example, where the United States has been selected as the type of currency system from the selection menu, the denomination selection menu may offer $1, $5, $10, $20, $50 and $100 as available denomination selection options and the authentication test selection menu may offer UV, magnetic, thread detection and/or color as test selection options.

For purposes of illustration, suppose that an operator desires to obtain master information for new $50 U.S. bills. In one embodiment, the operator first instructs the system 10, by means of the operator interface panel, to enter the learn mode. Then, the operator selects, through the appropriate menu(s), the type and denomination to be "learned" (e.g., U.S. $50). Through the test selection menu, the operator may instruct the system 10 which authentication test(s) to perform, i.e., which attribute(s) to detect, to obtain the master information. In another embodiment, the system 10 automatically selects the appropriate type(s) of learn mode sensor(s) to perform the selected tests based on the type and denomination entered by the operator. In either embodiment, the operator may then insert a single good-quality bill or a stack of such bills of the selected type and denomination (or a number of such bills) in the hopper 136. The system 10 feeds the bill(s) through the system and evaluates the bills with sensors appropriate for the selected test(s) to obtain master information associated with the bills. The master information is stored in the system memory and is retrievable for later use in "standard" mode to evaluate, authenticate or otherwise process bills corresponding to the "learned" denomination.

Where a single bill is fed through the system 10, suppose that an arbitrary value "x" is obtained from the learn mode sensors. The system 10 may define the value "x" to be a center value of an "acceptable" range for $5 U.S. bills. The system 10 may further define the values "x+y" and "x−y" to comprise the upper and lower bounds of the "acceptable" range for $5 U.S. bills, where y is a tolerance value appropriate to the type of test. An appropriate value of y may be derived in relation to the value x (e.g., in terms of standard deviation) or may be independent of x. The value of y may differ according to the type of test employed and the different results which may be expected from the tests. For example, for two tests A and B, an appropriate value of y may be 0.1 volts for test A and 0.01 volts for test B.

Alternatively, the ranges of acceptability may be derived from an average sensor value obtained from multiple bills. Thus, for example, where multiple $5 U.S. bills, each bill being of generally "good" quality, are fed through the system 10, (and again using the arbitrary sensor value "x" for purposes of illustration), suppose that the average sensor value obtained from the bills is "1.1x". The system 10 may define the "acceptable" range for $5 U.S. bills to be centered at the average sensor value "1.1x," with a tolerance value "y" substantially as described above defining in this case an upper bound "1.1x+y" and a lower bound "1.1x−y" of acceptability. As a further alternative, where multiple bills (e.g., $5 U.S. bills) are fed through the system 10, suppose that sensor values obtained in the learn mode range between "1.4x" and "0.9x". The system 10 may define the values "1.4x" and "0.9x" to be the upper and is lower bounds of the "acceptable range" for $5 U.S. bills, without regard to the average value.

According to one embodiment, the operator includes, in the stack of master currency to be processed, both new, uncirculated currency and bills which have been in circulation to varying degrees. In this embodiment, bills of the poorest quality may be fed through the system to define the outer limits of acceptability of the bills. For example, suppose that the operator feeds two poor quality $5 U.S. bills through the system 10, and suppose that sensor readings of "1.5x" and "0.7x" are obtained from the poor quality bills. The system 10 may then determine the range of acceptability for $5 U.S. bills to be between the values of "0.7x" and "1.5x."

Next, after master information has been obtained from $5 U.S. bills, the operator instructs the system 10 that it will be reading a second, third, fourth, etc. type of currency system and denomination (e.g., $10 U.S. bills and $5 and $10 Canadian bills), then feeds the respective bill(s) through the system 10 to obtain master information and derive thresholds of acceptability from the bills, in any of the manners heretofore described. In one embodiment, the operator may further instruct the system 10 which type of tests and/or sensor(s) that it should use to obtain the master information. For example, an operator may wish to use optical and magnetic sensors for U.S. currency and only optical sensors for Canadian currency. After the operator has obtained master information from each desired type and denomination, the operator instructs the system 10 to enter "standard" mode, or to depart the "learn" mode. The operator may nevertheless re-enter the learn mode at a subsequent time to obtain master information from other currency systems and/or denominations.

It will be appreciated that the master information obtained in "learn" mode is not limited to ranges of values as described in the examples above. Rather, the master information may comprise pattern information, numerical thresholds other than ranges, or generally any type of information which may be obtained by the learn mode sensors.

The sensors used to obtain master information in learn mode (or, the "learn mode" sensors) may be either separate from or the same as the sensors used to obtain data in standard mode (or, the "standard mode" sensors). Where the sensors are the same in both learn mode and standard mode, the sensors constitute "dual-function" sensors (e.g., operable as both a "learn mode" sensor and a "standard mode" sensor). The characteristic information obtained from the sensed bills may include the characteristics mentioned above in connection with section IV. Systems including a learn mode are described in more detail in U.S. patent application Ser. No. 08/852,400, filed May 7, 1997, entitled "Intelligent Document handling system" which is assigned to the assignee of the present application and incorporated herein by reference in its entirety.

VII. Flash Memory

One embodiment of this invention provides a flash memory 1666 and flash memory card 1668 to facilitate quickly and efficiently programming a plurality of document handling systems with a certain set-up from one or more document handling systems that are already programmed with the desired set-up information.

Figure 16:
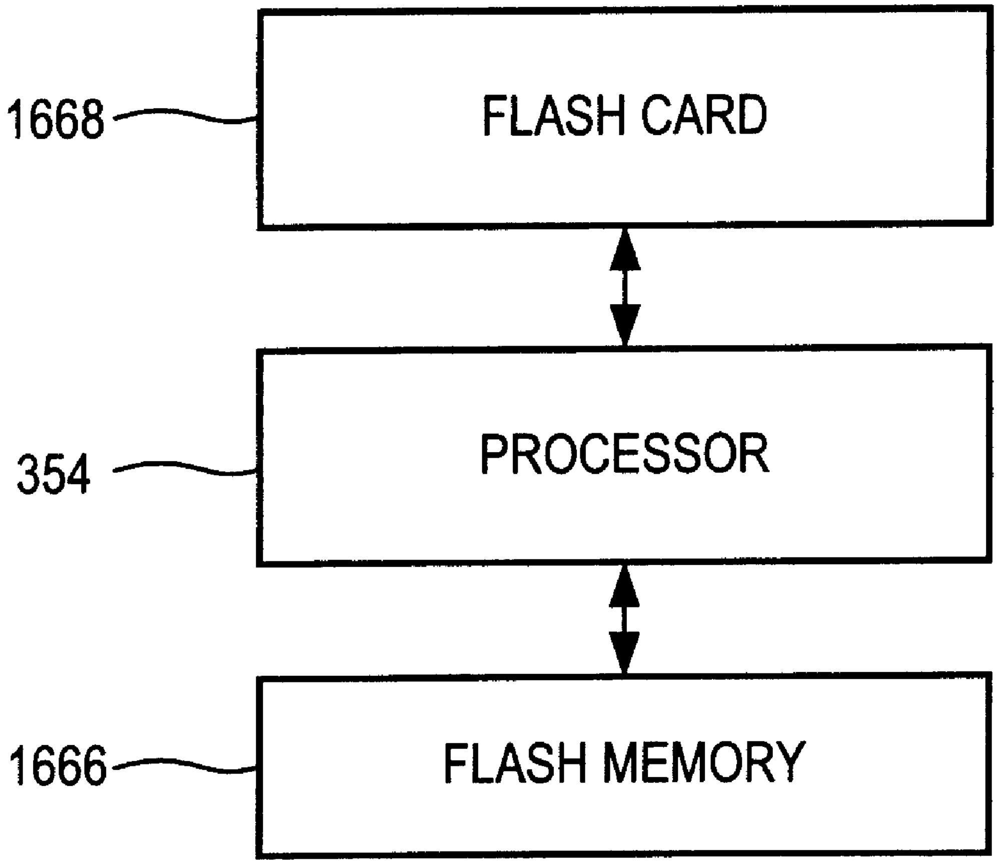
FIG. 16 illustrates a functional block diagram of the memory system of a document handling system according to one embodiment of the present invention.

Referring to FIG. 16, a block diagram of a CPU 1654 is illustrated. The CPU 1654 could be connected to a document handling system, as depicted in FIG. 3. The CPU 1654 is electrically connected to the flash memory 1666, which in turn is adapted to be electrically connected to the flash card 1668 having its own flash memory (not shown). The master information used in evaluating bills under test is stored in the flash memory 1666. Upon connection of the flash card 1668 to the flash memory 1666, the contents of the flash memory, including the master information generated in the learn mode, are copied onto the flash card 1668. Thereafter, the flash card 1668 may be used to update the flash memories of additional systems. In this system, therefore, the independent generation of master information accomplished in the learn mode need only be accomplished by one system and quickly and efficiently loaded into other systems without repeating the learn mode in the other systems.

The flash card loading system of the present invention can be used not only for copying master information, such as numerical threshold values, from system to system, but also for coping substantially all of the contents of the flash memory from one system to the flash memory of other systems. Thus, in addition to master information, the contents of the flash memory may include, for example, tailored operating parameters associated with the particular document handling system 10 such as, for example, a user-defined keyboard and/or display which have been programmed to suit an individual operator or particular system. The contents of the flash memory may also include the sensor set-up parameters associated with the various types of international currency systems that the document handling system 10 is capable of handling. Therefore, by using the flash card loading system of the present invention, these various parameters may be quickly and efficiently transferred from one system to a plurality of other systems, thereby reducing the time required to set-up the other systems at the desired parameters.

The flash card loading system of the present invention provides manufacturers the ability to easily program a plurality of document handling systems for use in a plurality of different countries each using a different currency system. For example, the manufacturer can have a preprogrammed flash card for each of the countries in which it intends to market its document handling system. In this way, the manufacturer can simply insert the appropriate flash card into each document handling system being sent to a particular country. For example, for systems being sent to Japan, the manufacturer simply inserts the flash card with the Japanese set-up options into the systems. Alternatively, instead of preprogrammed flash cards, the manufacturer or a distributor or end-user could set-up one system for a particular country and thereafter use the flash card from the first system to set-up the other systems that are to be sent to the same country, distributed by the distributor or used by the end-user.

Flash memories are relatively well known in the art. Some of the several advantages of flash memories are that they are nonvolatile (e.g., their data content is preserved without requiring connection to a power supply) and they may be electrically erased and reprogrammed, within fractions of a second, through electrical control signals. An example of a specific type of flash memory which may be used in the document handling system 10 is product number Am29F010, commercially available from Advanced Micro Devices, Inc. ("AMD") of Sunnyvale, Calif. and described in detail in AMD's publication entitled "Flash Memory Products—1996 Data Book/Handbook", incorporated herein by reference. However, those skilled in the art will appreciate that other types of flash memories may be utilized, depending on the system memory requirements and desired operating characteristics.

Figure 17A:
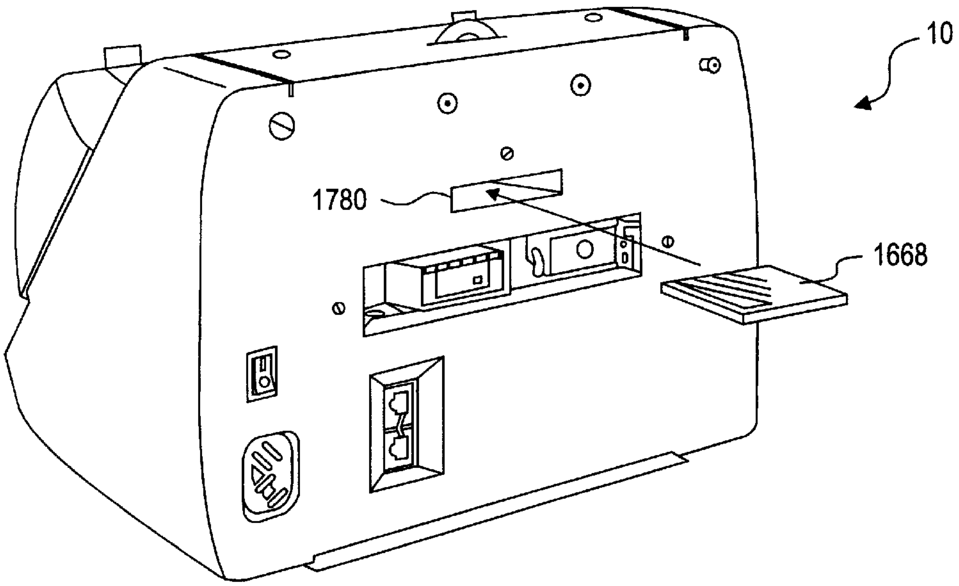
FIGS. 17*a* and 17*b* are simplified isometric views depicting the insertion of a flash card into a document handling system according to one embodiment of the present invention.

FIG. 17*a* depicts a document handling system 10 having an external slot 1780 is for receiving a flash card 1668 according to one embodiment of the invention. The removable flash card 1668 is adapted to be inserted by a user through the external slot 1780 and into a mating socket 1784 located inside the system 10 adjacent the slot 1780. Upon insertion of the flash card 1668 into the socket 1784, an electrical connection is formed between the flash card 1668 and the flash memory 1666 resident in the system. According to one embodiment, the flash card 1668 is small, lightweight and sturdy enough to withstand multiple uses. The flash card 1668 is adapted to be easily insertable into the slot 1780 and the corresponding socket 1784 of the document handling system 10 by users not having any special training. Furthermore, the flash card 1668 should not require any special electrostatic or physical protection to protect it from damage during shipping and handling. One type of flash card that has been found to satisfy these criteria is the FlashLite™ Memory Card available from AMP, Inc. of Harrisburg, Pa. However, it is envisioned that other suitable types of flash cards will become available from other manufacturers. The FlashLite™ card has a thickness of 3.3 mm (⅛ inch), a width of approximately 45 mm (1.8 inches) and a 68-pin connector interface compatible with the Personal Computer Memory Card International Association (PCMCIA) industry standards. Its length may be varied to suit the needs of the user. In one embodiment, two sizes of flashcards (designated "half size" and "full size") have lengths of 2.1 inches (53 mm) and 3.3 inches (84 mm), respectively, but other sizes of flash cards may also be utilized.

Figure 17B:
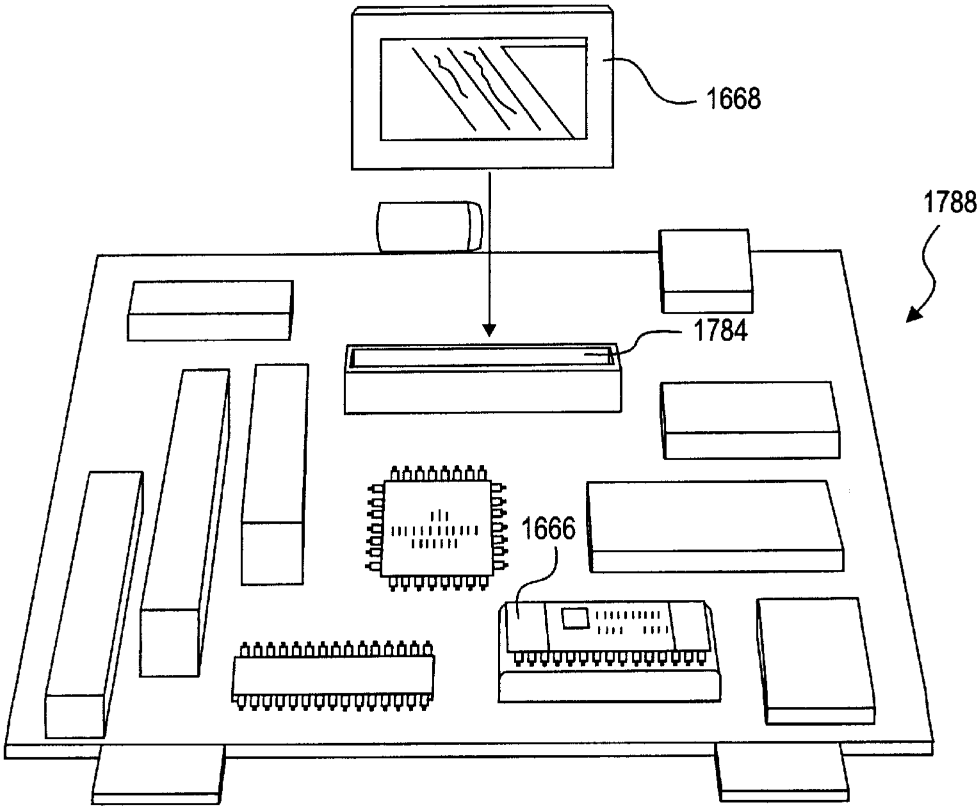

FIG. 17*b* depicts a circuit board assembly 1788 including the socket 1784 adapted to receive the flash card 1668 according to one embodiment of the invention. As will be appreciated by those skilled in the art, however, the flash card 1668 may be electrically coupled to the resident flash memory 1666 by any of several alternative means other than a socket. Upon insertion of the flash card 1668 into the socket 1784, electrical signals are communicated from the flash card 1668 to the resident flash memory 1666 of the system. In one embodiment, the socket 1784 comprises a PCMCIA-compatible 68-position receptacle for receiving a flash card such as the FlashLite™ card described above. One type of socket that may be used for this purpose is AMP, Inc.

product number 146773-1, which is adapted to extend vertically from the circuit board assembly 1788 within the document handling system 10 . However, it will be appreciated by those skilled in the art that other types of sockets may be utilized, including those positioned horizontally in relation to the circuit board assembly 1788, or those including a lever or button which may be depressed to eject the flash card 1668 from the socket 1784.

Upon insertion of the flash card 1668 into its socket 1784, the CPU is capable of electrically detecting the presence of the card. If the FlashLite™ card is used, this is accomplished by means of two specially designated connector pins CD1 and CD2 (assigned to pin numbers 36 and 67, respectively) being shorted to ground. The CPU then compares the contents of the flash card memory with the contents of the resident flash memory 1666. If the contents of the memories are different, the required sectors in the flash card memory are erased and replaced with new code copied from the resident flash memory 1666. If the contents of the memories are the same, an audible or visual message is provided to the user indicating that the process is concluded. Upon successful completion of the memory transfer, the flash card memory thereby is programmed with the same set of master information as the resident flash memory. Thus, for example, where the resident flash memory contains master information obtained in "learn mode" from a family of different currency types and denominations, such master information becomes transferred to the flash card memory.

The flash card 1668 can thereafter be removed from the document handling system 10 and plugged into any other document handling system requiring that same set of master information. The master information is copied from the flash card memory to the flash memory of the additional systems in substantially the same manner (although reversed) as the information was initially copied onto the flash card. Thus, for example, where the flash card memory contains master information obtained in "learn mode" from a document handling system 10 which has been transferred to the flash card, such master information can be transferred to the resident flash memory of a number of other systems. The transfer of memory in this manner may thereby be used to replace or upgrade the denominations and/or types currencies to be processed by any particular system. In the event of an unsuccessful memory transfer, the system will automatically re-attempt the transfer until, after multiple unsuccessful attempts, the user will be advised that there is a hard system failure and to call for service.

For purposes of illustration, suppose for example that a particular system 10 includes master information to accommodate German DMs and EC currency, and it is desired for whatever reason to replace this "first" set of master information with a "second" set of master information, to accommodate British pounds and U.S. dollars. This may be accomplished by simply plugging an appropriately-programmed flash card into the system 10, causing the first set of master information to be replaced with the second set. It will be appreciated that the memory of any particular system 10 may be changed multiple times, to accommodate any of several alternative combinations of currencies through the above-described flash card memory transfer.

It is to be appreciated that the system 10 may also use $E^2$ PROMS to store data. It is to be further appreciated that the system 10 may use alternative methods of transferring data from one system to another, such as by a serial port link. Furthermore, the systems described above may contain unique customization features such as user-defined keys, user-defined print outs, user-defined modes of operation and user-defined set-ups. The customization features may be controlled or changed via an operator interface panel such as the ones described above.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A document handling apparatus for processing currency bills issued by different countries, the apparatus comprising:

a transport mechanism for transporting bills, one at a time, along a transport path;

at least one sensor located along said transport path for producing at least a count signal in response to each bill transported thereby;

an input device for specifying the type of currency to be counted and the denomination of currency to be counted; and a processor for calculating the total value of bills of each currency type based at least in part on the count signal produced by the sensor and the specified currency type and denomination.

2. The apparatus of claim 1 wherein said input device comprises an operator interface panel for permitting an operator to specify the type of currency and the denomination of currency to be counted.

3. The apparatus of claim 1 wherein said input device comprises said at least one sensor further sensing at least one attribute of a document, and producing a corresponding attribute signal, said processor being responsive to said attribute signal for determining at least one of the type of currency to be counted and the denomination of the currency to be counted.

4. The apparatus according to claim 3 wherein said at least one attribute comprises the size of a bill, said at least one sensor producing a corresponding bill size signal, said processor being responsive to said bill size signal for determining at least one of a denomination and a type of currency of each bill.

5. The apparatus of claim 1 and further including a display responsive to said processor for displaying the total value of each type of currency counted by the counting sensor.

6. The apparatus of claim 1 and further including:

a memory for storing master characteristics for multiple currency types and denominations; and a characteristic sensor located along said transport path for sensing at least one characteristic of each bill transported thereby, said processor comparing the sensed characteristic with at least one of said master characteristics to determine the authenticity of each bill.

7. The apparatus of claim 5 wherein said display includes a value field and a symbol field, and wherein said processor is responsive to said input device for displaying in said symbol field a symbol corresponding to the type of currency specified by the input device.

8. The apparatus of claim 6 wherein said processor is responsive to said input device for selecting at least one master bill characteristic from said memory which corresponds to at least one of a type of currency and a denomination of the currency specified by said input device.

9. The apparatus of claim 2 wherein said operator interface panel comprises a touch-screen display for displaying a currency selection menu of available currency types and for specifying the type of currency to be counted by touch-selecting one of said available currency types from said currency selection menu.

10. The apparatus of claim 6 wherein said processor generates said master characteristics in response to said characteristic sensor when a genuine bill is transported along said transport path.

11. A method of counting currency bills issued by different countries, comprising the steps of:

transporting bills, one at a time, along a transport path;

counting the number of bills transported along said transport path;

specifying the type of currency to be counted and the denomination of currency to be counted; and calculating the total value of each currency type based at least in part on the number of bills counted and the specified currency type and denomination.

12. The method of claim 11 wherein the step of specifying comprises permitting an operator to specify the type of currency and the denomination of currency to be counted.

13. The method of claim 11 wherein the step of specifying comprises sensing at least one attribute of a document and producing a corresponding attribute signal, and determining at least one of a type of currency to be counted and a denomination of the currency to be counted in response to said attribute signal.

14. The method of claim 13 wherein the step of sensing at least one attribute and producing a corresponding attribute signal comprise sensing the size of a bill and producing a corresponding bill size signal.

15. The method of claim 11 and further including the step of displaying the total value of each type of currency counted by the step of counting.

16. The method of claim 11 and further including:

storing master characteristics for multiple currency types and denominations; and sensing at least one characteristic of each bill transported along said transport path, and comparing the sensed characteristic with at least one of said master characteristics to determine the authenticity of each bill.

17. The method of claim 15 wherein the step of displaying includes displaying in a symbol field a symbol corresponding to the type of currency specified by the step of specifying.

18. The method of claim 16 and further including the step of selecting at least one master bill characteristic of a master bill which corresponds to at least one of a type of currency and a denomination of currency specified by said specifying step, for use in said comparing step.

19. The method of claim 12 and further including the step of displaying a currency selection menu of available currency types in a touch screen format for use by an operator for specifying the type of currency to be counted.

20. The method of claim 16 and further including the step of generating said master characteristics in response to the step of sensing characteristics when one or more genuine bills are transported along said transport path.

21. A document handling apparatus for processing currency bills of different types, the apparatus comprising:

a transport mechanism for transporting bills, one at a time, along a transport path;

at least one sensor located along said transport path for producing at least a count signal in response to each bill transported therealong;

an input device for specifying a type of currency to be counted and a denomination of currency to be counted;

a memory for storing master bill characteristics for multiple currency types and denominations;

said at least one sensor located along said transport path further sensing at least one characteristic of each bill transported therealong; and a processor for authenticating bills by comparing the sensed characteristic with one of said stored master characteristics selected on the basis of the specified currency type and denomination, and for calculating a total value of counted and authenticated bills of each currency type.

22. The apparatus of claim 21 wherein said input device comprises an operator interface panel for permitting the operator to specify the type of currency and the denomination of currency to be counted.

23. The apparatus of claim 21 wherein said input device comprises said at least one sensor further sensing at least one attribute of a document, and producing a corresponding signal, said processor being responsive to said attribute signal for determining at least one of a type of currency to be counted and a denomination of currency to be counted.

24. The apparatus according to claim 21 wherein said at least one attribute comprises the size of a bill, said at least one sensor producing a corresponding bill size signal, said processor being responsive to said bill size signal for determining at least one of a denomination and a type of currency of each bill.

25. The apparatus of claim 21 and further including a display responsive to said processor for displaying the total value of each currency type of authenticated bills counted.

26. The apparatus of claim 25 wherein said display includes a value field and a symbol field, and wherein said processor is responsive to said input device for displaying in said symbol field a symbol corresponding to the type of currency specified by the input device.

27. The apparatus of claim 21 wherein said processor is responsive to said input device for selecting at least one master bill characteristic from said memory which corresponds to at least one of a type of currency and a denomination of currency specified by said input device.

28. The apparatus of claim 22 wherein said operator interface panel comprises a touch-screen display for displaying a currency selection menu of available currency types and for specifying the type of currency to be counted by touch-selecting one of said available currency types from said currency selection menu.

29. The apparatus of claim 21 wherein said processor generates said master characteristics in response to said characteristic sensor when a genuine bill is transported along said transport path.

30. A document handling method for processing currency bills of different types, the method comprising the steps of:

transporting bills, one at a time, along transport path;

counting the number of bills transported along said transport path;

specifying the type of currency to be counted and the denomination of currency to be counted;

storing master bill characteristics for multiple currency types and denominations;

sensing at least one characteristic of each bill transported along said transport path;

authenticating said bills by comparing the sensed characteristic with one of said stored master characteristics selected on the basis of the specified currency type and denomination; and calculating a total value of authenticated bills of each currency type based upon the specified currency type and denomination and the number of authenticated bills counted.

31. The method of claim of 30 wherein the step of specifying comprises permitting the operator to specify the type of currency and the denomination of currency to be counted.

32. The method of claim 30 wherein the step of specifying comprises sensing at least one attribute of a document and producing a corresponding signal, and determining at least one of a type of currency to be counted and a denomination of the currency to be counted in response to said attribute signal.

33. The method according to claim 30 wherein the step of sensing at least one attribute and producing a corresponding attribute signal comprises sensing the size of a bill and producing a corresponding bill size signal.

34. The method of claim 30 and further including the step of displaying the total value of each type of currency bills counted by the step of counting and authenticated by the step of authenticating.

35. The method of claim 30 wherein the step of displaying includes displaying in a symbol field a symbol corresponding to the type of currency specified by the step of specifying.

36. The method of claim 30 and further including the step of selecting at least one master bill characteristic of a master bill which corresponds to at least one of a type of currency and a denomination of currency specified by said specifying step, for use in said comparing step.

37. The method of claim 30 and further including the step of displaying a currency selection menu of available currency types in a touch screen format for use by an operator for specifying the type of currency to be counted.

38. The method of claim 30 and further including the step of generating said master characteristics in response to the step of sensing characteristics when one or more genuine bills are transported along said transport path.

39. A customizable note counter for processing international currency bills, the note counter comprising:

a control panel including a currency selection element, the currency selection element being operable to select a designated currency type to be processed by the note counter from among a plurality of available types of international currency;

a counting sensor which counts bills of the designated currency type; and a display screen which displays information associated with counted bills of the designated currency type.

40. The note counter of claim 39 further including a language selection element operable to select a designated language to be used on the display screen.

41. The note counter of claim 40 wherein the language selection element automatically determines the designated language to be used on the display screen in response to selection of a designated currency type.

42. The note counter of claim 39 further including an amount symbol selection element operable to select a designated amount symbol to be used on the display screen.

43. The note counter of claim 42 wherein the amount symbol selection element automatically determines the designated amount symbol to be used on the display screen in response to selection of a designated currency type.

44. The note counter of claim 39 wherein the display screen is operable to display selection options associated with the currency selection element, the selection options including a listing of the available types of international currency.

45. The note counter of claim 44 wherein the display screen comprises a touch-screen display, the touch-screen display including a currency selection menu which displays the selection options associated with the currency selection element, the designated currency type being selectable from the currency selection menu by touching an area of the touch-screen display associated with the designated currency type.

46. The note counter of claim 39 wherein the control panel further includes a denomination selection element, the denomination selection element being operable to select a designated denomination of the currency type to be processed by the note counter, the counting sensor being adapted to count bills of the designated denomination and designated currency type, the display screen being adapted to display information associated with counted bills of the designated denomination and designated currency type.

47. The note counter of claim 46 wherein the display screen is operable to display selection options associated with the denomination selection element, the selection options including a listing of available denominations corresponding to each of the available types of international currency.

48. The note counter of claim 47 wherein the display screen comprises a touch-screen display, the touch-screen display including a plurality of denomination selection menus, each of the denomination selection menus corresponding to and displaying the available denominations associated with one of the available types of international currency, the designated denomination to be evaluated by the note counter being selectable from one of the denomination selection menus by touching an area of the touch-screen display associated with the designated denomination.

49. The note counter of claim 30 further comprising a stacker which stacks bills processed by the note counter, and a stacker speed selection element operable to select a designated stacker speed of the note counter.

50. A method of counting international currency bills with a customizable note counter, the note counter including a counting sensor and a display screen, the method comprising:

displaying options on the display screen, the options including currency selection options selectable from among a plurality of available types of international currency;

selecting a designated currency type to be processed by the note counter from among the currency selection options;

counting a number of bills of the designated currency type with the counting sensor; and displaying information associated with the number of counted bills on the display screen.

51. The method of claim 50 further including:

storing information associated with the options in a resident flash memory of the note counter, said information including an identification of the designated currency type to be processed by the note counter;

electrically coupling a flash card to said resident flash memory, said flash card having a flash card memory therein, and exchanging information associated with the options between said resident flash memory and said flash card memory.

52. The method of claim 51 wherein said exchanging includes copying the information from said resident memory to said flash card memory, and further including:

uncoupling the flash card from the resident flash memory;

electrically coupling the flash card to a second note counter having a resident flash memory, the information associated with the options being copied from the flash card memory to the resident flash memory of the second note counter; and counting a number of bills of the designated currency type with the second note counter.

53. The method of claim 50 wherein the options include language selection options selectable from among a plurality of international languages, the method further comprising selecting a designated language in which information is to be displayed on the display screen from among the language selection options.

54. The method of claim 53 further including:

storing information associated with the options in a resident flash memory of the note counter, said information including an identification of a designated currency type and a designated language;

electrically coupling a flash card to said resident flash memory, said flash card having a flash card memory therein, the information associated with the options being copied from said resident flash memory to said flash card memory in response to electrically coupling the flash card to the resident flash memory;

uncoupling the flash card from the resident flash memory;

electrically coupling the flash card to a second note counter having a resident flash memory and a display, the information associated with the options being copied from the flash card memory to the resident flash memory of the second note counter; and counting a number of bills of the designated currency type with the second note counter; and displaying of information associated with the number of counted bills on the display screen, said information being communicated in the designated language.

55. The method of claim 50 wherein the options include currency type symbol selection options selectable from among a plurality of international currency type symbols, the method further comprising selecting a designated amount symbol to be displayed on the display screen from among the amount symbol selection options.

56. The method of claim 55 further including:

storing information associated with the options in a resident flash memory of the note counter, said information including an identification of the designated currency type and designated amount symbol;

electrically coupling a flash card to said resident flash memory, said flash card having a flash card memory therein, the information associated with the options being copied from said resident flash memory to said flash card memory in response to electrically coupling the flash card to the resident flash memory;

uncoupling the flash card from the resident flash memory;

electrically coupling the flash card to a second note counter having a resident flash memory and a display, the information associated with the options being copied from the flash card memory to the resident flash memory of the second note counter;

counting a number of bills of the designated currency type with the second note counter; and displaying information associated with the number of counted bills on the display screen, said information being communicated with the designated currency type symbol.

57. A method of counting international currency bills with a customizable note counter, the note counter including a counting sensor and a display screen, the method comprising:

displaying options on the display screen, the options including currency selection options, denomination selection options, language selection options, and currency type symbol selection options, the currency selection options being selectable from among a plurality of available types of international currency, the denomination selection options being selectable from among a list of available denominations corresponding to the available types of international currency, the language selection options being selectable from among a plurality of international languages, and the currency type symbol selection options being selectable from among a plurality of international currency type symbols;

selecting a designated currency type to be processed by the note counter from among the currency selection options;

selecting a designated currency denomination to be processed by the note counter from among the denomination selection options;

selecting a designated language to be communicated on the display screen of the note counter from among the denomination selection options;

selecting a designated currency type symbol to be displayed on the display screen from among the currency type symbol selection options;

counting a number of bills of the designated currency type and designated currency denomination with the counting sensor; and displaying information associated with the number of counted bills on the display screen, the information being communicated in the designated language and with the designated currency type symbol.

58. The method of claim 57 further including:

storing information associated with the options in a resident flash memory of the note counter, said information including an identification of the designated currency type, designated currency denomination, designated language, and designated currency type symbol;

electrically coupling a flash card to said resident flash memory, said flash card having a flash card memory therein; and exchanging information associated with the options between said resident flash memory and said flash card memory.

59. The method of claim 58 wherein said exchanging includes copying the information from said resident memory to said flash card memory, and further including:

uncoupling the flash card from the resident flash memory;

electrically coupling the flash card to a second note counter having a resident flash memory and a display, the information associated with the options being copied from the flash card memory to the resident flash memory of the second note counter;

counting a number of bills of the designated currency type and designated currency denomination with the second note counter; and displaying information associated with the number of counted bills on the display screen of the second note counter, the information being communicated in the designated language and with the designated currency type symbol.

60. A customizable note counter for processing international currency bills, the note counter comprising:

a system memory which stores master information associated with a plurality of types of international currency;

a currency selection element operable to select a designated currency type to be processed by the note counter, the designated currency type being selectable from among a plurality of available types of international currency; and an authenticating unit for determining the authenticity of a bill of the designated currency type.

61. The note counter of claim 60 and further including one or more sensors actuatable to obtain that data from a test bill, and wherein said authenticating unit includes a processor which compares said test data with master information corresponding to the designated currency type.

62. The note counter of claim 61 wherein said processor is operable in response to said currency selection element to selectively actuate one or more designated ones of said sensors to obtain said test data.

63. The note counter of claim 61 further including an authentication mode selection element which selects one or more designated types of the test data to be obtained from the test bill.

64. The note counter of claim 63 wherein the authentication mode selection element selects a designated type of master information for comparison to the test data.

65. The note counter of claim 63 wherein said processor is operable in response to said authentication mode selection element to selectively actuate one or more designated ones of said sensors to obtain said test data.

66. The note counter of claim 63 wherein the designated type of test data is selected from the group consisting of size data, UV data, and fluorescence data.

67. The note counter of claim 63 wherein the designated type of test data is selected from the group consisting of magnetic data, density data, and security thread content data.

68. The note counter of claim 63 wherein the designated type of test data is selected from the group consisting of thread detection data and color shifting ink data.

69. The note counter of claim 63 wherein the designated type of test data is selected from the group consisting of hologram data, kintogram data and watermark data.

70. A method of operating a customizable note counter for processing international currency bills, the method comprising:

storing master information associated with a plurality of types of international currency in a system memory of the note counter;

selecting a designated currency type to be processed by the note counter;

scanning a test bill of the designated currency type to obtain test data associated with the test bill; and determining the authenticity of said test bill by comparing the test data obtained from the test bill to the master information corresponding to the designated currency type.

71. The method of claim 70 further including selectively actuating one or more designated sensors to perform said scanning.

72. The method of claim 70 further including selecting a designated type of the test data to be obtained from the test bill.

73. The method of claim 72 and further including selecting a designated type of master information for comparison to the test data.

74. The method of claim 72 wherein the designated type of test data is selected from the group consisting of size data, UV data, and fluorescence data.

75. The method of claim 72 wherein the designated type of test data is selected from the group consisting of magnetic data, density data and security thread content data.

76. The method of claim 72 wherein the designated type of test data is selected from the group consisting of thread detection data and color shifting ink data.

77. The method of claim 72 wherein the designated type of test data is selected from the group consisting of hologram data, kintogram data and watermark data.

78. The method of claim 70 and further including:

displaying set-up options on a display screen, the set-up options including currency selection options selectable from among a plurality of available types of international currency; and wherein said selecting comprises selecting a designated currency type to be processed by the note counter from among the currency selection options.

79. The method of claim 78 and further including:

counting a number of bills of the designated currency type; and displaying information associated with the number of counted bills on the display screen.

80. The method of claim 78 and further including:

storing information associated with the set-up options in a resident flash memory of the note counter, said information including an identification of the designated currency type to be processed by the note counter;

electrically coupling a flash card to said resident flash memory, said flash card having a flash card memory therein; and exchanging the information associated with the set-up options between said resident flash memory and said flash card memory.

81. The method of claim 80 and further including:

uncoupling the flash card from the resident flash memory;

electrically coupling the flash card to a second note counter having a resident flash memory, the information associated with the set-up options being copied from the flash card memory to the resident flash memory of the second note counter; and processing bills of the designated currency type with the second note counter.

82. The method of claim 79 wherein the set-up options include language selection options selectable from among a plurality of international languages, the method further comprising selecting a designated language in which information is to be displayed on the display screen from among the language selection options.

83. The method of claim 82 and further including:

storing information associated with the set-up options in a resident flash memory of the note counter, said information including an identification of the designated currency type to be processed by the note counter;

electrically coupling a flash card to said resident flash memory, said flash card having a flash card memory therein; and exchanging the information associated with the set-up options between said resident flash memory and said flash card memory.

84. The method of claim 79 wherein the set-up options include currency type symbol selection options selectable from among a plurality of international currency type symbols, the method further comprising the step of selecting a designated currency type symbol to be displayed on the display screen from among the currency type symbol selection options.

85. The method of claim 84 and further including:

storing information associated with the set-up options in a resident flash memory of the note counter, said information including an identification of the designated currency type to be processed by the note counter;

electrically coupling a flash card to said resident flash memory, said flash card having a flash card memory therein; and exchanging the information associated with the set-up options between said resident flash memory and said flash card memory.

86. The method of claim 85 wherein the set-up options include language selection options selectable from among a plurality of international languages, the method further comprising selecting a designated language in which information is to be displayed on the display screen from among the language selection options.

87. A customizable note counter for processing currency bills, the note counter comprising:

an input receptacle which receives a stack of currency bills to be counted;

an output receptacle which receives the bills after they have been counted;

a counting sensor which counts the number of bills transferred from said input receptacle to said output receptacle;

a transport mechanism which transports bills, one at a time, from the input receptacle past the counting sensor to the output receptacle;

an operator interface panel including a display which displays information to an operator and an input device for receiving information from the operator; and wherein the input device comprises a currency selection element which permits the operator to specify a currency type to be counted by the note counter from among a plurality of types of international currency.

88. The note counter of claim 87 and further including:

a denomination selection element which permits the operator to specify the denomination of the selected currency type to be counted; and a processor which calculates the total value of the bills based on the number of bills counted by the counting sensor and the currency type and denomination specified by the operator, said display displaying the total value in a total field on the display, the total field comprising a value field and a symbol field, wherein a symbol corresponding to the type of currency specified by the operator is displayed in the symbol field.

89. The note counter of claim 88 wherein in response to specifying the currency type, the processor causes the display to display information corresponding to the selected currency type and selects and uses master information corresponding to the selected currency type, and in response to specifying the denomination, the processor selects and uses master information corresponding to the selected denomination of the selected currency type.

90. The customizable note counter of claim 87 and further including:

a denomination selection element which permits the operator to specify the denomination of the selected currency type, and a processor which calculates the total value of the bills based on the number of bills counted by the counting sensor and the currency type and denomination specified by the operator; and wherein in response to specifying the denomination, the processor also determines the size of the bills to be processed and the speed at which the bills will be processed.

91. A customizable note counter for processing currency bills adaptable for counting a plurality of types of international currency and adaptable for use in a plurality of currency markets, the note counter comprising:

an input receptacle which receives a stack of currency bills to be counted;

a counting sensor which counts the number of bills in said stack;

an output receptacle which receives the bills after they have been counted;

a transport mechanism which transports bills, one at a time, from the input receptacle past the counting sensor to the output receptacle;

an operator interface panel including a display which displays information to an operator and an input device which receives information from the operator, wherein the input device comprises:

a currency selection element which permits the operator to specify the currency type to be counted by the note counter, wherein, in response to specifying the currency type, the note counter displays information corresponding to the selected currency type, a denomination selection element which permits the operator to specify the denomination of the selected currency type, and wherein the currency selection element permits the operator to specify any one of a plurality of types of international currency that the currency counter is programmed to accommodate, the counter being capable of displaying a currency type symbol associated with each of the plurality of types of international currency that the counter is programmed to handle; and a processor which calculates the total value of the bills based on the number of bills counted by the counting sensor and the denomination specified by the operator.

92. The note counter of claim 91 wherein, wherein, in response to specifying the denomination, the note counter determines the size of the bills to be processed and the speed at which the bills will be processed, the denomination selection element permits the operator to designate any one of a plurality of denominations corresponding to denominations of genuine currency of the specified currency type, and wherein the total value is displayed in a total field on the display, the total field comprising a value field and a symbol field, and wherein the currency type symbol associated with the type of currency specified by the operator is displayed in the symbol field.

93. A customizable note counter for processing currency bills adaptable for counting a plurality of types of international currency, the note counter comprising:

an input receptacle which receives a stack of currency bills to be counted;

a counting sensor which counts the number of bills in said stack;

an output receptacle which receives the bills after they have been counted;

a transport mechanism which transports bills, one at a time, from the input receptacle past the counting sensor to the output receptacle;

an operator interface panel including a display which displays information to an operator and an input device which receives information from the operator; wherein the input device comprises a language selection element which permits the operator to specify the language to be displayed on said display, wherein, in response to specifying the language, the note counter displays information to the operator in the specified language; and wherein the language selection element permits the operator to designate any one of a plurality of international languages that the currency counter is programmed to accommodate.

94. A customizable note counter for processing currency bills adaptable for counting a plurality of types of international currency, the note counter being of the type wherein a stack of currency bills is transported, one at a time, from an input receptacle to an output receptacle past a counting sensor, the note counter comprising:

an operator interface panel including a display which displays information to an operator and an input device which receives information from the operator;

wherein the input device comprises:

a currency selection element which permits the operator to specify the currency type to be counted by the note counter, wherein, in response to specifying the currency type, the note counter displays information corresponding to the selected currency type, a denomination selection element which permits the operator to specify the denomination of the selected currency type, wherein, in response to specifying the denomination, the note counter determines the size of the bills to be processed and the speed at which the bills will be processed, and wherein the currency selection element permits the operator to designate any one of a plurality of types of international currency that the currency counter is programmed to accommodate; and a processor which calculates the total value of the bills based on the number of bills counted by the counting sensor and the denomination specified by the operator.

95. The note counter of claim 94 wherein the counter is capable of displaying a currency type symbol associated with each of a plurality of types of international currency that the counter is programmed to handle, and wherein the total value is displayed in a total field on the display, the total field comprising a value field and a symbol field, wherein the currency type symbol associated with the type of currency specified by the operator is displayed in the symbol field.

96. A customizable note counter for processing currency bills, the note counter comprising:

an operator interface panel including a display and a currency selection element, said currency selection element being operable to select a designated currency type from among a customized set of currency selection options available for processing by said note counter, said display displaying information associated with a currency type selected by said currency selection element; and a memory for storing information associated with the currency selection options.

97. The customizable note counter of claim 96 further including a counting sensor which counts bills.

98. The note counter of claim 96, said operator interface panel further including a language selection element operable to select a language to be used on the display.

99. The note counter of claim 96 wherein the note counter automatically selects the language to be used on the display in response to the selection of a designated currency type.

100. The note counter of claim 96, said operator interface panel further including a currency symbol selection element operable to select an currency symbol to be used on the display.

101. The note counter of claim 96 wherein the counter automatically selects the currency symbol to be used on the display in response to the selection of a designated currency type.

102. The note counter of claim 96 wherein the display is operable to display selection options associated with the currency selection element, the selection options including a listing of a plurality of types of international currency.

103. The note counter of claim 96 wherein the display comprises a touch-screen display, the touch-screen display being adapted to display a currency selection menu which displays the selection options associated with the currency selection element, the designated currency type being selectable from the currency selection menu by touching an area of the touch-screen display associated with the designated currency type.

104. The note counter of claim 96 wherein the operator interface panel further includes a denomination selection element, the denomination selection element being operable to select a designated denomination of the designated currency type to be processed by the note counter, and further including a counting sensor adapted to count bills of the designated denomination and designated currency type, the display being adapted to display information associated with the counting of bills of the designated currency type and designated denomination.

105. The note counter of claim 104 wherein the display is operable to display selection options associated with the denomination selection element, the selection options including a listing of denominations corresponding to each of the types of international currency the note counter is programmed to accommodate.

106. The note counter of claim 105 wherein the display screen comprises a touch-screen display, the touch-screen display being adapted to display any of a plurality of denomination selection menus, each of the denomination selection menus corresponding to and displaying the denominations corresponding to one of the types of international currency the note counter is programmed to accommodate, the designated denomination to be processed by the note counter being selectable from one of the denomination selection menus by touching an area of the touch-screen display associated with the designated denomination.

107. The note counter of claim 96 further comprising a stacker for stacking bills processed by the note counter, and a stacker speed selection element operable to select a designated stacker speed for the note counter.

108. The note counter of claim 60 wherein said authenticating unit includes:

a plurality of sensors each being separately actuatable to scan a bill to obtain test data associated with said bill; and a processor adapted to determine the authenticity of said bill by comparing the test data obtained from the bill to master information corresponding to the designated currency type.

109. A method of counting international currency bills with a customizable note counter, the note counter including a counting sensor and a display screen, the method comprising:

storing options in a system memory, the options including currency selection options selectable from among a plurality of types of international currency;

selecting a designated currency type to be processed by the note counter from among the currency selection options;

counting a number of bills of the designated currency type with the counting sensor; and displaying information associated with the number of counted bills on the display screen.

110. A currency handling system for processing a plurality of currency types, at least one of said currency types having bills of varying sizes, the system comprising:

an operator interface panel including a currency selection element and a display, said currency selection element being operable to select a currency type from among the plurality of currency types the system is programmed to accommodate;

a sensor which determines the size of a processed bill; and a processor which compares the size of the processed bill to genuine bill sizes corresponding to denominations of the selected currency type such that the denomination of the bill can be determined.

111. The currency handling system of claim 110 wherein after the processor determines the denomination of the bill, the processor automatically determines a plurality of operating parameters.

112. A document handling system for processing a plurality of types of documents, the system comprising:

an operator interface panel including a document selection element and a display, said document selection element being operable to select a document type from among the plurality of types of document the system is designed to accommodate, said display displaying information associated with the selected document type;

a memory for storing information associated with the types of document the system is designed to accommodate; and a sensor for processing the selected document type.

113. The document handling system of claim 112 wherein the types of documents the system can process include at least one of casino and amusement park currency.

114. The document handling system of claim 112 wherein the types of documents include at least one of stock certificates, bonds, postage stamps, and food stamps.

115. A currency handling system for independently deriving master information from a plurality of currency types, said currency handling system having a learn mode and a standard mode, said currency handling system comprising:

an operator interface panel including a currency selection element and a display, said currency selection element being operable to select a currency type from among the plurality of currency types the system is designed to accommodate, said display displaying information associated with the selected currency type;

a plurality of sensors each being adapted in said learn mode to process a stack of master currency bills to obtain master information associated with at least one attribute of said master currency bills, said sensors being adapted in said standard mode to process a stack of test bills to obtain data associated with at least one attribute of said test bills; and a processor being adapted in said standard mode to determine the authenticity of each of said test bills by comparing the data associated with a selected attribute to the master information corresponding to the selected attribute.

116. The currency handling system of claim 115 wherein said master information includes a plurality of numerical threshold values to be used in determining the authenticity of said test bills, each of said threshold values corresponding to a value of one of said attributes in a particular currency type and denomination.

117. The currency handling system of claim 115 wherein said processor is adapted in said learn mode to derive a plurality of numerical thresholds from said master information, each of said numerical thresholds corresponding to a value of one of said attributes in a particular currency type and denomination.

118. The currency handling system of claim 117 wherein said numerical thresholds include upper and lower threshold numbers defining respective upper and lower limits of acceptability of said test bills, a positive determination of authenticity being made regarding individual ones of said test bills when a numerical value of test data associated with the selected attribute in an individual test bill is between the upper and lower threshold numbers associated with said selected attribute.

119. The currency handling system of claim 115 wherein said operator interface panel allows an operator to input a plurality of control signals.

120. The currency handling system of claim 119 wherein said plurality of control signals includes one or more override signals for establishing alternate master information for said currency handling system, the determination of authenticity of said test bills being made by comparing test data associated with said selected one of said attributes to the alternate master information associated with said selected attribute.

121. The currency handling system of claim 120 wherein said plurality of control signals includes an attribute-selection signal for selecting the attributes of said master bills for which said master information will be obtained, said attribute-selection signal being separately definable for separate denominations of said master bills.

122. The currency handling system of claim 120 wherein said plurality of control signals includes an authentication mode selection signal for selecting which items of said threshold data will be used in authentication of said test bills, said authentication mode selection signal being separately definable for separate denominations of said test bills.

123. The currency handling system of claim 115 wherein at least one of the items of said master information corresponds to the length of said master currency bills, and said at least one attribute of said test bills includes the length of said test bills, and wherein an initial determination of at least one of type, denomination and authenticity is made regarding said test bills based on a comparison of the length of said test bills to the items of master information corresponding to the length of said master bills.

124. The currency handling system of claim 115 wherein at least one of the items of said master information corresponds to the width of said master currency bills, and said at least one attribute of said test bills includes the width of said test bills, and wherein an initial determination of at least one of type, denomination and authenticity is made regarding said test bills based on a comparison of the width of said test bills to the items of master information corresponding to the width of said master bills.

125. The note counter of claim 115 wherein said operator interface panel includes a denomination selection element operable to select a denomination of the selected currency type, and wherein said processor automatically selects an authentication sensitivity level corresponding to the selected denomination of said currency bills, said processor determining the authenticity of said test bills by comparing test data associated with each of said test bills by comparing test data associated with each of said test bills to data corresponding to the selected sensitivity level.

126. The note counter of claim 123 wherein said processor automatically selects an authentication sensitivity level corresponding to length of a first one or more of said test bills as determined by the initial determination of authenticity of said currency bills, said processor determining the authenticity of a second plurality of test bills by comparing test data associated with each of said second plurality of test bills to the threshold data corresponding to the selected sensitivity level.

127. The note counter of claim 124 wherein said processor automatically selects an authentication sensitivity level corresponding to width of a first one or more of said test bills as determined by the initial determination of authenticity of said currency bills, said processor determining the authenticity of a second plurality of test bills by comparing test data associated with each of said second plurality of test bills to the threshold data corresponding to the selected sensitivity level.

128. A currency handling method comprising the steps of:

scanning a set of master currency bills to obtain master information associated with one or more attributes of said master currency bills;

storing said master information in a resident memory;

scanning a stack of test bills to obtain test data corresponding to the value of at least one of said attributes in each of said test bills; and determining the authenticity of each of said test bills by comparing the test data associated with a selected one of said attributes to the master information corresponding to the selected one of said attributes.

129. The currency handling method of claim 128 wherein at least one item of said master information corresponds to the length of said master currency bills, and said at least one of said attributes in said test bills includes the length of each of said test bills, an initial determination of authenticity being made regarding said test bills based on a comparison of the length of said test bills to the master information corresponding to the length of said master bills.

130. The currency handling method of claim 129 wherein master information corresponding to an attribute other than length is used to validate the initial determination of authenticity of said test bills.

131. The currency handling method of claim 128 wherein said master information includes a plurality of numerical threshold values to be used in determining the authenticity of said test bills, each of said threshold values corresponding to a value of one of said attributes in a particular currency type and denomination.

132. The currency handling method of claim 128 and further including scanning one or more master bills and to obtain said master information, and deriving from said master information a plurality of numerical thresholds, each of said numerical thresholds corresponding to a value of one of said attributes in a particular denomination of currency.

133. The currency handling method of claim 132 wherein said numerical thresholds include upper and lower threshold numbers defining respective upper and lower limits of acceptability of said test bills, a determination of authenticity being made regarding each of said test bills when the test data associated with the selected attribute of said test bill is between the upper and lower threshold numbers associated with said selected attribute.

134. The currency handling method of claim 128 further comprising electrically coupling a flash card to said resident memory, said flash card having a flash card memory therein, and exchanging data between said resident flash memory and said flash card memory.

135. The currency handling method of claim 134 and further comprising:

uncoupling said flash card from said resident flash memory; and electrically coupling said flash card to one or more secondary currency handling systems, said master information being copied from said flash card memory to respective resident flash memories of the secondary currency handling systems.

136. The customizable note counter of claim 88 wherein the currency selection element permits the operator to designate any one of a plurality of types of international currency that the counter is programmed to accommodate, and further including:

a memory which stores master characteristic information used to authenticate bills, the memory storing master characteristic information for each of the types of international currency that the counter is programmed to accommodate;

an authenticating unit which authenticates each of the bills by retrieving characteristic information from each bill and comparing the retrieved characteristic information to master characteristic information corresponding to the type of currency specified by the operator; and wherein the processor calculates the total value of the bills based further on the number of bills authenticated by the authenticating unit.

137. A scanhead for determining at least one of the size and position of a document located in a transport path of a document handling apparatus, said scanhead comprising:

first and second photo-sensitive linear arrays, each of said arrays comprising a plurality of relatively small end-to-end photosensing elements;

a scanhead housing which mounts said arrays co-linear and separated by a gap, so as to detect at least opposite end parts of documents over a range of document lengths;

whereby at least one of a linear dimension of a document, or a document position can be determined based upon the number of photosensing elements in each of said arrays which emit a signal corresponding to the presence or absence of a part of a document in registry therewith.

* * * * *